(12) United States Patent
Hori et al.

(10) Patent No.: US 10,807,188 B2
(45) Date of Patent: *Oct. 20, 2020

(54) METHOD OF MANUFACTURING LIQUID-COOLED JACKET

(71) Applicant: NIPPON LIGHT METAL COMPANY, LTD., Tokyo (JP)

(72) Inventors: Hisashi Hori, Shizuoka (JP); Nobushiro Seo, Shizuoka (JP)

(73) Assignee: NIPPON LIGHT METAL COMPANY, LTD., Tokyo (JP)

(*) Notice: Subject to any disclaimer, the term of this patent is extended or adjusted under 35 U.S.C. 154(b) by 71 days.

This patent is subject to a terminal disclaimer.

(21) Appl. No.: 15/982,754

(22) Filed: May 17, 2018

(65) Prior Publication Data

US 2018/0264584 A1    Sep. 20, 2018

Related U.S. Application Data

(63) Continuation of application No. 15/111,191, filed as application No. PCT/JP2014/072486 on Aug. 27, 2014, now Pat. No. 9,999,941.

(30) Foreign Application Priority Data

Jan. 14, 2014  (JP) .................................. 2014-004267
Jan. 14, 2014  (JP) .................................. 2014-004280

(51) Int. Cl.
*B23K 20/12*        (2006.01)
*B23K 101/04*       (2006.01)

(52) U.S. Cl.
CPC ........ *B23K 20/1235* (2013.01); *B23K 20/124* (2013.01); *B23K 20/126* (2013.01); *B23K 20/1255* (2013.01); *B23K 2101/045* (2018.08)

(58) Field of Classification Search
CPC .............. B23K 20/1235; B23K 20/124; B23K 20/1255; B23K 20/126; B23K 2101/045; B23K 2101/14; B23K 20/122–128
(Continued)

(56) References Cited

U.S. PATENT DOCUMENTS 5,713,507 A * 2/1998 Holt .................... B23K 20/123
                                                    228/112.1
7,416,102 B1 * 8/2008 Trapp ................. B23K 20/1225
                                                    228/112.1
(Continued)

FOREIGN PATENT DOCUMENTS

EP      1293288 A1 * 3/2003 ......... B23K 20/1235
FR      2900082 A1 * 10/2007 ......... B23K 20/1255
(Continued)

OTHER PUBLICATIONS

International Search Report & Written Opinion dated Nov. 25, 2014 corresponding to International Patent Application No. PCT/JP2014/072486 and English translation thereof. No copy provided, per MPEP 609. Copy submitted in parent U.S. Appl. No. 15/111,191.

*Primary Examiner* — Kiley S Stoner
(74) *Attorney, Agent, or Firm* — Squire Patton Boggs (US) LLP

(57) ABSTRACT

A method of manufacturing a liquid-cooled jacket, includes a preparation step which includes placing a sealing body on a stepped portion to allow a step side surface and a sealing-body side surface of the sealing body to butt each other, and a primary joining step which includes allowing a primary joining rotary tool to move once around the sealing body, while moving the rotary tool along a butted portion formed in the preparation step, to carry out friction stir welding. The primary joining step includes employing the primary joining rotary tool provided with a stirring pin having a length dimension greater than a thickness dimension of the sealing (Continued)

body, and carrying out friction stirring with only the stirring pin being brought into contact with a jacket body and the sealing body.

12 Claims, 28 Drawing Sheets

(58) Field of Classification Search
USPC .............................................. 228/112.1, 2.1
See application file for complete search history.

(56) References Cited

U.S. PATENT DOCUMENTS

| | | |
|---|---|---|
| 2001/0019073 A1 | 9/2001 | Ezumi et al. |
| 2002/0153130 A1* | 10/2002 | Okamoto ............. B23K 20/122 165/170 |
| 2003/0010805 A1 | 1/2003 | Nelson et al. |
| 2006/0086775 A1 | 4/2006 | Trapp et al. |
| 2007/0152015 A1* | 7/2007 | Burton ................. B23K 20/126 228/2.1 |
| 2007/0181649 A1 | 8/2007 | Park et al. |
| 2008/0245517 A1 | 10/2008 | Ishikawa et al. |
| 2008/0257936 A1 | 10/2008 | Trapp et al. |
| 2009/0072007 A1 | 3/2009 | Nagano |
| 2009/0200359 A1 | 8/2009 | Chen et al. |
| 2010/0089976 A1 | 4/2010 | Szymanski et al. |
| 2010/0096438 A1* | 4/2010 | Sato ................... B23K 20/1225 228/114 |
| 2010/0101768 A1 | 4/2010 | Seo et al. |
| 2011/0308059 A1 | 12/2011 | Seo et al. |
| 2012/0181324 A1* | 7/2012 | Yamauchi ............ B23K 20/124 228/114 |
| 2014/0165399 A1 | 6/2014 | Seo et al. |
| 2014/0166731 A1* | 6/2014 | Seo ...................... B23K 20/122 228/112.1 |
| 2015/0207378 A1* | 7/2015 | Buttner .................... H02K 5/20 310/54 |
| 2015/0273623 A1* | 10/2015 | Kato .................... B23K 20/125 228/112.1 |
| 2016/0325374 A1* | 11/2016 | Hori ..................... B23K 20/124 |
| 2018/0221984 A1* | 8/2018 | Toguyeni ............. B23K 20/124 |

FOREIGN PATENT DOCUMENTS

| | | | |
|---|---|---|---|
| JP | 2001-198683 A | | 7/2001 |
| JP | 2003230969 A | * | 8/2003 |
| JP | 2007-111747 A | | 5/2007 |
| JP | 2010-137268 A | | 6/2010 |
| JP | 2010-194545 A | | 9/2010 |
| JP | 2010-245085 A | | 10/2010 |
| JP | 2011218363 A | * | 11/2011 |
| JP | 2013-039613 A | | 2/2013 |
| JP | 2013-049072 A | | 3/2013 |
| WO | WO-2012093612 A1 | * | 7/2012 ........... B23K 9/0026 |

* cited by examiner

METHOD OF MANUFACTURING LIQUID-COOLED JACKET

CROSS REFERENCE TO RELATED APPLICATION

This application is a Continuation of co-pending U.S. patent application Ser. No. 15/111,191, filed on Jul. 13, 2016, which is the National Stage of PCT International Application No. PCT/JP2014/072486, filed on Aug. 27, 2014, which claims priority to Japanese Application Nos. 2014-004267 and 2014-004280, filed on Jan. 14, 2014. The entire content of the above-referenced applications is hereby incorporated by reference.

TECHNICAL FIELD

The present invention relates to a method of manufacturing a liquid-cooled jacket.

BACKGROUND ART

Friction stir welding (FSW) is known as a method of joining metal members together. The friction stir welding is a technique of rotating and moving a rotary tool along a butted portion of metal members, allowing the metal at the butted portion to be plasticized and fluidized with heat generated by friction between the rotary tool and the metal members, and joining the metal members together in solid phase.

In recent years, as an electronic device as typified by a personal computer has been improved in performance, a calorific value of a CPU (heat generating body) installed therein has been increasing in amount and thus it has become important to cool the CPU. In conventional art, a heat sink of an air cooling fan system has been used to cool the CPU, but problems such as noises caused by the fan and cooling limits by the air cooling system have gain prominent attention. Thus, a liquid-cooled jacket has gathered attention as a next-generation cooling system.

As a method of manufacturing a liquid-cooled jacket, Patent Literature 1 discloses a technique of joining metallic components together by means of friction stir welding. FIGS. 29A and 29B are views showing a manufacturing method for a first conventional liquid-cooled jacket, in which FIG. 29A is an exploded perspective view, and FIG. 29B is a cross-sectional view of main parts showing a joining state. As shown in FIG. 29A, the first conventional liquid-cooled jacket is composed of a box-shaped jacket body 100 which opens upward, and a plate-shaped sealing body 110 which seals an opening of the jacket body 100.

The jacket body 100 is composed of a bottom portion 101 and a side wall portion 102 provided to stand on the bottom portion 101 and having the form of a rectangular frame in planar view. The jacket body 100 includes a recess 103 formed therein. Moreover, a stepped portion 104 is formed along a circumferential edge of the opening on an end surface of the side wall portion 102. As shown in FIGS. 29A and 29B, the manufacturing method for the first liquid-cooled jacket includes placing the sealing body 110 on the stepped portion 104 and then moving a rotary tool 120 being rotated along a butted portion of the jacket body 100 and the sealing body 110 to carry out friction stir welding.

The rotary tool 120 is composed of a cylindrical shoulder portion 121 and a stirring pin 122 projecting from a lower end surface of the shoulder portion 121. The rotary tool 120 is allowed to move once around the sealing body 110 along the butted portion while pressing the lower end surface of the shoulder portion 121 by about several millimeters into the jacket body 100 and the sealing body 110, thereby allowing the liquid-cooled jacket having a hollow portion internally to be formed. In this process, a plasticized region W is formed on a movement locus of the rotary tool 120.

On the other hand, FIGS. 30A and 30B are views showing a manufacturing method for a second conventional liquid-cooled jacket, in which FIG. 30A is an exploded perspective view, and FIG. 30B is a cross-sectional view of main parts showing a joining state. As shown in FIG. 30A, the second conventional liquid-cooled jacket is composed of a box-shaped jacket body 100 which opens upward, and a plate-shaped sealing body 110 which seals an opening of the jacket body 100.

The jacket body 100 is composed of a bottom portion 101 and a side wall portion 102 provided to stand on the bottom portion 101 and having the form of a rectangular frame in planar view. The jacket body 100 includes a recess 103 formed therein. As shown in FIGS. 30A and 30B, the manufacturing method for the second liquid-cooled jacket includes placing a back surface 110b of the sealing body 110 on an end surface 102a of the jacket body 100 and then moving a rotary tool 120 being rotated along an overlapped portion H formed by overlapping back surface 110b with the end surface 102a, to carry out friction stir welding.

The rotary tool 120 is allowed to move once around the recess 103 along the overlapped portion H while pressing the lower end surface of the shoulder portion 121 by about several millimeters into the sealing body 110, thereby allowing the liquid-cooled jacket having a hollow portion internally to be formed. In this process, a plasticized region W is formed on a movement locus of the rotary tool 120.

CITATION LIST

Patent Literature

Patent Literature 1: Japanese Unexamined Patent Application Publication No. 2010-137268

SUMMARY OF THE INVENTION

Technical Problem

However, according to the conventional manufacturing method for the first liquid-cooled jacket, the shoulder portion 121 causes a great pressing force to act on the jacket body 100 and the sealing body 110 at the time of friction stir welding, thus posing a problem that, as shown in FIG. 29A, the metal material which is plasticized and fluidized escapes from an inner corner portion constituted by the side wall portion 102 and the sealing body 110 into the jacket body 100. The width of the stepped portion 104 must be set to be increased in order to prevent the metal material from escaping from the inner corner portion, thus having led to a problem that a degree of freedom of designing is limited.

Moreover, according to the conventional manufacturing method for the second liquid-cooled jacket, the shoulder portion 121 causes a great pressing force to act on the jacket body 100 and the sealing body 110 at the time of friction stir welding, thus posing a problem that, as shown in FIG. 30A, the metal material which is plasticized and fluidized escapes from an inner corner portion constituted by the side wall portion 102 and the sealing body 110 into the jacket body 100. The width of the side wall portion 102 must be set to be increased in order to prevent the metal material from escaping from the inner corner portion, thus having led to a problem that a degree of freedom of designing is limited.

In view of the above, an object of the present invention is to provide a method of manufacturing a liquid-cooled jacket having a high degree of freedom of designing.

Solution to Problem

In order to solve the problems described above, the present invention provides, as one aspect thereof, a method of manufacturing a liquid-cooled jacket which is composed of a jacket body having a bottom portion and a frame-shaped side wall portion provided to stand on the bottom portion, and a sealing body which seals an opening of the jacket body, and allows heat transport fluid to flow in a hollow portion formed by the jacket body and the sealing body, the method including: a preparation step which includes forming, on a peripheral edge of the opening of the jacket body, a step bottom surface located below by one step from an end surface of the side wall portion, and a step side surface rising from the step bottom surface, and placing the sealing body on the step bottom surface to allow the step side surface and a sealing-body side surface of the sealing body to butt each other; and a primary joining step which includes allowing a rotary tool to move once around the sealing body, while moving the rotary tool along a butted portion formed in the preparation step, to carry out friction stir welding, wherein the primary joining step includes employing the rotary tool provided with a stirring pin having a length dimension greater than a thickness dimension of the sealing body, and carrying out friction stirring with only the stirring pin being brought into contact with the jacket body and the sealing body.

According to the manufacturing method, since a shoulder portion is not inserted into the jacket body and the sealing body as in the conventional art, a width of a plasticized region can be decreased as compared to the conventional art, and a pressing force which acts on the jacket body and the sealing body can be reduced. This makes it possible, even if a width of the step bottom surface is decreased, to prevent the metal material from escaping from an inner corner portion constituted by the side wall portion and the sealing body, thus improving a degree of freedom of designing.

Also, according to the manufacturing method, since only the stirring pin is inserted into the jacket body and the sealing body, a load exerted on a friction stirring apparatus can be reduced as compared to a case where the shoulder portion of the rotary tool is pressed into the jacket body and the sealing body. Moreover, since the load on the friction stirring apparatus can be reduced, the joining can be carried out down to a deep location of the butted portion with no great load exerted on the friction stirring apparatus.

Moreover, preferably, the liquid-cooled jacket includes a supporting portion formed on any one, and abutting on the other, of the bottom portion of the jacket body and a back surface of the sealing body.

According to the manufacturing method, since the sealing body is supported by the supporting portion, the liquid-cooled jacket having a high resistance to deformation can be manufactured.

Moreover, preferably, the jacket body includes a supporting portion which stands on the bottom portion and abuts on a back surface of the sealing body, and the primary joining step includes carrying out friction stir welding for an overlapped portion at which the back surface of the sealing body and an end surface of the supporting portion are overlapped each other, in addition to friction stir welding for the butted portion.

According to the manufacturing method, since the friction stir welding is carried out for the overlapped portion in addition to the butted portion, the liquid-cooled jacket having an enhanced joining strength and a high resistance to deformation can be manufactured.

Moreover, preferably, the supporting portion is formed to continue from the side wall portion, and the primary joining step includes continuously carrying out the friction stir welding for the butted portion and the overlapped portion.

According to the manufacturing method, since the friction stir welding can be continuously carried out for the butted portion and the overlapped portion, the liquid-cooled jacket having a high resistance to deformation can be manufactured and a manufacturing cycle thereof can be improved.

Moreover, preferably, the supporting portion is formed to continue from one wall portion constituting the side wall portion and to be kept away from another wall portion facing the one wall portion, and the primary joining step includes: inserting the rotary tool into a position corresponding to the supporting portion, on a front surface of the sealing body; continuously carrying out the friction stir welding for the overlapped portion and the butted portion; and pulling out the rotary tool from an end surface of the side wall portion outside the butted portion.

According to the manufacturing method, since the friction stir welding can be continuously carried out for the butted portion and the overlapped portion, the liquid-cooled jacket having a high resistance to deformation can be manufactured and a manufacturing cycle thereof can be improved. Moreover, where the rotary tool is pulled out on the sealing body having a relatively small thickness, a problem occurs in that repairing for a pull-out trace is difficult and work for pulling out the rotary tool is not stabilized to generate defects in the sealing body. However, such a problem can be solved by pulling out the rotary tool on the side wall portion having a great thickness as compared to the sealing body.

Moreover, preferably, the above manufacturing method further includes a repairing step which includes filling weld metal in a pull-out trace of the rotary tool remaining on the end surface of the side wall portion, to repair the pull-out trace.

According to the manufacturing method, the pull-out trace disappears to allow the surface of the liquid-cooled jacket to be planarized.

Moreover, preferably, the primary joining step includes carrying out friction stir welding in a state in which a front surface side of the jacket body and a front surface side of the sealing body are in a convex shape.

There is a risk that heat input at the time of friction stir welding causes heat contraction to be generated in a plasticized region and the sealing body side of the liquid-cooled jacket to be deformed into a concave shape. However, according to the above manufacturing method, the liquid-cooled jacket can be planarized by bringing the jacket body and the sealing body into a convex shape beforehand and making use of the heat contraction.

Moreover, preferably, the primary joining step includes measuring beforehand an amount of deformation of at least one of the jacket body and the sealing body, and carrying out friction stir welding while adjusting an insertion depth of the stirring pin according to the amount of deformation.

According to the manufacturing method, even where friction stir welding is carried out with the jacket body and the sealing body being in a convex shape, the length and width of a plasticized region formed on the liquid-cooled jacket can be made constant.

Moreover, preferably, the primary joining step includes providing a cooling plate on the bottom portion of the jacket body, and carrying out friction stir welding while cooling the jacket body and the sealing body.

According to the manufacturing method, since frictional heat can be suppressed low, deformation of the liquid-cooled jacket due to heat contraction can be reduced.

Moreover, preferably, the primary joining step includes allowing a back surface of the bottom portion of the jacket body and the cooling plate to be brought into surface contact with each other.

According to the manufacturing method, since frictional heat can be suppressed low, deformation of the liquid-cooled jacket due to heat contraction can be reduced.

Moreover, preferably, a cooling flow passage allowing a cooling medium to flow in the cooling plate is formed to have a planar shape which follows at least a movement locus of the rotary tool.

According to the manufacturing method, since the portion for which the friction stirring is carried out can be intensively cooled, a cooling efficiency of the liquid-cooled jacket can be increased.

Moreover, preferably, a cooling flow passage allowing a cooling medium to flow in the cooling plate is constituted by a cooling pipe embedded in the cooling plate.

According to the manufacturing method, control of the cooling medium can be easily carried out.

Moreover, preferably, the primary joining step includes carrying out friction stir welding while allowing a cooling medium to flow within the jacket body to cool the jacket body and the sealing body.

According to the manufacturing method, since frictional heat can be suppressed low, deformation of the liquid-cooled jacket due to heat contraction can be reduced. Moreover, the jacket body per se can be utilized to cool the jacket body and the sealing body, without using a cooling plate or the like.

Moreover, preferably, the primary joining step includes rotating the rotary tool clockwise when moving the rotary tool clockwise around the sealing body, and rotating the rotary tool counterclockwise when moving the rotary tool counterclockwise around the sealing body.

In the friction stir welding, there is a possibility that joining defects are generated on the left side in the direction of forward movement of the rotary tool when rotated clockwise, or on the right side in the direction of forward movement of the rotary tool when rotated counterclockwise, and when such joining defects are formed in the sealing body having a thin plate thickness, there is a risk that water-tightness and air-tightness are decreased. However, according to the above manufacturing method, joining defects caused by the friction stir welding are formed in the jacket body having a relatively great thickness, thus making it possible to suppress a decrease in water-tightness and air-tightness.

Moreover, preferably, the primary joining step includes allowing the rotary tool to move once along the butted portion, then shifting the rotary tool to an outside of a plasticized region formed by a movement of first one-round, and allowing the rotary tool to further move once around the butted portion to carry out re-stirring for the outside of the plasticized region, and when carrying out the re-stirring, the primary joining step includes rotating the rotary tool clockwise when moving the rotary tool clockwise around the sealing body, and rotating the rotary tool counterclockwise when moving the rotary tool counterclockwise around the sealing body.

According to the manufacturing method, since joining defects generated at the first one-round are stirred again at the time of friction stir welding of the second one-round, the joining defects can be repaired.

Moreover, preferably, the above manufacturing method further includes, prior to the primary joining step, a provisional joining step of carrying out provisional joining for the butted portion.

According to the manufacturing method, an aperture can be prevented from being formed between the jacket body and the sealing body when carrying out the primary joining step.

Moreover, preferably, the liquid-cooled jacket includes a plurality of fins formed on at least one of the bottom portion of the jacket body and a back surface of the sealing body.

According to the manufacturing method, the liquid-cooled jacket having a high cooling efficiency can be manufactured.

Moreover, in order to solve the problems described above, the present invention provides, as another aspect thereof, a method of manufacturing a liquid-cooled jacket which is composed of a jacket body having a bottom portion and a frame-shaped side wall portion provided to stand on the bottom portion, and a sealing body which seals a recess of the jacket body, and allows heat transport fluid to flow in a hollow portion formed by the jacket body and the sealing body, the method including: a preparation step which includes placing the sealing body on an end surface of the side wall portion to allow the end surface and a back surface of the sealing body to overlap with each other; and a primary joining step which includes allowing a rotary tool to move once around the recess, while moving the rotary tool along a first overlapped portion overlapped in the preparation step, to carry out friction stir welding, wherein the primary joining step includes carrying out friction stirring with only the stirring pin being brought into contact with both of the jacket body and the sealing body, or only the sealing body.

According to the manufacturing method, since a shoulder portion is not inserted into the sealing body as in the conventional art, a width of a plasticized region can be decreased as compared to the conventional art, and a pressing force which acts on the jacket body and the sealing body can be reduced. This makes it possible, even if a width of the side wall portion is decreased, to prevent the metal material from escaping from an inner corner portion constituted by the side wall portion and the sealing body, thus improving a degree of freedom of designing.

Also, according to the manufacturing method, since only the stirring pin is inserted into the jacket body and the sealing body, or into only the sealing body, a load exerted on a friction stirring apparatus can be reduced as compared to a case where the shoulder portion of the rotary tool is pressed into the jacket body and the sealing body. Moreover, since the load on the friction stirring apparatus can be reduced, the joining can be carried out for the overlapped portion at a deep location with no great load exerted on the friction stirring apparatus.

Moreover, preferably, the liquid-cooled jacket includes a supporting portion formed on any one, and abutting on the other, of the bottom portion of the jacket body and the back surface of the sealing body.

According to the manufacturing method, since the sealing body is supported by the supporting portion, the liquid-cooled jacket having a high resistance to deformation can be manufactured.

Moreover, preferably, the jacket body includes a supporting portion which stands on the bottom portion and abuts on the back surface of the sealing body, and the primary joining step includes carrying out friction stir welding for a second overlapped portion at which the back surface of the sealing body and an end surface of the supporting portion are overlapped each other, in addition to friction stir welding for the first overlapped portion.

According to the manufacturing method, since the friction stir welding is carried out for the second overlapped portion in addition to the first overlapped portion, the liquid-cooled jacket having an enhanced joining strength and a high resistance to deformation can be manufactured.

Moreover, preferably, the supporting portion is formed to continue from the side wall portion, and the primary joining step includes continuously carrying out the friction stir welding for the first overlapped portion and the second overlapped portion.

According to the manufacturing method, since the friction stir welding can be continuously carried out for the first overlapped portion and the second overlapped portion, the liquid-cooled jacket having a high resistance to deformation can be manufactured and a manufacturing cycle thereof can be improved.

Moreover, preferably, the supporting portion is formed to continue from one wall portion constituting the side wall portion and to be kept away from another wall portion facing the one wall portion, and the primary joining step includes: inserting the rotary tool into a position corresponding to the supporting portion, on a front surface of the sealing body; continuously carrying out the friction stir welding for the first overlapped portion and the second overlapped portion; and pulling out the rotary tool from the sealing body outside a plasticized region formed in the first overlapped portion.

According to the manufacturing method, since the friction stir welding can be continuously carried out for the first overlapped portion and the second overlapped portion, the liquid-cooled jacket having a high resistance to deformation can be manufactured and a manufacturing cycle thereof can be improved. Moreover, where the rotary tool is moved to the inside of the plasticized region, a problem occurs in that the metal material escapes from the inner corner portion constituted by the side wall portion and the sealing body. However, such a problem can be solved by moving the rotary tool to the outside of the plasticized region to pull out the rotary tool.

Moreover, preferably, the above manufacturing method further includes a repairing step which includes filling weld metal in a pull-out trace of the rotary tool remaining on the front surface of the sealing body, to repair the pull-out trace.

According to the manufacturing method, the pull-out trace disappears to allow the surface of the liquid-cooled jacket to be planarized.

Moreover, preferably, the primary joining step includes carrying out friction stir welding in a state in which a front surface side of the jacket body and a front surface side of the sealing body are in a convex shape.

There is a risk that heat input at the time of friction stir welding causes heat contraction to be generated in a plasticized region and the sealing body side of the liquid-cooled jacket to be deformed into a concave shape. However, according to the above manufacturing method, the liquid-cooled jacket can be planarized by bringing the jacket body and the sealing body into a convex shape beforehand and making use of the heat contraction.

Moreover, preferably, the primary joining step includes measuring beforehand an amount of deformation of at least one of the jacket body and the sealing body, and carrying out friction stir welding while adjusting an insertion depth of the stirring pin according to the amount of deformation.

According to the manufacturing method, even where friction stir welding is carried out with the jacket body and the sealing body being in a convex shape, the length and width of a plasticized region formed on the liquid-cooled jacket can be made constant.

Moreover, preferably, the primary joining step includes providing a cooling plate on the bottom portion of the jacket body, and carrying out friction stir welding while cooling the jacket body and the sealing body.

According to the manufacturing method, since frictional heat can be suppressed low, deformation of the liquid-cooled jacket due to heat contraction can be reduced.

Moreover, preferably, the primary joining step includes allowing a back surface of the bottom portion of the jacket body and the cooling plate to be brought into surface contact with each other.

According to the manufacturing method, since frictional heat can be suppressed low, deformation of the liquid-cooled jacket due to heat contraction can be reduced.

Moreover, preferably, a cooling flow passage allowing a cooling medium to flow in the cooling plate is formed to have a planar shape which follows at least a movement locus of the rotary tool.

According to the manufacturing method, since the portion for which the friction stirring is carried out can be intensively cooled, a cooling efficiency of the liquid-cooled jacket can be increased.

Moreover, preferably, a cooling flow passage allowing a cooling medium to flow in the cooling plate is constituted by a cooling pipe embedded in the cooling plate.

According to the manufacturing method, control of the cooling medium can be easily carried out.

Moreover, preferably, the primary joining step includes carrying out friction stir welding while allowing a cooling medium to flow within the jacket body to cool the jacket body and the sealing body.

According to the manufacturing method, since frictional heat can be suppressed low, deformation of the liquid-cooled jacket due to heat contraction can be reduced. Moreover, the jacket body per se can be utilized to cool the jacket body and the sealing body, without using a cooling plate or the like.

Moreover, preferably, the primary joining step includes rotating the rotary tool clockwise when moving the rotary tool clockwise around the recess, and rotating the rotary tool counterclockwise when moving the rotary tool counterclockwise around the recess.

In the friction stir welding, there is a possibility that joining defects are generated on the left side in the direction of forward movement of the rotary tool when rotated clockwise, or on the right side in the direction of forward movement of the rotary tool when rotated counterclockwise, and when such joining defects are formed at a location near the hollow portion of the liquid-cooled jacket, there is a risk that water-tightness and air-tightness are decreased. However, according to the above manufacturing method, joining defects caused by the friction stir welding are formed at a location away from the hollow portion of the liquid-cooled jacket, thus making it possible to suppress a decrease in water-tightness and air-tightness.

Moreover, preferably, the primary joining step includes allowing the rotary tool to move once along the first overlapped portion, then shifting the rotary tool to an outside of a plasticized region formed by a movement of first one-round, and allowing the rotary tool to further move once around the first overlapped portion to carry out re-stirring for the outside of the plasticized region, and when carrying out the re-stirring, the primary joining step includes rotating the rotary tool clockwise when moving the rotary tool clockwise around the recess, and rotating the rotary tool counterclockwise when moving the rotary tool counterclockwise around the recess.

According to the manufacturing method, since joining defects generated at the first one-round are stirred again at the time of friction stir welding of the second one-round, the joining defects can be repaired.

Moreover, preferably, the above manufacturing method further includes, prior to the primary joining step, a provisional joining step of carrying out provisional joining for the first overlapped portion.

According to the manufacturing method, an aperture can be prevented from being formed between the jacket body and the sealing body when carrying out the primary joining step.

Moreover, preferably, the liquid-cooled jacket includes a plurality of fins formed on at least one of the bottom portion of the jacket body and the back surface of the sealing body.

According to the manufacturing method, the liquid-cooled jacket having a high cooling efficiency can be manufactured.

Advantageous Effects of the Invention

With the method of manufacturing a liquid-cooled jacket according to the present invention, a degree of freedom of designing can be improved.

BRIEF DESCRIPTION OF DRAWINGS

FIGS. 4A and 4B are views showing the liquid-cooled jacket according to the first embodiment, in which FIG. 4A is a perspective view, and FIG. 4B is a cross-sectional view taken along the line I-I in FIG. 4A.

FIGS. 7A and 7B are views showing a primary joining step in the manufacturing method for the liquid-cooled jacket according to the first embodiment, in which FIG. 7A is a plan view, and FIG. 7B is a cross-sectional view taken along the line II-II in FIG. 7A.

FIGS. 8A and 8B are views showing the primary joining step in the manufacturing method for the liquid-cooled jacket according to the first embodiment, in which FIG. 8A is a plan view, and FIG. 8B is a cross-sectional view taken along the line III-III in FIG. 8A.

FIGS. 13A and 13B are views showing a fourth modification of the manufacturing method for the liquid-cooled jacket according to the first embodiment, in which FIG. 13A is a perspective view showing a table, and FIG. 13B is a perspective view showing a state in which the jacket body and the sealing body are fixed on the table.

FIGS. 17A and 17B are views showing the liquid-cooled jacket according to the third embodiment, in which FIG. 17A is a perspective view, and FIG. 17B is a cross-sectional view taken along the line I-I in FIG. 17A.

FIGS. 20A and 20B are views showing a primary joining step in the manufacturing method for the liquid-cooled jacket according to the third embodiment, in which FIG. 20A is a plan view, and FIG. 20B is a cross-sectional view taken along the line II-II in FIG. 20A.

FIGS. 21A and 21B are views showing the primary joining step in the manufacturing method for the liquid-cooled jacket according to the third embodiment, in which FIG. 21A is a plan view, and FIG. 21B is a cross-sectional view taken along the line III-III in FIG. 21A.

FIGS. 26A and 26B are views showing a fourth modification of the manufacturing method for the liquid-cooled jacket according to the third embodiment, in which FIG. 26A is a perspective view showing a table, and FIG. 26B is a perspective view showing a state in which the jacket body and the sealing body are fixed on the table.

FIGS. 29A and 29B are views showing a manufacturing method for a first conventional liquid-cooled jacket, in which FIG. 29A is an exploded perspective view, and FIG. 29B is a cross-sectional view of main parts showing a joining state.

FIGS. 30A and 30B are views showing a manufacturing method for a second conventional liquid-cooled jacket, in which FIG. 30A is an exploded perspective view, and FIG. 30B is a cross-sectional view of main parts showing a joining state.

DESCRIPTION OF EMBODIMENTS

First Embodiment

A liquid-cooled jacket according to a first embodiment of the present invention, and a method of manufacturing the liquid-cooled jacket, will be described in detail with reference to the drawings. First, description will be given of a primary joining rotary tool and a provisional joining rotary tool used in the present embodiment.

Figure 1A:
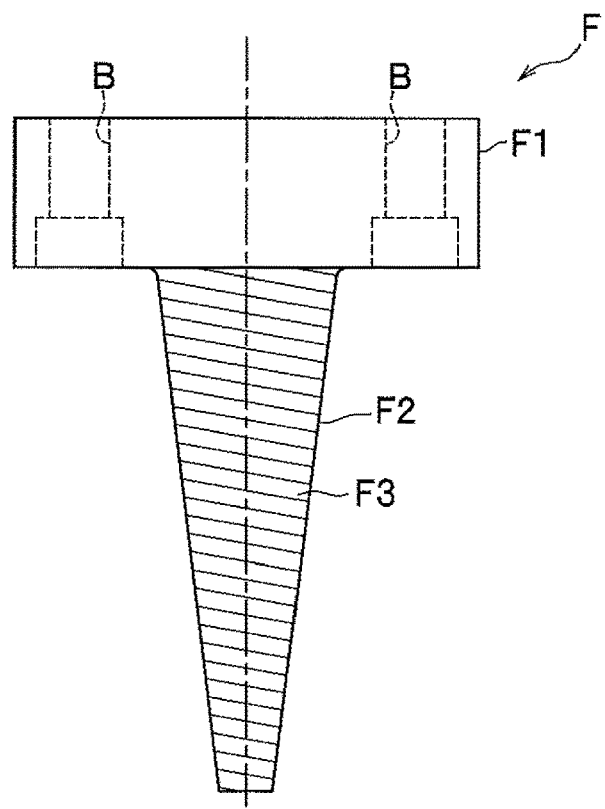
FIG. 1A is a side view showing a primary joining rotary tool used in embodiments of the present invention.

As shown in FIG. 1A, the primary joining rotary tool F is composed of a connection portion F1 and a stirring pin F2. The primary joining rotary tool F corresponds to a "rotary tool" set forth in the claims. The primary joining rotary tool F is formed, for example, of a tool steel. The connection portion F1 is a portion to be connected to a rotary shaft D of a friction stirring apparatus shown in FIG. 1B. The connection portion F1 has a cylindrical shape, and includes bolt holes B, B formed therein, to which bolts are fastened.

The stirring pin F2 hangs down from the connection portion F1, and is coaxial with the connection portion F1. The stirring pin F2 tapers off as it is away from the connection portion F1. The stirring pin F2 has a length greater than a plate thickness of a sealing body 3 to be described later. A spiral groove F3 is engraved on the outer circumferential surface of the stirring pin F2. In the present embodiment, the primary joining rotary tool F is adapted to be rotated clockwise, and thus the spiral groove F3 is formed counterclockwise from the base end toward the tip of the stirring pin F2. In other words, when tracing the spiral groove F3 from the base end to the tip, the spiral groove F3 is formed counterclockwise as viewed from above.

Note that, where the primary joining rotary tool F is rotated counterclockwise, the spiral groove F3 is preferably formed clockwise from the base end toward the tip of the stirring pin F2. In other words, when tracing the spiral groove F3 in this case from the base end to the tip, the spiral groove F3 is formed clockwise as viewed from above. The spiral groove F3 is set in this way to allow metal which is plasticized and fluidized during friction stirring, to be introduced through the spiral groove F3 to the tip side of the stirring pin F2. This makes it possible to reduce the amount of metal spilling out of metal members to be joined together (a jacket body 2 to be described later and the sealing body 3).

Figure 1B:
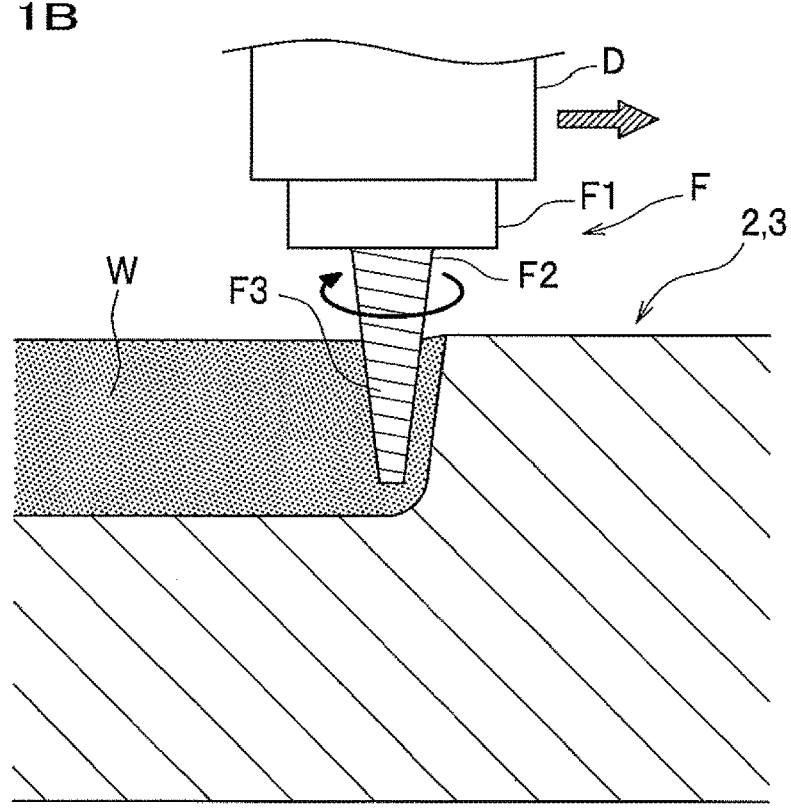
FIG. 1B is a schematic cross-sectional view showing the manner of joining by the primary joining rotary tool.

As shown in FIG. 1B, when friction stir welding is carried out by means of the primary joining rotary tool F, the primary joining rotary tool F is moved in such a manner that only the stirring pin F2 in a rotating state is inserted into the metal members to be joined together and the connection portion F1 is kept away from the metal members to be joined together. In other words, the friction stir welding is carried out with the base end portion of the stirring pin F2 being exposed. On a movement locus of the primary joining rotary tool F, a plasticized region W is formed in which metal stirred by friction becomes hardened.

Figure 2A:
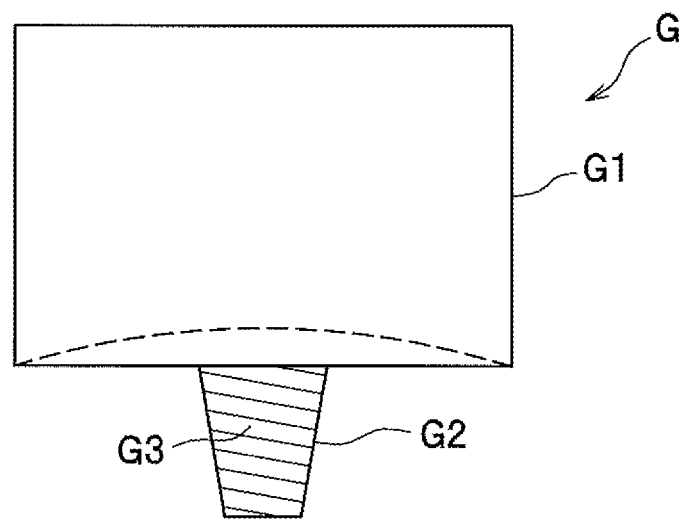
FIG. 2A is a side view showing a provisional joining rotary tool used in embodiments of the present invention.
Figure 2B:
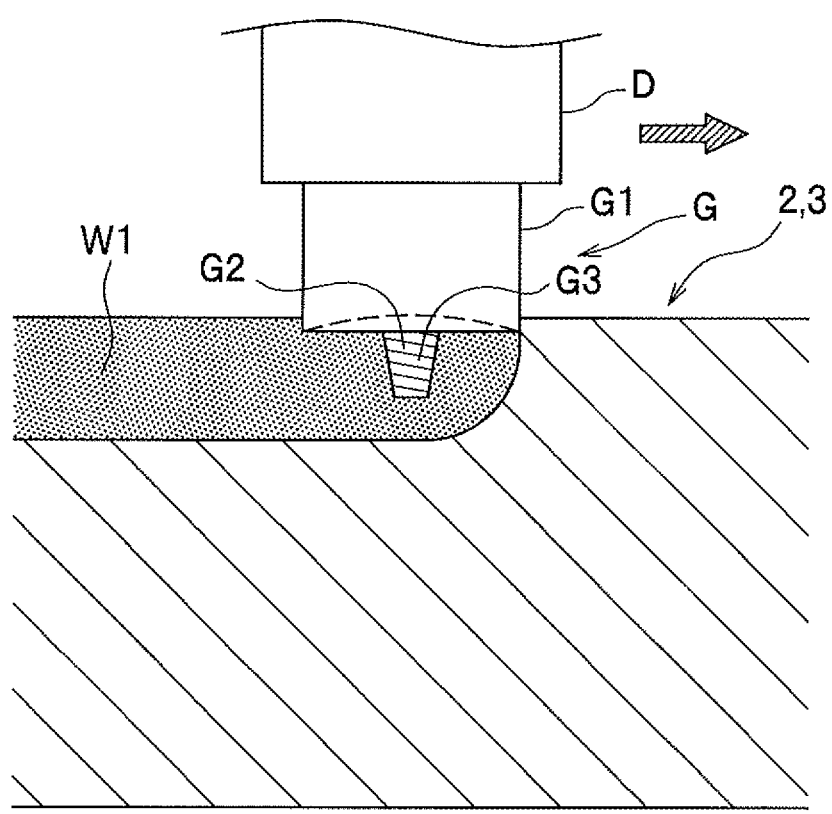
FIG. 2B is a schematic cross-sectional view showing the manner of joining by the provisional joining rotary tool.

As shown in FIG. 2A, the provisional joining rotary tool G is composed of a shoulder portion G1 and a stirring pin G2. The provisional joining rotary tool G is formed, for example, of a tool steel. As shown in FIG. 2B, the shoulder portion G1 is a portion to be connected to the rotary shaft D of the friction stirring apparatus, and is a portion to press the metal which is plasticized and fluidized. The shoulder portion G1 has a cylindrical shape. The shoulder portion G1 has a lower end surface which is concaved to prevent the fluidized metal from flowing outward.

The stirring pin G2 hangs down from the shoulder portion G1, and is coaxial with the shoulder portion G1. The stirring pin G2 tapers off as it is away from the shoulder portion G1. The stirring pin G2 has a spiral groove G3 engraved on the outer circumferential surface thereof.

As shown in FIG. 2B, when friction stir welding is carried out by means of the provisional joining rotary tool G, the provisional joining rotary tool G is moved in such a manner that the stirring pin G2 and a lower end of the shoulder portion G1, which are in a rotating state, are inserted into the metal members to be joined together. On a movement locus of the provisional joining rotary tool G, a plasticized region W1 is formed in which metal stirred by friction becomes hardened.

Figure 3:
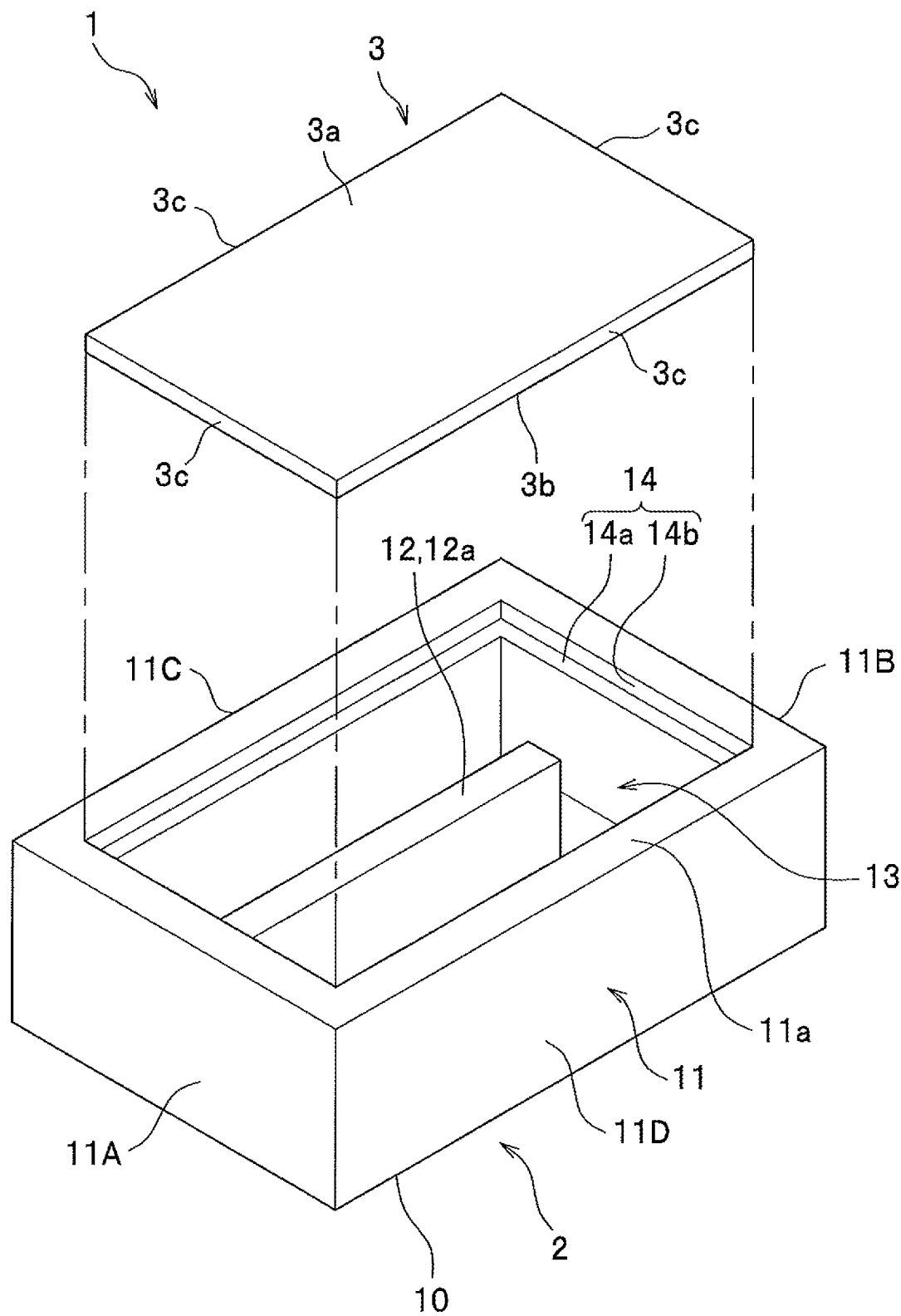
FIG. 3 is an exploded perspective view showing a liquid-cooled jacket according to a first embodiment of the present invention.

Next, description will be given of the liquid-cooled jacket according to the present embodiment. As shown in FIG. 3, the liquid-cooled jacket 1 according to the present embodiment is composed of the jacket body 2 and the sealing body 3. The jacket body 2 is a box-shaped body which opens upward.

The jacket body 2 includes a bottom portion 10, a side wall portion 11, and a supporting portion 12. The jacket body 2 is formed of metal capable of being stirred by friction. The bottom portion 10 has the form of a rectangular plate in planar view. The side wall portion 11 is provided to stand on the bottom portion 10, and has the form of a rectangular frame in planar view. The side wall portion 11 is composed of wall portions 11A, 11B, 11C and 11D, each having the same plate thickness. The wall portions 11A and 11B each form a short side portion, and face each other. Also, the wall portions 11C and 11D each form a long side portion, and face each other. The bottom portion 10 and the side wall portion 11 defines a recess 13 formed inside.

The side wall portion 11 has an end surface 11a on which a stepped portion 14 is formed along a circumferential edge of the opening of the jacket body 2. The stepped portion 14 is composed of a step bottom surface 14a, and a step side surface 14b rising from the step bottom surface 14a. The step bottom surface 14a is formed at a location below by one step from the end surface 11a.

The supporting portion 12 is provided to stand on the bottom portion 10 and has the form of a rectangular parallelepiped. The supporting portion 12 is provided to continue from the wall portion 11A and to extend toward the wall portion 11B. The wall portion 11B and a leading end of the supporting portion 12 are located with a predetermined space from each other. An end surface 12a of the supporting portion 12 and the step bottom surface 14a are flush with each other.

The sealing body 3 is a plate-like member having the form of a rectangle in planar view. A material for the sealing body 3 is not particularly limited, but in the present embodiment, the sealing body 3 is formed of the same material as the jacket body 2. The sealing body 3 is formed with a size such that it can be placed on the stepped portion 14 with no substantial gap. A plate thickness dimension of the sealing body 3 is substantially the same as a height dimension of the step side surface 14b.

Figure 4A:
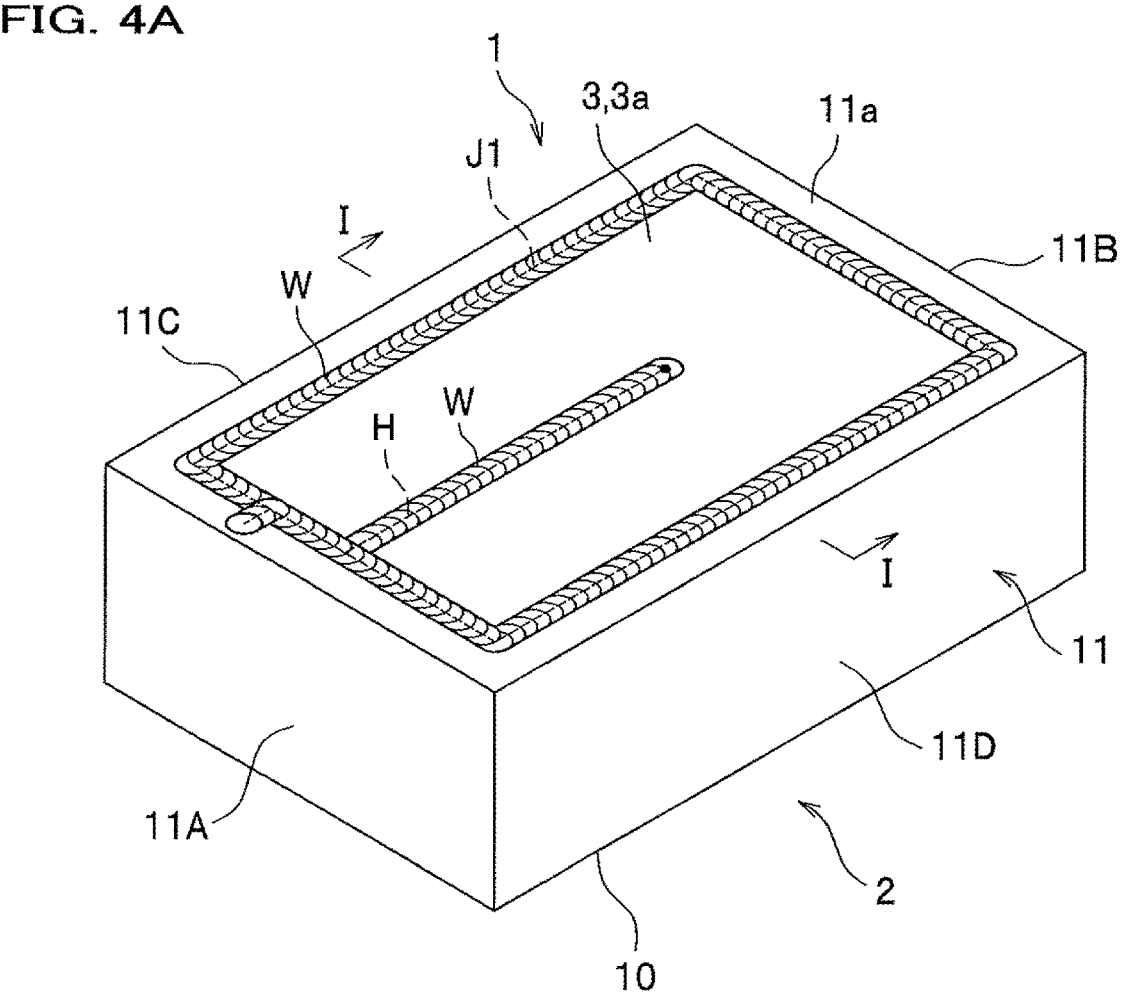
Figure 4B:
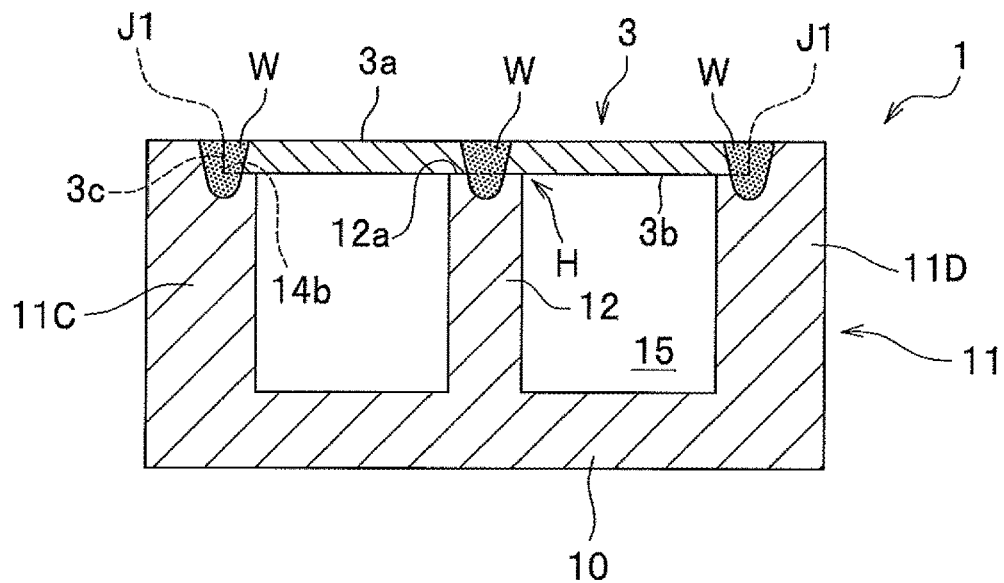

As shown in FIGS. 4A and 4B, the liquid-cooled jacket 1 is one obtained by joining together the jacket body 2 and the sealing body 3 by friction stirring to be integrated with each other. In the liquid-cooled jacket 1, a butted portion J1 at which the step side surface 14b and a sealing-body side surface 3c of the sealing body 3 are butted each other, and an overlapped portion H at which a back surface 3b of the sealing body 3 and the end surface 12a of the supporting portion 12 are overlapped each other, are continuously joined together by friction stirring. The plasticized region W is formed on a region where the friction stirring is carried out. The liquid-cooled jacket 1 includes a hollow portion 15 formed therein, in which heat transport fluid flows for transporting heat to the outside.

Next, description will be given of a manufacturing method for the liquid-cooled jacket according to the first embodiment. The manufacturing method for the liquid-cooled jacket includes a preparation step, a primary joining step, and a burring step.

Figure 5:
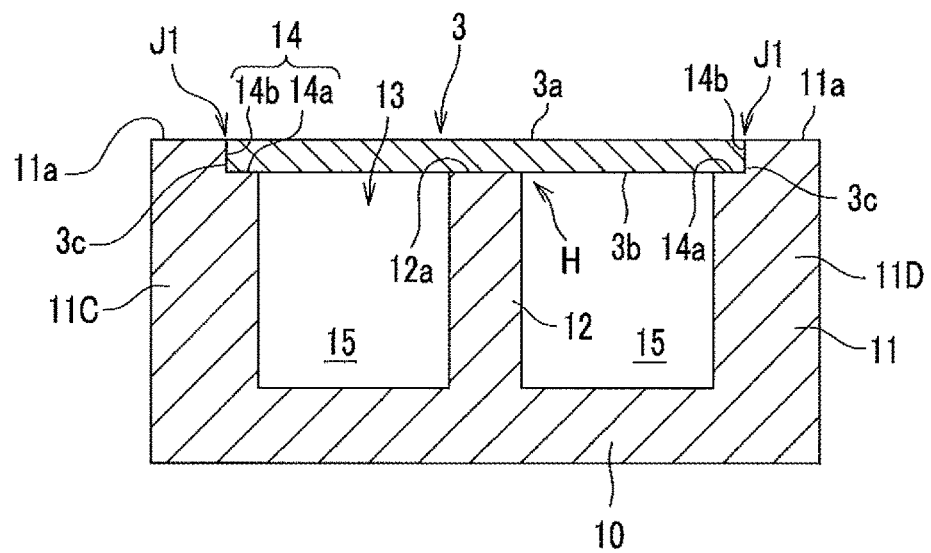
FIG. 5 is a cross-sectional view showing a placing step in a manufacturing method for the liquid-cooled jacket according to the first embodiment.

The preparation step includes a placing step, a fixing step, and a provisional joining step. As shown in FIG. 5, in the placing step, the sealing body 3 is placed on the stepped portion 14 of the jacket body 2 to allow the step side surface 14b of the stepped portion 14 and the sealing-body side surface 3c of the sealing body 3 to be butted each other. This allows the butted portion J1 to be formed along a circumferential edge of the sealing body 3 as shown in FIG. 5. Moreover, the back surface 3b of the sealing body 3 and the end surface 12a of the supporting portion 12 are overlapped each other to form the overlapped portion H. A front surface 3a of the sealing body 3 and the end surface 11a of the side wall portion 11 are flush with each other.

In the fixing step, the jacket body 2 is fixed on a table (not shown). The jacket body 2 is immovably fixed on the table by means of a fixing tool such as a clamp.

Figure 6:
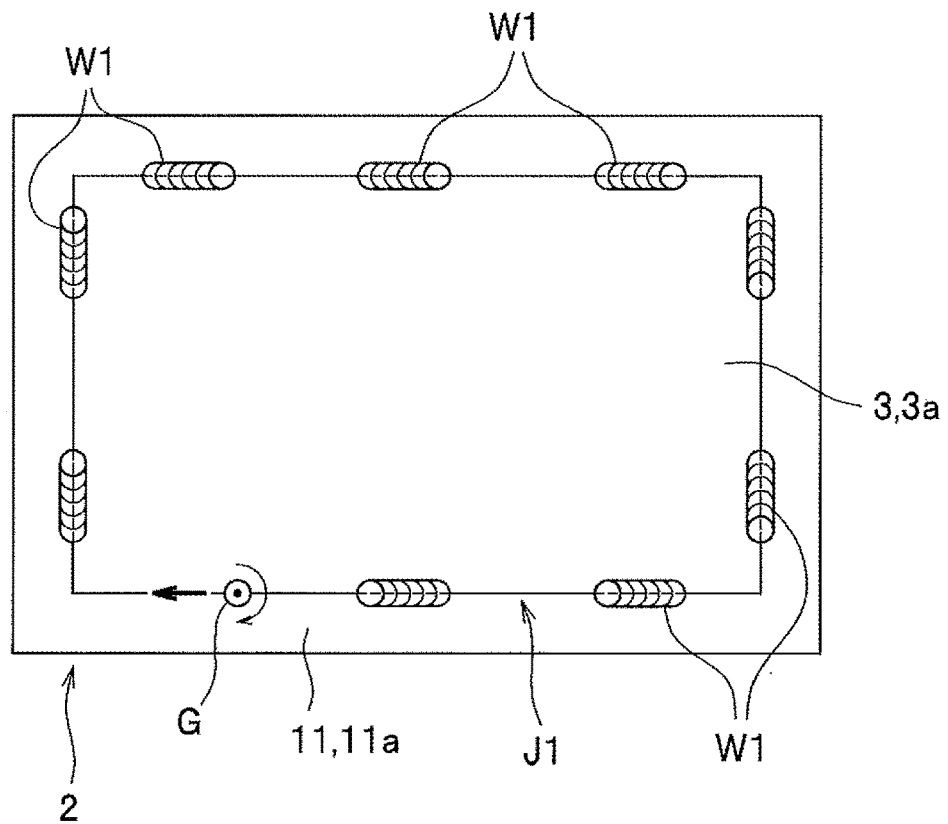
FIG. 6 is a plan view showing a provisional joining step in the manufacturing method for the liquid-cooled jacket according to the first embodiment.

In the provisional joining step, the jacket body 2 and the sealing body 3 are provisionally joined together. As shown in FIG. 6, in the provisional joining step, friction stir welding is carried out for the butted portion J1 by means of the provisional joining rotary tool G. In this process, the plasticized region W1 is formed on the movement locus of the provisional joining rotary tool G. The provisional joining may be continuously carried out, or may be intermittently carried out as shown in FIG. 6. The provisional joining rotary tool G is of a compact size, thus allowing thermal deformation of the jacket body 2 and the sealing body 3 during the provisional joining to be decreased.

Figure 7A:
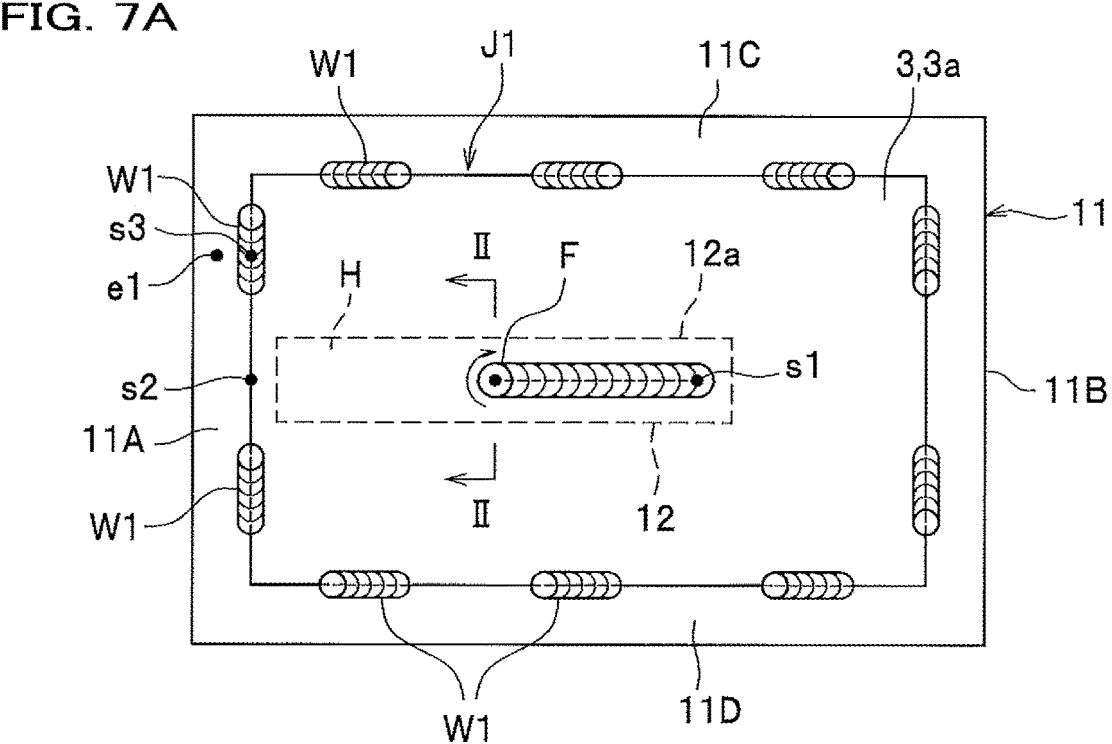
Figure 7B:
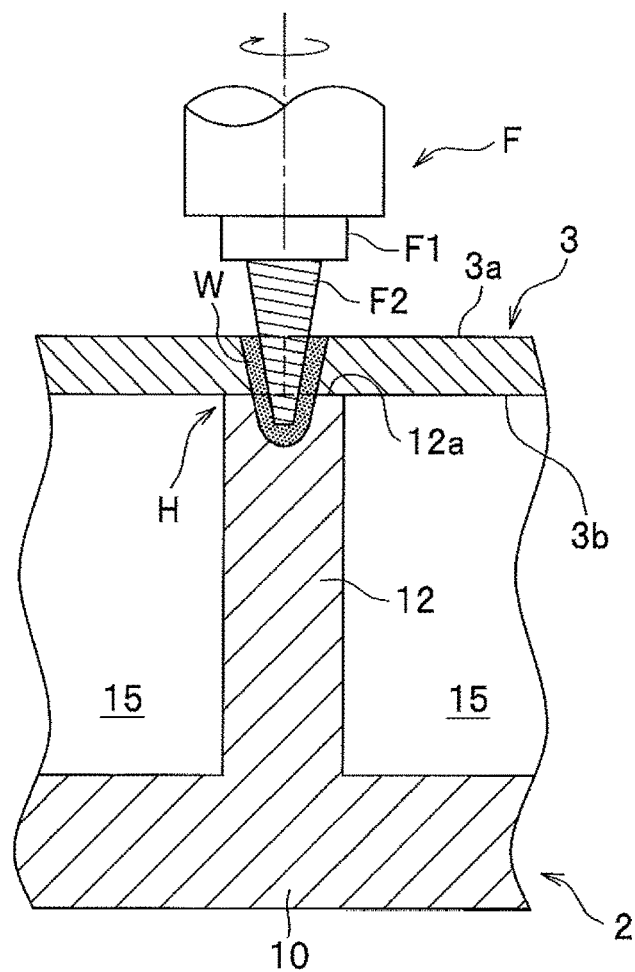

As shown in FIGS. 7A and 7B, the primary joining step is a step of carrying out friction stir welding by means of the primary joining rotary tool F. In the present embodiment, the primary joining step includes an overlapped portion joining step in which friction stir welding is carried out for the overlapped portion H, and a butted portion joining step in which friction stir welding is carried out for the butted portion J1.

As shown in FIG. 7A, in the overlapped portion joining step, the stirring pin F2 of the primary joining rotary tool F being rotated clockwise is inserted into a starting position s1 set at a position corresponding to the leading end of the supporting portion 12 (the leading end on the side of the wall portion 11B), on the front surface 3a of the sealing body 3. As shown in FIG. 7B, an insertion depth of the stirring pin F2 is set to allow the tip of the stirring pin F2 to reach the end surface 12a of the supporting portion 12, and set to allow only the stirring pin F2 to contact with the sealing body 3 and the supporting portion 12. Then, the primary joining rotary tool F is moved along the overlapped portion H with a constant height being kept. That is, the primary joining rotary tool F is moved along the supporting portion 12.

The overlapped portion joining step allows the back surface 3b of the sealing body 3 and the end surface 12a of the supporting portion 12 to be friction-stirred and joined together. In this process, the plasticized region W is formed on the movement locus of the primary joining rotary tool F.

Figure 8A:
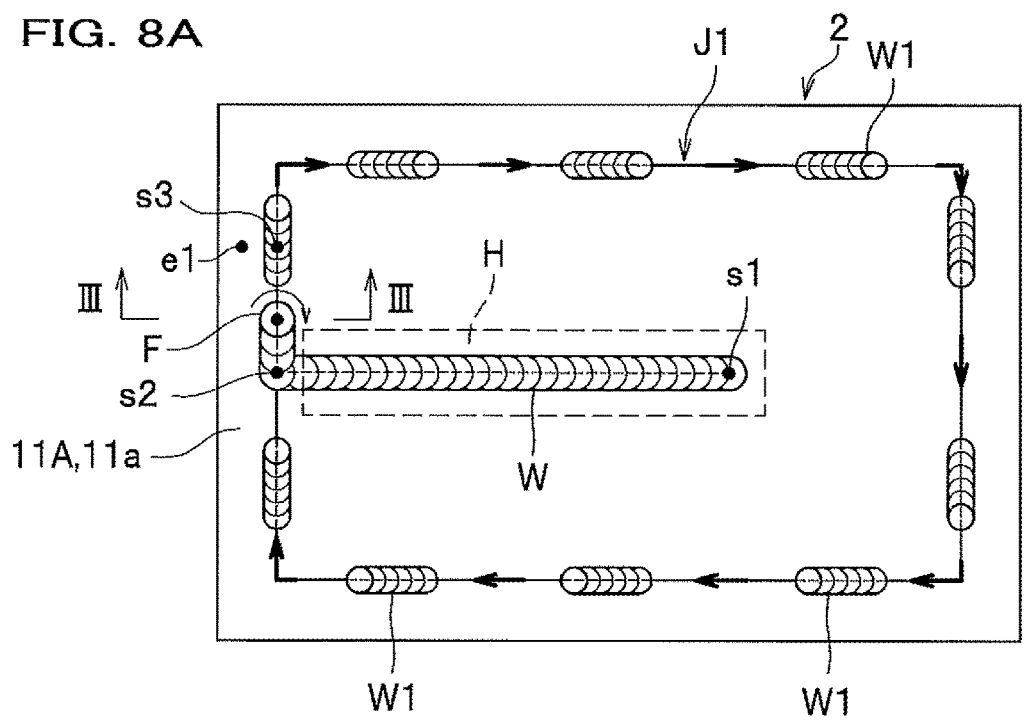

When the primary joining rotary tool F is moved to a first intermediate point s2 set on the butted portion J1, the process proceeds to the butted portion joining step without pulling out the primary joining rotary tool F. As shown in FIG. 8A, in the butted portion joining step, the primary joining rotary tool F is moved along the butted portion J1. That is, the primary joining rotary tool F is allowed to move once clockwise along the circumferential edge of the sealing body 3.

Figure 8B:
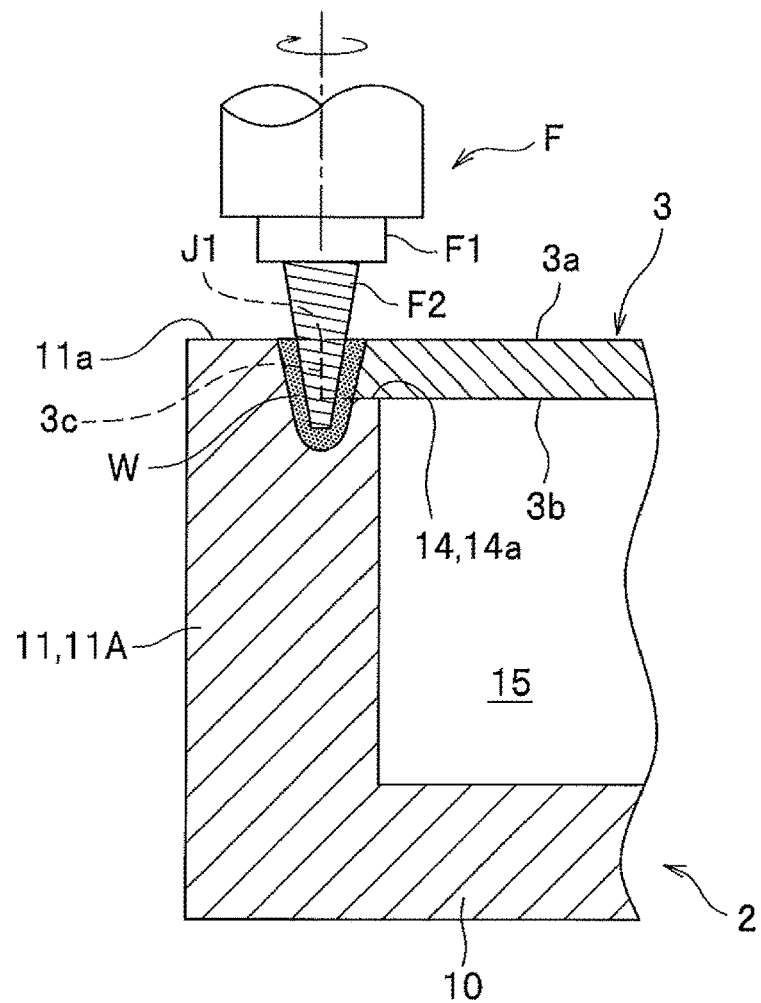

As shown in FIG. 8B, an insertion depth of the stirring pin F2 is set to allow the tip of the stirring pin F2 to reach the step bottom surface 14a, and set to allow only the stirring pin F2 to contact with the sealing body 3 and the side wall portion 11. Then, the primary joining rotary tool F is moved along the butted portion J1 with a constant height being kept.

Note that the insertion depth of the primary joining rotary tool F need not be always constant. For example, the insertion depth may be changed in the overlapped portion joining step and the butted portion joining step, respectively. The primary joining rotary tool F is not provided with a shoulder portion, thus making it possible to easily change the insertion depth thereof. Moreover, the insertion depth may be set to allow the tip of the primary joining rotary tool F not to contact with the end surface 12a of the supporting portion 12 and the step bottom surface 14a, and to allow at least the plasticized region W to reach the end surface 12a and the step bottom surface 14a.

Where the primary joining rotary tool F is moved clockwise around the sealing body 3 as in the present embodiment, the primary joining rotary tool F is preferably rotated clockwise. On the other hand, where the primary joining rotary tool F is moved counterclockwise around the sealing body 3, the primary joining rotary tool F is preferably rotated counterclockwise.

There is a possibility that joining defects are generated on the left side in the direction of forward movement of a rotary tool when rotated clockwise, or on the right side in the direction of forward movement of the rotary tool when rotated counterclockwise. When such joining defects are formed in the sealing body 3 having a thin plate thickness, there is a risk that water-tightness and air-tightness are decreased. However, the movement direction and rotation direction of the primary joining rotary tool F are set as described above, allowing joining defects caused by the friction stir welding to be formed in the jacket body 2 having a relatively great thickness, thus making it possible to suppress a decrease in water-tightness and air-tightness.

As shown in FIG. 8A, after the primary joining rotary tool F is allowed to move once along the butted portion J1, it is allowed to pass through the first intermediate point s2 to move to a second intermediate point s3. Then, when the primary joining rotary tool F is moved to a terminating position e1 set on the end surface 11a of the wall portion 11A, the primary joining rotary tool F is moved upward to be pulled out from the wall portion 11A.

Where a pull-out trace of the primary joining rotary tool F remains on the end surface 11a of the wall portion 11A after pulled out from the wall portion 11A, a repairing step for repairing the pull-out trace may be carried out. For the repairing step, for example, weld metal can be filled by buildup welding in the pull-out trace for the repairing. This can planarize the end surface 11a of the wall portion 11A.

Note that, where the primary joining rotary tool F is pulled out from the side wall portion 11, for example, the primary joining rotary tool F may be gradually moved upward while moving the primary joining rotary tool F on the end surface 11a of the side wall portion 11, to allow the insertion depth of the primary joining rotary tool F to be gradually reduced. This makes it possible to allow no pull-out trace after the primary joining step to remain on the end surface 11a, or if any, to reduce the pull-out trace.

In the burring step, burrs are removed, which have been exposed on the surfaces of the jacket body 2 and the sealing body 3 in the primary joining step. This allows the surfaces of the jacket body 2 and the sealing body 3 to be cleanly finished. Throughout the steps described above, the liquid-cooled jacket 1 shown in FIG. 4 is formed.

According to the manufacturing method for the liquid-cooled jacket described above, in the primary joining step, since the shoulder portion of the rotary tool is not inserted into the jacket body 2 and the sealing body 3 as in the conventional art, a width of the plasticized region can be decreased as compared to the conventional art, and a pressing force which acts on the jacket body 2 and the sealing body 3 can be reduced. The conventional manufacturing method has required the width of the step bottom surface 14a to be set to be greater than a radius of the shoulder portion of the rotary tool. However, according to the present embodiment, even if the width of the step bottom surface 14a is decreased, the metal material can be prevented from escaping from the inner corner portion constituted by the sealing body 3 and the side wall portion 11, thus improving a degree of freedom of designing.

Also, where the supporting portion 12 is provided in the jacket body 2 as in the present embodiment, the conventional rotary tool has required the width of the supporting portion 12 to be set to be greater than a diameter of the shoulder portion thereof. However, according to the present embodiment, even if the width of the supporting portion 12 is decreased, the metal material can be prevented from escaping from the inner corner portion constituted by the sealing body 3 and the supporting portion 12, thus improving a degree of freedom of designing.

Moreover, according to the manufacturing method for the liquid-cooled jacket according to the present embodiment, since only the stirring pin F2 is inserted into the jacket body 2 and the sealing body 3, a load exerted on the friction stirring apparatus can be reduced as compared to a case where the shoulder portion of the rotary tool is pressed into the jacket body and the sealing body, and operability of the primary joining rotary tool F is bettered. Also, since the load on the friction stirring apparatus can be reduced, the joining can be carried out down to a deep location of the butted portion J1, or for the overlapped portion H at a deep location, with no great load exerted on the friction stirring apparatus.

Moreover, the liquid-cooled jacket 1 according to the present embodiment is hard to be deformed because the supporting portion 12 is formed therein, which is provided to stand on the bottom portion 10 of the jacket body 2 and joined to the back surface 3b of the sealing body 3. In other words, the manufacturing method for the liquid-cooled jacket according to the present embodiment makes it possible to manufacture the liquid-cooled jacket 1 having a high resistance to deformation.

Moreover, the liquid-cooled jacket 1 according to the present embodiment allows the friction stir welding to be carried out for the overlapped portion H in addition to the butted portion J1. In other words, the manufacturing method for the liquid-cooled jacket according to the present embodiment makes it possible to manufacture the liquid-cooled jacket 1 having an enhanced joining strength and a high resistance to deformation.

Moreover, according to the manufacturing method for the liquid-cooled jacket according to the present embodiment, since the friction stir welding is continuously carried out for the butted portion J1 and the overlapped portion H, the manufacturing cycle can be improved.

Moreover, where the primary joining rotary tool F is pulled out on the sealing body 3 having a relatively small thickness, a problem occurs in that repairing for the pull-out trace is difficult and work for pulling out the rotary tool is not stabilized to generate defects in the sealing body 3. However, according to the manufacturing method for the liquid-cooled jacket according to the present embodiment, such a problem can be solved by pulling out the primary joining rotary tool F on the side wall portion 11 (wall portion 11A) having a great thickness as compared to the sealing body 3.

Moreover, according to the manufacturing method for the liquid-cooled jacket according to the present embodiment, since the provisional joining step is carried out prior to the primary joining step, an aperture can be prevented from being formed in the butted portion J1 in the primary joining step.

Although the method of manufacturing the liquid-cooled jacket according to the first embodiment of the present invention is described above, appropriate design changes or modification are possible within the scope not departing from the gist of the present invention. For example, in the primary joining step, the friction stir welding may be carried out while allowing a cooling medium to flow within the jacket body 2 to cool the jacket body 2 and the sealing body 3. This makes it possible to suppress the frictional heat, thus reducing deformation of the liquid-cooled jacket 1 due to heat contraction. Moreover, the jacket body 2 and the sealing body 3 per se can be utilized to cool the jacket body 2 and the sealing body 3, without separately using a cooling plate or a cooling unit.

Moreover, although the overlapped portion joining step and the butted portion joining step are continuously carried out in the present embodiment, they may be intermittently carried out. Also, after the butted portion joining step is carried out, the overlapped portion joining step may be carried out. Moreover, although the supporting portion 12 is formed to continue from the side wall portion 11 in the first embodiment, the form thereof is not limited to this example. For example, the supporting portion 12 may be formed to be kept away from the side wall portion 11. In this case, the overlapped portion joining step and the butted portion joining step are intermittently carried out. Moreover, the form of the supporting portion 12 may be of other forms, or a plurality of supporting portions may be provided. Furthermore, although the supporting portion 12 is provided in the jacket body 2 in the first embodiment, it may be provided on the sealing body 3. Alternatively, the supporting portion 12 may be omitted.

Moreover, although the provisional joining rotary tool G is used to carry out the provisional joining in the first embodiment, the primary joining rotary tool F may be used to carry out the provisional joining. This can save time and effort for exchanging one rotary tool for another. Also, the provisional joining step may be carried out by welding.

[First Modification]

Figure 9:
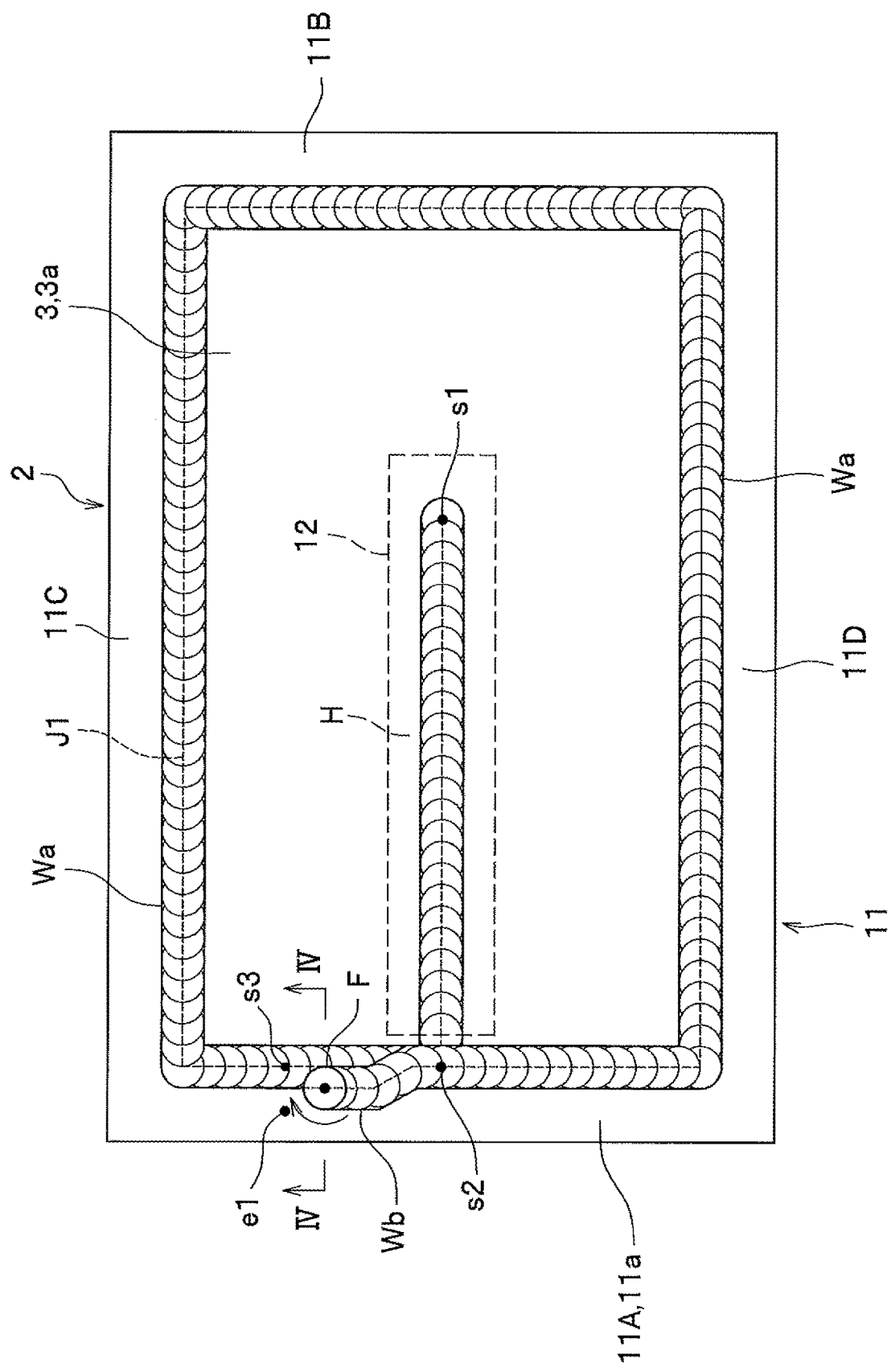
FIG. 9 is a plan view showing a first modification of the manufacturing method for the liquid-cooled jacket according to the first embodiment.

Next, description will be given of a manufacturing method for a liquid-cooled jacket according to a first modification of the first embodiment. As shown in FIG. 9, the first modification of the first embodiment is different from the first embodiment in that the primary joining rotary tool F is allowed to move twice around the sealing body 3 in the butted portion joining step. The first modification of the first embodiment will be described with a focus on configurations different from the first embodiment.

As shown in FIG. 9, the primary joining step in the first modification of the first embodiment includes an overlapped portion joining step and a butted portion joining step. The overlapped portion joining step is the same as that in the first embodiment. In the overlapped portion joining step, when the primary joining rotary tool F is moved to the first intermediate point s2, the process proceeds to the butted portion joining step without pulling out the primary joining rotary tool F.

In the butted portion joining step, the primary joining rotary tool F is allowed to move once clockwise around the sealing body 3 along the butted portion J1 while rotating the primary joining rotary tool F clockwise. Friction stir welding at first one-round allows a plasticized region Wa to be formed.

Figure 10:
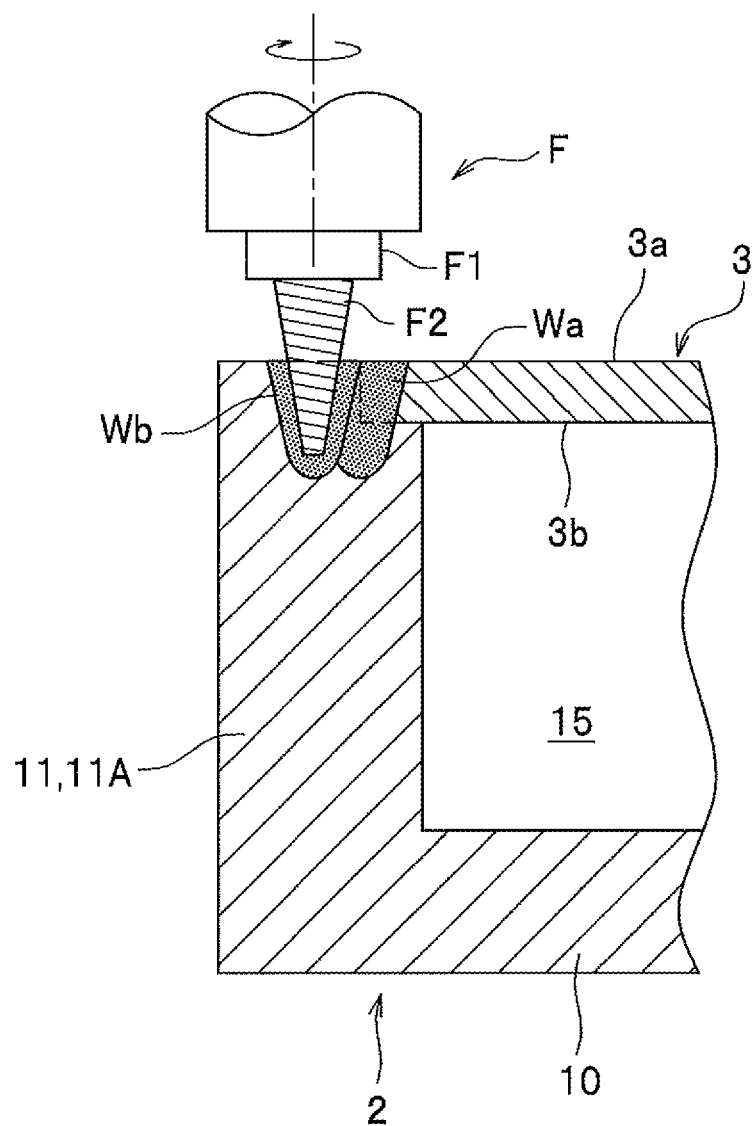
FIG. 10 is a cross-sectional view showing the first modification of the manufacturing method for the liquid-cooled jacket according to the first embodiment.

When the primary joining rotary tool F is allowed to move once around the sealing body 3 and passes through the first intermediate point s2, the primary joining rotary tool F is shifted to the outside (the side away from the sealing body 3) and the primary joining rotary tool F is allowed to further move once around the sealing body 3 with the outside of the plasticized region Wa and the stirring pin F2 overlapping with each other. As shown in FIG. 10, friction stir welding at second one-round allows a plasticized region Wb to be formed. In the present embodiment, a route of the primary joining rotary tool F is set so as to allow the rotary shaft of the primary joining rotary tool F at the second one-round to pass along an outer end of the plasticized region Wa.

When the primary joining rotary tool F is allowed to move twice around the sealing body 3 and is then moved to a line connecting the second intermediate point s3 (see FIG. 9) with the terminating position e1, the primary joining rotary tool F is pulled out from the side wall portion 11 at the terminating position e1.

According to the first modification of the first embodiment described above, the primary joining rotary tool F is allowed to move twice around the sealing body 3 in the primary joining step, thereby making it possible to improve the water-tightness and air-tightness of the liquid-cooled jacket 1. As described above, where the primary joining rotary tool F is moved clockwise around the sealing body 3 while being rotated clockwise, there is a risk that joining defects are formed outside the plasticized region Wa (the same is true in a case where the primary joining rotary tool F is moved counterclockwise around the sealing body 3 while being rotated counterclockwise). According to the first modification of the first embodiment, however, the friction stirring is carried out again for the outside of the plasticized region Wa, thereby allowing the joining defects to be repaired. This makes it possible to improve the water-tightness and air-tightness of the liquid-cooled jacket 1.

[Second Modification]

Figure 11:
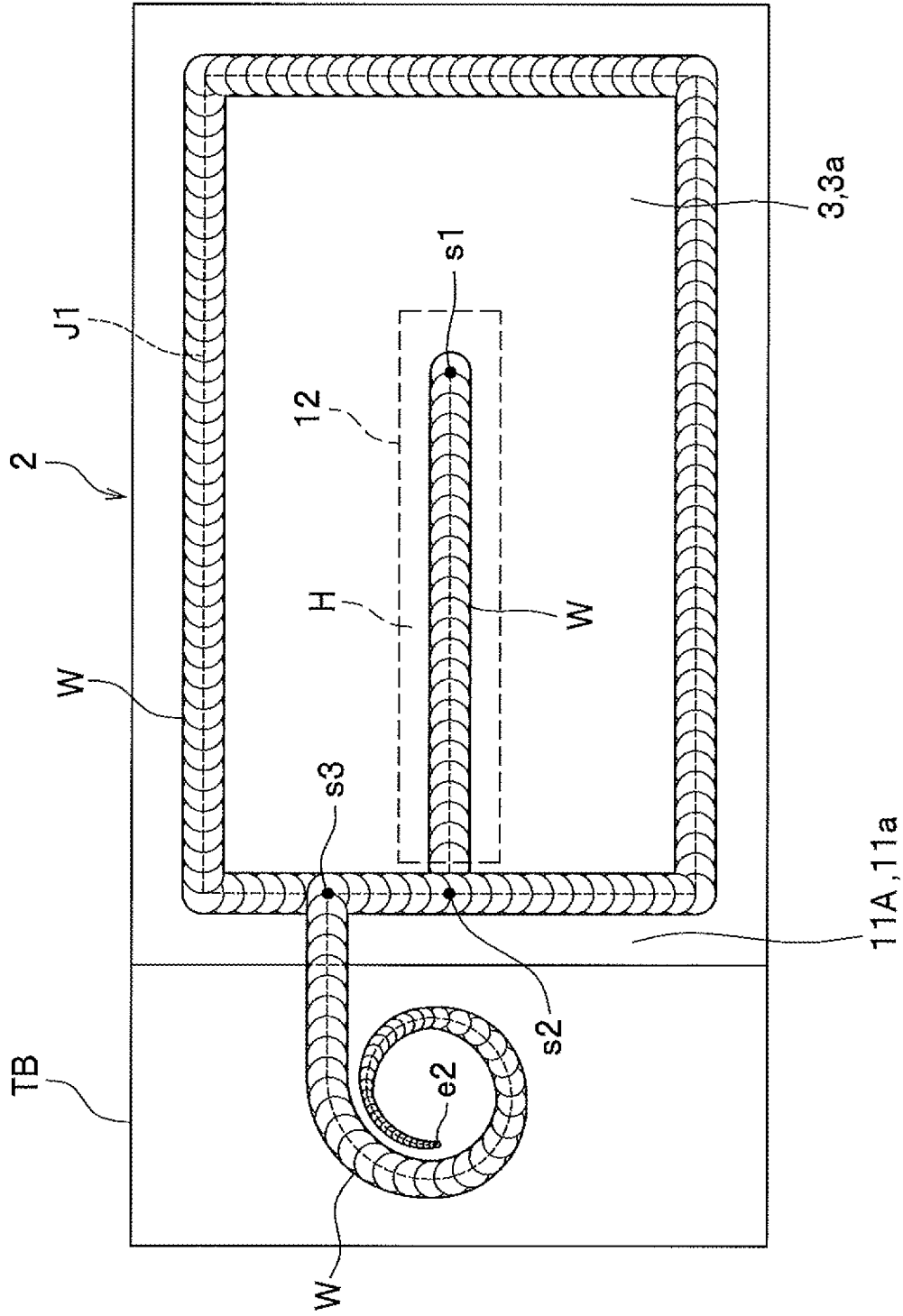
FIG. 11 is a plan view showing a second modification of the manufacturing method for the liquid-cooled jacket according to the first embodiment.

Next, description will be given of a manufacturing method for a liquid-cooled jacket according to a second modification of the first embodiment. As shown in FIG. 11, the second modification of the first embodiment is different from the first embodiment in that a tab material TB is used in the butted portion joining step. The second modification of the first embodiment will be described with a focus on configurations different from the first embodiment.

As shown in FIG. 11, the primary joining step in the second modification of the first embodiment includes a tab material attaching step, an overlapped portion joining step, a butted portion joining step, and a pulling-out step. The tab material attaching step is a step of attaching the tab material TB to the wall portion 11A of the jacket body 2. A material for the tab material TB is not particularly limited, but in the second modification of the first embodiment, the tab material TB is formed of the same material as the jacket body 2. The jacket body 2 and the tab material TB are joined together by welding or friction stir welding. A size of the tab material TB is not particularly limited, but in the second modification of the first embodiment, a width dimension of the tab material TB is set to be equal to a width dimension of the jacket body 2. A top surface of the tab material TB and the end surface 11a of the side wall portion 11 are flush with each other.

The overlapped portion joining step and the butted portion joining step are the same as those in the first embodiment. When the primary joining rotary tool F is allowed to move once around the sealing body 3 and is then moved to the second intermediate point s3, the process proceeds to the pulling-out step without pulling out the primary joining rotary tool F. The pulling-out step is a step of pulling out the primary joining rotary tool F from the tab material TB.

In the pulling-out step, the primary joining rotary tool F is moved from the second intermediate point s3 into the tab material TB to be moved in a spiral shape on the tab material TB. When moving the primary joining rotary tool F on the tab material TB, preferably, the insertion depth of the primary joining rotary tool F is allowed to be gradually reduced toward a terminating position e2 in the pulling-out step. When the primary joining rotary tool F is pulled out from the tab material TB at the terminating position e2, the tab material TB is cut off to be removed from the jacket body 2.

According to the second modification of the first embodiment, the tab material TB is used to allow no pull-out trace to remain on the jacket body 2, thus making it possible to omit a repairing step for repairing any pull-out trace. Note that the movement locus of the primary joining rotary tool F on the tab material TB is not limited to a spiral shape, but may be set to be a meandering shape or a linear shape. Moreover, the primary joining rotary tool F may be pulled out upward on the tab material TB without allowing the insertion depth of the primary joining rotary tool F to be gradually reduced.

[Third Modification]

Figure 12:
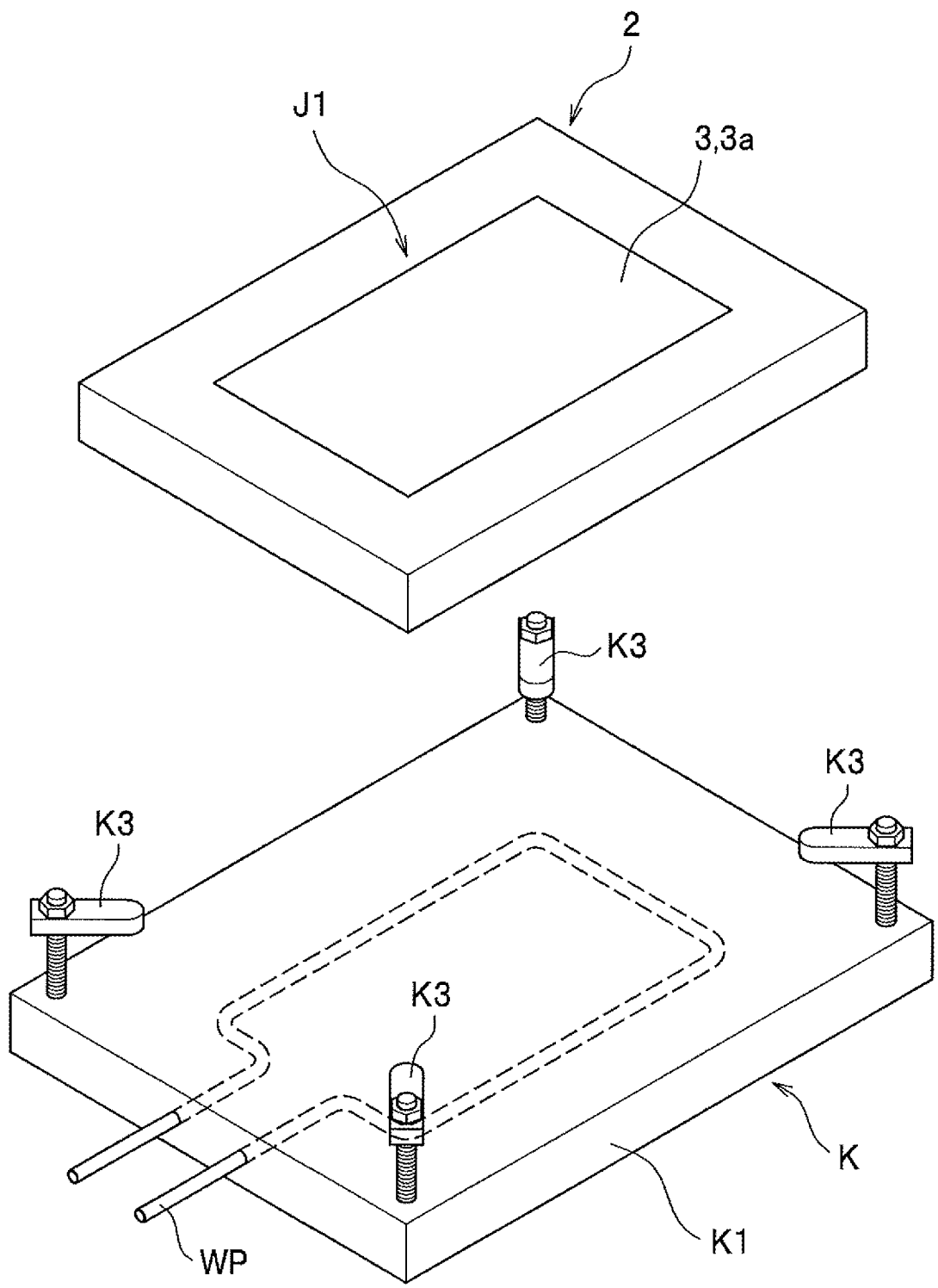
FIG. 12 is a perspective view showing a third modification of the manufacturing method for the liquid-cooled jacket according to the first embodiment.

Next, description will be given of a manufacturing method for a liquid-cooled jacket according to a third modification of the first embodiment. As shown in FIG. 12, the third modification of the first embodiment is different from the first embodiment in that the provisional joining step and the primary joining step are carried out using a cooling plate. The third modification of the first embodiment will be described with a focus on configurations different from the first embodiment.

As shown in FIG. 12, in the third modification of the first embodiment, the jacket body 2 is fixed on a table K when carrying out the fixing step. The table K is composed of a substrate K1 having the form of a rectangular parallelepiped, clamps K3 each formed in four corners of the substrate K1, and a cooling pipe WP disposed within the substrate K1. The table K is a member that immovably fixes the jacket body 2 thereon and serves as a "cooling plate" set forth in the claims.

The cooling pipe WP is a tubular member embedded within the substrate K1. The cooling pipe WP is adapted to allow a cooling medium for cooling the substrate K1 to flow therein. A location of the cooling pipe WP, namely the form of a cooling flow passage allowing the cooling medium to flow therein, is not particularly limited, but in the third modification of the first embodiment, is of a planar shape which follows the movement locus of the primary joining rotary tool F in the butted portion joining step. More specifically, the cooling pipe WP is disposed so that the cooling pipe WP and the butted portion J1 are nearly overlapped each other in planar view.

In the provisional joining step and the primary joining step in the third modification of the first embodiment, the jacket body 2 is first fixed on the table K and friction stir welding is then carried out while allowing a cooling medium to flow in the cooling pipe WP. This allows frictional heat generated in the friction stirring to be suppressed low, thus making it possible to reduce deformation of the liquid-cooled jacket 1 due to heat contraction. Also, in the third modification of the first embodiment, since the cooling flow passage is disposed to overlap with the butted portion J1 (the movement locus of the provisional joining rotary tool G and the primary joining rotary tool F) in planar view, the portion in which the frictional heat is generated can be intensively cooled. This can increase a cooling efficiency of the liquid-cooled jacket. Moreover, since the cooling pipe WP is disposed to allow a cooling medium to flow therein, control of the cooling medium can be easily carried out. Furthermore, since the table K (cooling plate) and the jacket body 2 are brought into surface contact with each other, the cooling efficiency can be further increased.

Note that, in addition to cooling the jacket body 2 and the sealing body 3 using the table K (cooling plate), the friction stir welding may be carried out while allowing a cooling medium to flow within the jacket body 2. Moreover, the cooling pipe WP may be disposed at a location corresponding to the overlapped portion H.

[Fourth Modification]

Figure 13A:
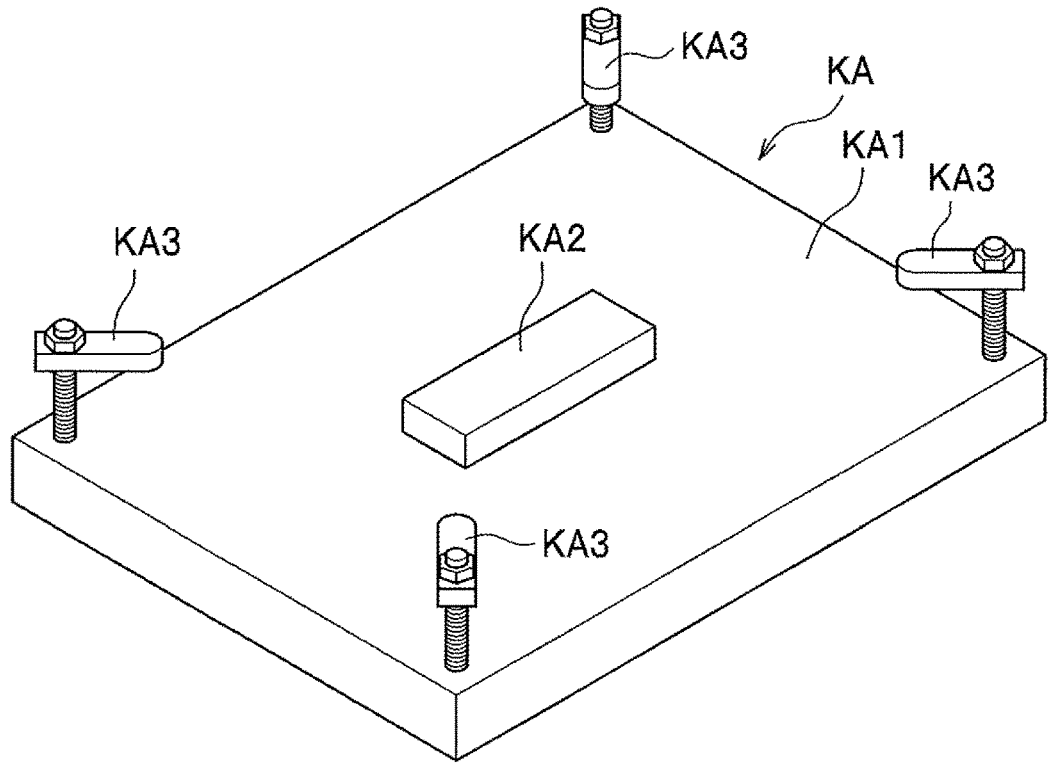
Figure 13B:
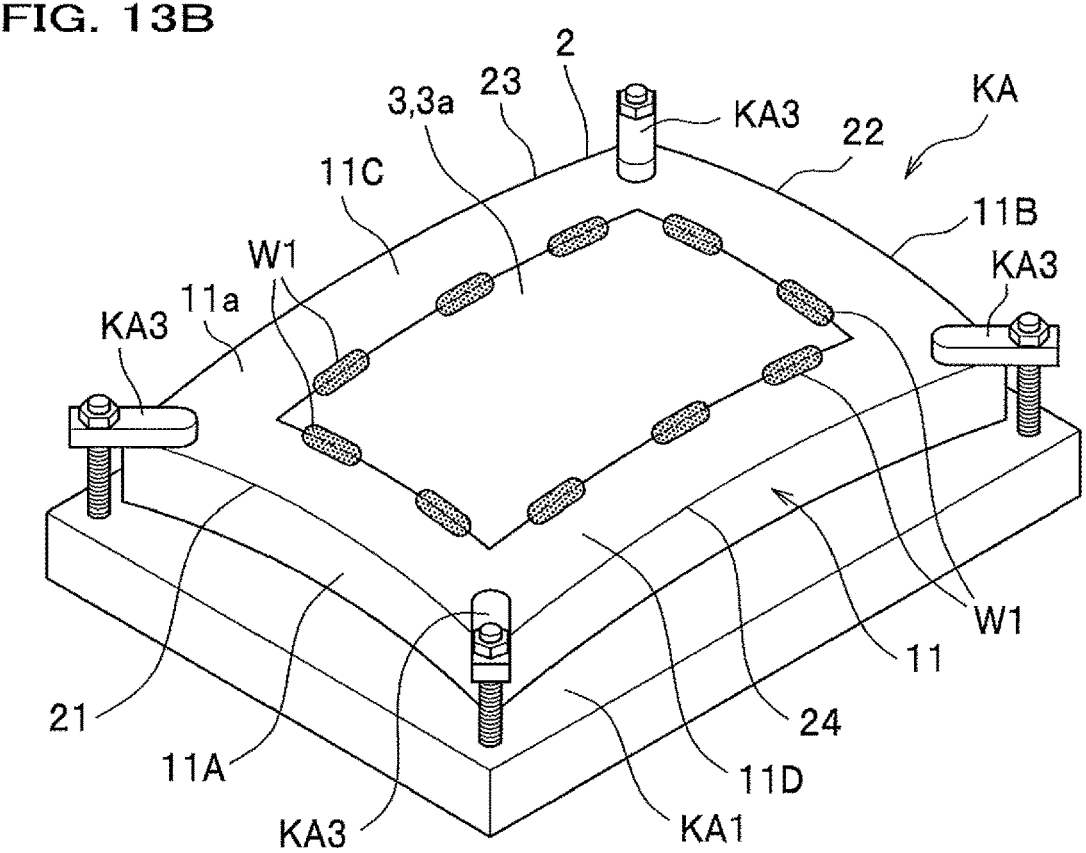

Next, description will be given of a manufacturing method for a liquid-cooled jacket according to a fourth modification of the first embodiment. As shown in FIGS. 13A and 13B, the fourth modification of the first embodiment is different from the first embodiment in that the primary joining step is carried out in a state in which the front surface side of the jacket body 2 and the front surface 3a of the sealing body 3 are curved to have a convex shape. The fourth modification of the first embodiment will be described with a focus on configurations different from the first embodiment.

As shown in FIG. 13A, a table KA is employed in the fourth modification of the first embodiment. The table KA is composed of a substrate KA1 having the form of a rectangular parallelepiped, a spacer KA2 formed in the center of the substrate KA1, and clamps KA3 each formed in four corners of the substrate KA1. The spacer KA2 may be formed integrally with or separately from the substrate KA1.

In the fixing step in the fourth modification of the first embodiment, the jacket body 2 and the sealing body 3 integrated with each other in the provisional joining step are fixed on the table KA by means of the clamps KA3. As shown in FIG. 13B, when the jacket body 2 and the sealing body 3 are fixed on the table KA, they are curved to allow the bottom portion 10 and the end surface 11a of the jacket body 2 and the front surface 3a of the sealing body 3 to have an upwardly convex shape. More specifically, the jacket body 2 and the sealing body 3 are curved to allow a first side portion 21 of the wall portion 11A of the jacket body 2, a second side portion 22 of the wall portion 11B, a third side portion 23 of the wall portion 11C, and a fourth side portion 24 of the wall portion 11D to exhibit a curved line.

In the primary joining step in the fourth modification of the first embodiment, the overlapped portion joining step and the butted portion joining step are carried out by means of the primary joining rotary tool F. In the overlapped portion joining step and the butted portion joining step, the amount of deformation of at least one of the jacket body 2 and the sealing body 3 is measured beforehand and the friction stir welding is then carried out while adjusting the insertion depth of the stirring pin F2 according to the amount of deformation. More specifically, the primary joining rotary tool F is moved to allow the movement locus thereof to trace a curved line along the curved surfaces of the end surface 11a of the jacket body 2 and the front surface 3a of the sealing body 3. This makes it possible to keep the depth and width of the plasticized region W1 constant.

There is a risk that heat input at the time of friction stir welding causes heat contraction to be generated in the plasticized region W1 and the sealing body 3 of the liquid-cooled jacket 1 to be deformed into a concave shape. However, according to the fourth modification of the first embodiment, since the jacket body 2 and the sealing body 3 are fixed in the form of a convex shape beforehand so as to allow a tensile stress to act on the end surface 11a and the front surface 3a when carrying out the primary joining step, the liquid-cooled jacket 1 can be planarized by making use of the heat contraction after the friction stir welding. Moreover, where the primary joining step is carried out by means of the conventional rotary tool, a problem occurs in that, when the jacket body 2 and the sealing body 3 are warped in the form of a convex shape, the shoulder portion of the rotary tool comes in contact with the jacket body 2 and the sealing body 3 and thus operability of the rotary tool is decreased. However, according to the fourth modification of the first embodiment, since the primary joining rotary tool F has no shoulder portion, operability of the primary joining rotary tool F is bettered even if the jacket body 2 and the sealing body 3 are warped in the form of a convex shape.

Note that the measurement of the amount of deformation of the jacket body 2 and the sealing body 3 can be made using a known height detecting device. Also, a friction stirring apparatus equipped with, for example, a detecting device that detects a height from the table KA to at least one of the jacket body 2 and the sealing body 3, may be used to carry out the primary joining step while detecting the amount of deformation of the jacket body 2 or the sealing body 3.

Moreover, although the jacket body 2 and the sealing body 3 are curved to allow all of the first to fourth side portions 21 to 24 to exhibit a curved line in the fourth modification of the first embodiment, the form of curves is not limited to this example. For example, the jacket body 2 and the sealing body 3 may be curved to allow the first side portion 21 and the second side portion 22 to exhibit a straight line and to allow the third side portion 23 and the fourth side portion 24 to exhibit a curved line. Also, for example, the jacket body 2 and the sealing body 3 may be curved to allow the first side portion 21 and the second side portion 22 to exhibit a curved line and to allow the third side portion 23 and the fourth side portion 24 to exhibit a straight line.

Moreover, although the position of height of the stirring pin F2 is changed according to the amount of deformation of the jacket body 2 or the sealing body 3 in the fourth modification of the first embodiment, the primary joining step may be carried out with the height of the stirring pin F2 relative to the table KA being kept constant.

Moreover, the spacer KA2 may have any shape or form as long as the jacket body 2 and the sealing body 3 can be fixed to allow the front surface sides thereof to have a convex shape. Also, the spacer KA2 may be omitted as long as the jacket body 2 and the sealing body 3 can be fixed to allow the front surface sides thereof to have a convex shape. Moreover, although the jacket body 2 and the sealing body 3 are deformed to allow the front surface sides thereof to have a convex shape in the fixing step in the present embodiment, the jacket body 2 and the sealing body 3 of which the front surface sides have a convex shape may be shaped by die-casting or the like beforehand and the shaped jacket body 2 and the sealing body 3 may be fixed on the table KA. Even this method makes it possible to make use of heat contraction generated in the primary joining step to planarize the liquid-cooled jacket.

[Fifth Modification]

Figure 14:
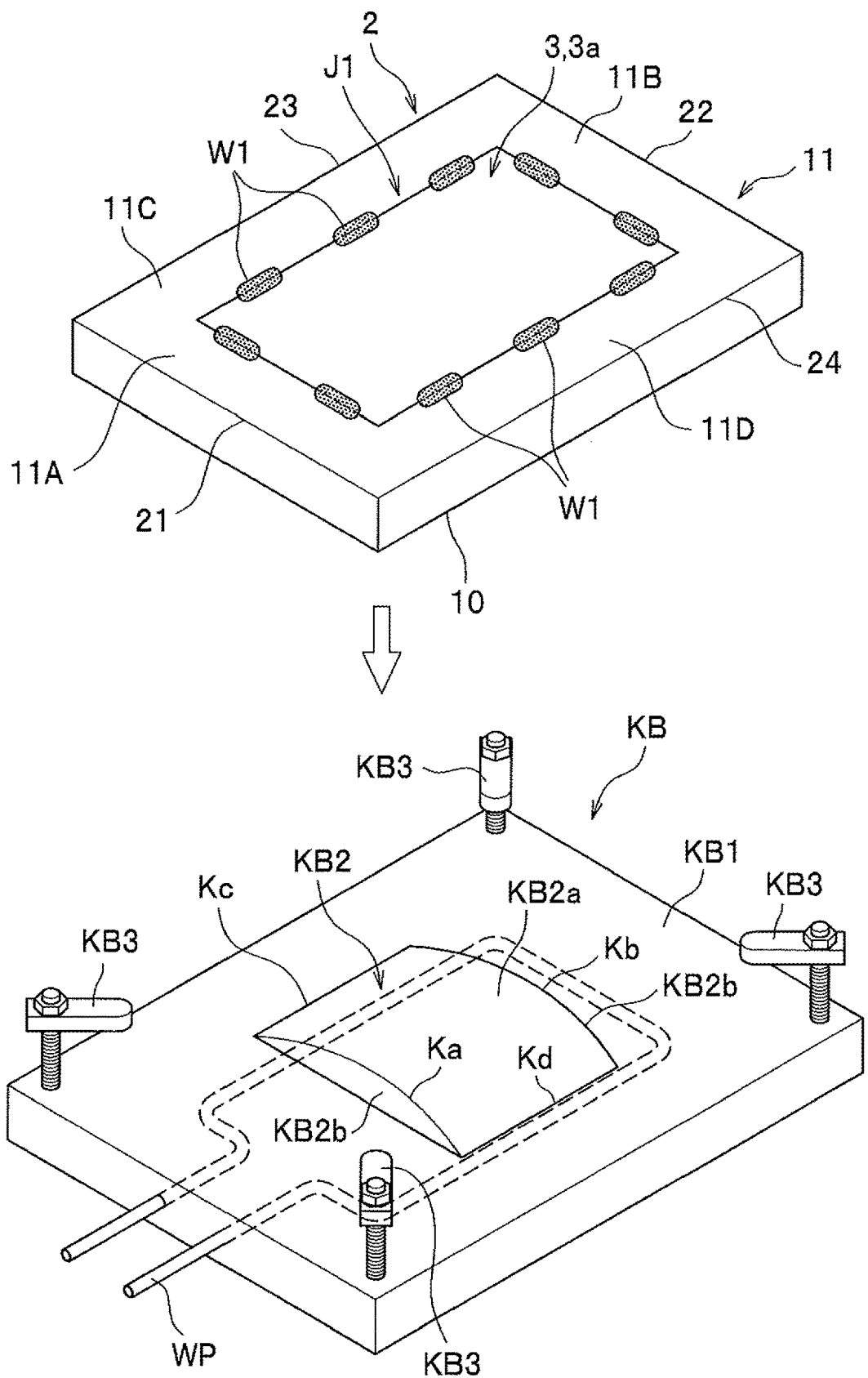
FIG. 14 is a perspective view showing a fifth modification of the manufacturing method for the liquid-cooled jacket according to the first embodiment.

Next, description will be given of a manufacturing method for a liquid-cooled jacket according to a fifth modification of the first embodiment. As shown in FIG. 14, the fifth modification of the first embodiment is different from the first embodiment in that the primary joining step is carried out in a state in which the jacket body 2 and the sealing body 3 are curved to have a convex shape while using a cooling plate. The fifth modification of the first embodiment will be described with a focus on configurations different from the first embodiment.

As shown in FIG. 14, in the fifth modification of the first embodiment, the jacket body 2 is fixed on a table KB when carrying out the fixing step. The table KB is composed of a substrate KB1 in the form of a rectangular parallelepiped, a spacer KB2 disposed in the center of the substrate KB1, clamps KB3 each formed in four corners of the substrate KB1, and a cooling pipe WP embedded inside the substrate KB1. The table KB is a member that immovably fixes the jacket body 2 thereon and serves as a "cooling plate" set forth in the claims.

The spacer KB2 is composed of a curved surface KB2a curved to have an upwardly convex shape, and elevation surfaces KB2b, KB2b formed at both ends of the curved surface KB2a and rising from the substrate KB1. The spacer KB2 has a first side portion Ka and a second side portion Kb which exhibit a curved line, and a third side portion Kc and a fourth side portion Kd which exhibit a straight line.

The cooling pipe WP is a tubular member embedded within the substrate KB1. The cooling pipe WP is adapted to allow a cooling medium for cooling the substrate KB1 to flow therein. A location of the cooling pipe WP, namely the form of a cooling flow passage allowing the cooling medium to flow therein, is not particularly limited, but in the fifth modification of the first embodiment, is of a planar shape which follows the movement locus of the primary joining rotary tool F in the butted portion joining step. More specifically, the cooling pipe WP is disposed so that the cooling pipe WP and the butted portion J1 are nearly overlapped each other in planar view.

In the fixing step in the fifth modification of the first embodiment, the jacket body 2 and the sealing body 3 integrated with each other in the provisional joining step are fixed on the table KB by means of the clamps KB3. More specifically, the jacket body 2 and the sealing body 3 are fixed on the table KB to allow the back surface of the bottom portion 10 of the jacket body 2 to be brought into surface contact with the curved surface KB2a. When the jacket body 2 and the sealing body 3 are fixed on the table KB, they are curved to allow the front surface side of the jacket body 2 and the front surface 3a of the sealing body 3 to have an upwardly convex shape. More specifically, the jacket body 2 and the sealing body 3 are curved to allow the first side portion 21 of the wall portion 11A of the jacket body 2 and the second side portion 22 of the wall portion 11B to exhibit a curved line, and to allow the third side portion 23 of the wall portion 11C and the fourth side portion 24 of the wall portion 11D to exhibit a straight line.

In the primary joining step in the fifth modification of the first embodiment, the overlapped portion joining step and the butted portion joining step are carried out by means of the primary joining rotary tool F. In the overlapped portion joining step and the butted portion joining step, the amount of deformation of at least one of the jacket body 2 and the sealing body 3 is measured beforehand and the friction stir welding is then carried out while adjusting the insertion depth of the stirring pin F2 according to the amount of deformation. More specifically, the primary joining rotary tool F is moved to allow the movement locus thereof to trace a curved line along the curved surfaces of the end surface 11a of the jacket body 2 and the front surface 3a of the sealing body 3. This makes it possible to keep the depth and width of the plasticized region W1 constant.

There is a risk that heat input at the time of friction stir welding causes heat contraction to be generated in the plasticized region W1 and the sealing body 3 of the liquid-cooled jacket 1 to be deformed into a concave shape. However, according to the fifth modification of the first embodiment, since the jacket body 2 and the sealing body 3 are fixed in the form of a convex shape beforehand so as to allow a tensile stress to act on the end surface 11a and the front surface 3a when carrying out the primary joining step, the liquid-cooled jacket 1 can be planarized by making use of the heat contraction after the friction stir welding.

Moreover, in the fifth modification of the first embodiment, the curved surface KB2a of the spacer KB2 is brought into surface contact with the back surface which is in a concave shape, of the bottom portion 10 of the jacket body 2. This makes it possible to carry out the friction stir welding while cooling the jacket body 2 and the sealing body 3 more effectively. Since the frictional heat generated in the friction stir welding can be suppressed low, deformation of the liquid-cooled jacket due to heat contraction can be reduced. This makes it possible to reduce a curvature of the jacket body 2 and the sealing body 3 when the jacket body 2 and the sealing body 3 are formed to have a convex shape prior to the primary joining step.

Note that the measurement of the amount of deformation of the jacket body 2 and the sealing body 3 can be made using a known height detecting device. Also, a friction stirring apparatus equipped with, for example, a detecting device that detects a height from the table KB to at least one of the jacket body 2 and the sealing body 3, may be used to carry out the primary joining step while detecting the amount of deformation of the jacket body 2 or the sealing body 3.

Moreover, although the jacket body 2 and the sealing body 3 are curved to allow the first side portion 21 and the second side portion 22 to exhibit a curved line in the fifth modification of the first embodiment, the form of curves is not limited to this example. For example, the spacer KB2 having a spherical surface may be formed to allow the back surface of the bottom portion 10 of the jacket body 2 to be brought into surface contact with the spherical surface. In this case, when the jacket body 2 is fixed on the table KB, all of the first to fourth side portions 21 to 24 exhibit a curved line.

Moreover, although the position of height of the stirring pin F2 is changed according to the amount of deformation of the jacket body 2 or the sealing body 3 in the fifth modification of the first embodiment, the primary joining step may be carried out with the height of the stirring pin F2 relative to the table KB being kept constant.

Second Embodiment

Figure 15:
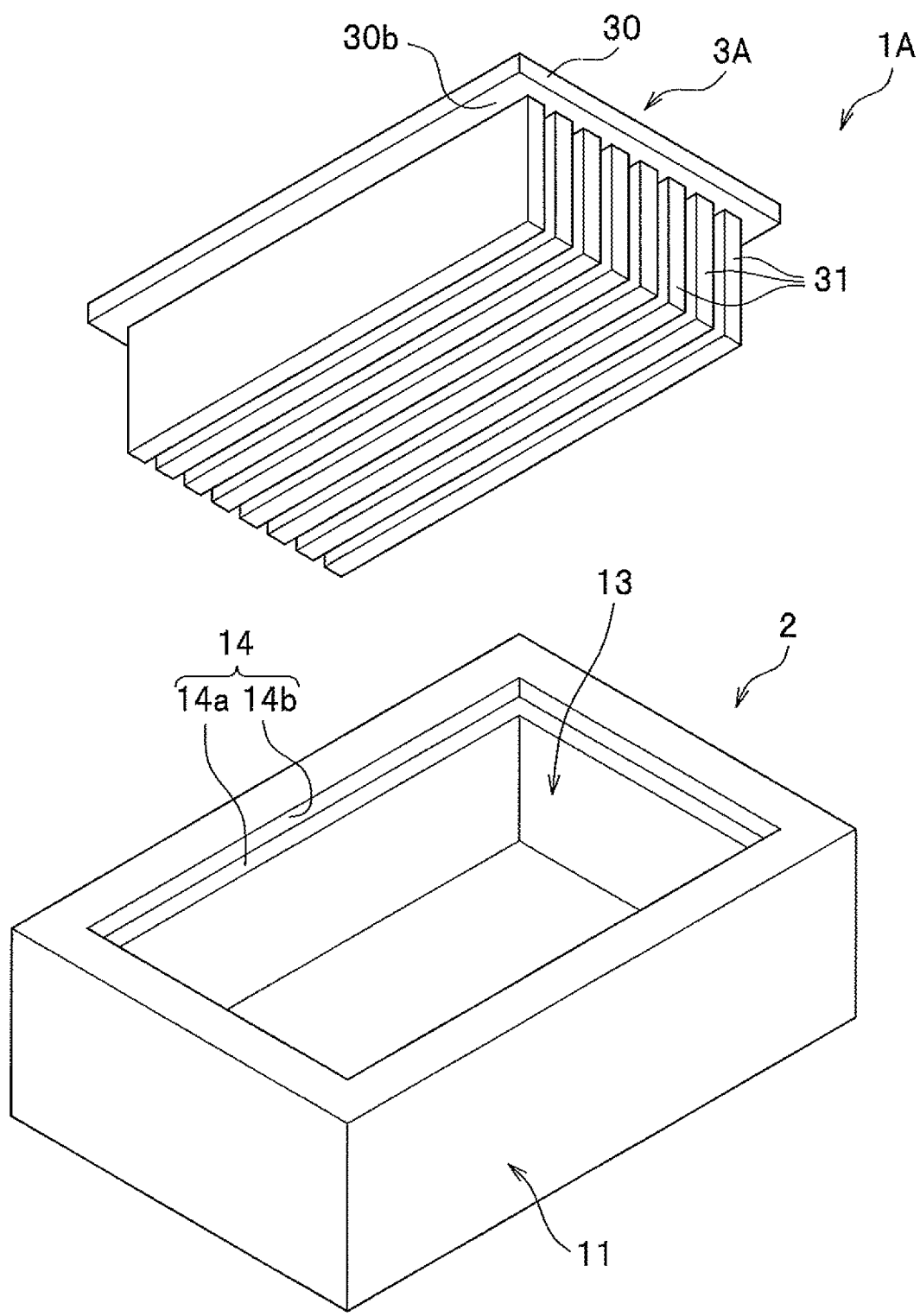
FIG. 15 is an exploded perspective view showing a liquid-cooled jacket according to a second embodiment of the present invention.

Next, description will be given of a method of manufacturing a liquid-cooled jacket according to a second embodiment of the present invention. As shown in FIG. 15, the second embodiment is different from the first embodiment in that a sealing body 3A is provided with fins 31. The second embodiment will be described with a focus on configurations different from the first embodiment.

As shown in FIG. 15, a liquid-cooled jacket 1A is composed of the jacket body 2 and the sealing body 3A. The jacket body 2 is the same as that in the first embodiment. The sealing body 3A is composed of a base portion 30 which is a plate-like member having the form of a rectangle in planar view, and a plurality of fins 31 provided on a back surface 30b of the base portion 30. The fins 31 are disposed at predetermined intervals perpendicularly to the base portion 30.

A manufacturing method for the liquid-cooled jacket according to the second embodiment includes the preparation step, the butted portion joining step, and the burring step in the first embodiment. According to the manufacturing method for the liquid-cooled jacket according to the second embodiment, the liquid-cooled jacket 1A having a plurality of fins 31 formed therein can be manufactured. Since the liquid-cooled jacket 1A has the fins 31 formed therein, a cooling efficiency thereof can be increased. Note that the supporting portion 12 (see FIG. 3) may be provided in the jacket body 2 while providing the fins 31. Moreover, the fins 31 may be formed on at least one of the jacket body 2 and the sealing body 3A.

Third Embodiment

A liquid-cooled jacket according to a third embodiment of the present invention, and a method of manufacturing the liquid-cooled jacket, will be described in detail with reference to the drawings.

Figure 16:
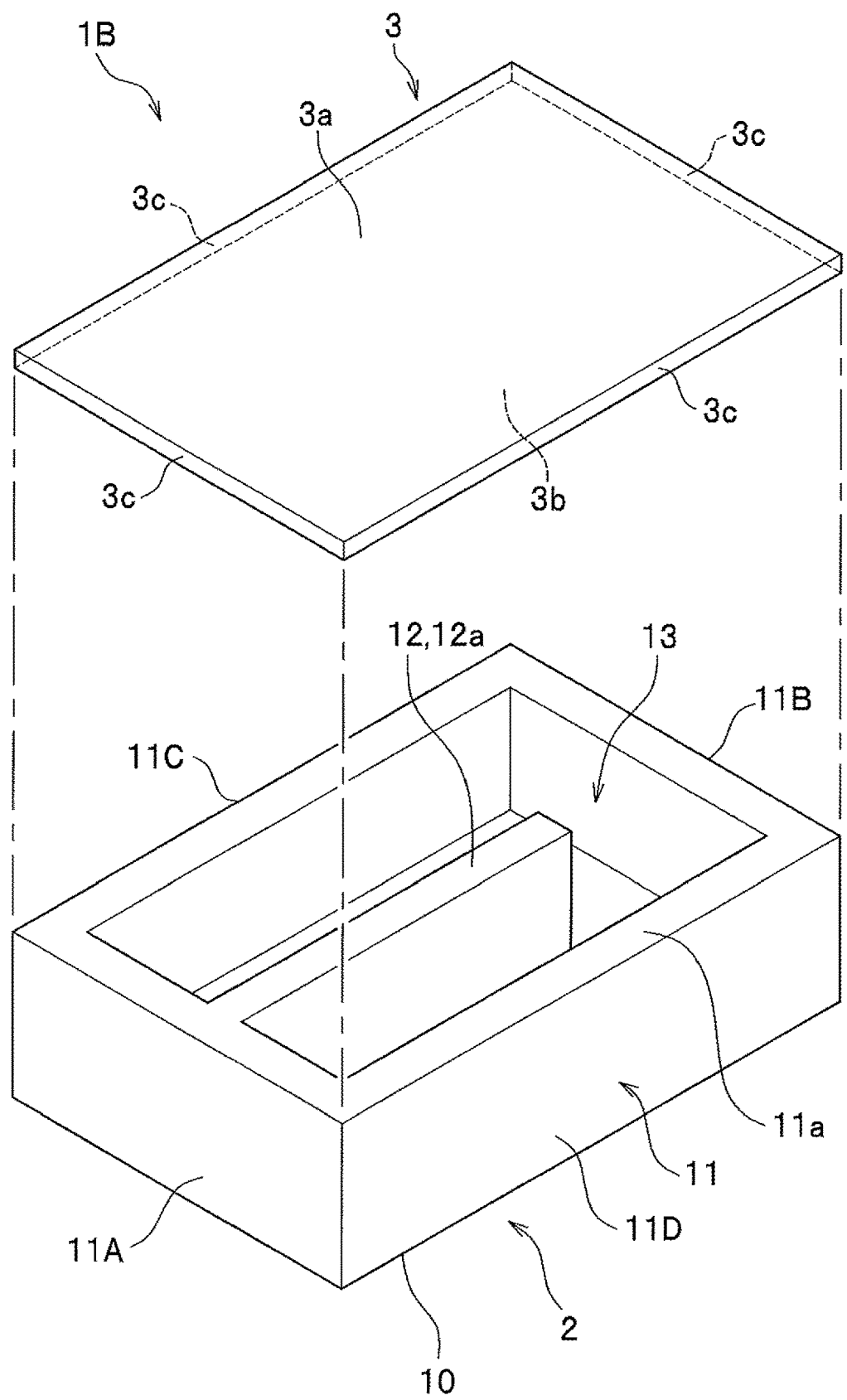
FIG. 16 is an exploded perspective view showing a liquid-cooled jacket according to a third embodiment of the present invention.

As shown in FIG. 16, the liquid-cooled jacket 1B according to the present embodiment is composed of the jacket body 2 and the sealing body 3. The jacket body 2 is a box-shaped body which opens upward.

The jacket body 2 includes a bottom portion 10, a side wall portion 11, and a supporting portion 12. The jacket body 2 is formed of metal capable of being stirred by friction. The bottom portion 10 has the form of a rectangular plate in planar view. The side wall portion 11 is provided to stand on the bottom portion 10, and has the form of a rectangular frame in planar view. The side wall portion 11 is composed of wall portions 11A, 11B, 11C and 11D, each having the same plate thickness. The wall portions 11A and 11B each form a short side portion, and face each other. Also, the wall portions 11C and 11D each form a long side portion, and face each other. The bottom portion 10 and the side wall portion 11 defines the recess 13 formed inside.

The supporting portion 12 is provided to stand on the bottom portion 10 and has the form of a rectangular parallelepiped. The supporting portion 12 is provided to continue from the wall portion 11A and to extend toward the wall portion 11B. The wall portion 11B and the leading end of the supporting portion 12 are located with a predetermined space from each other. The end surface 12a of the supporting portion 12 and the end surface 11a of the side wall portion 11 are flush with each other.

The sealing body 3 is a plate-like member having the form of a rectangle in planar view. A material for the sealing body 3 is not particularly limited, but in the present embodiment, the sealing body 3 is formed of the same material as the jacket body 2. The sealing-body side surface 3c of the sealing body 3 and the side surface of the side wall portion 11 are flush with each other.

Figure 17A:
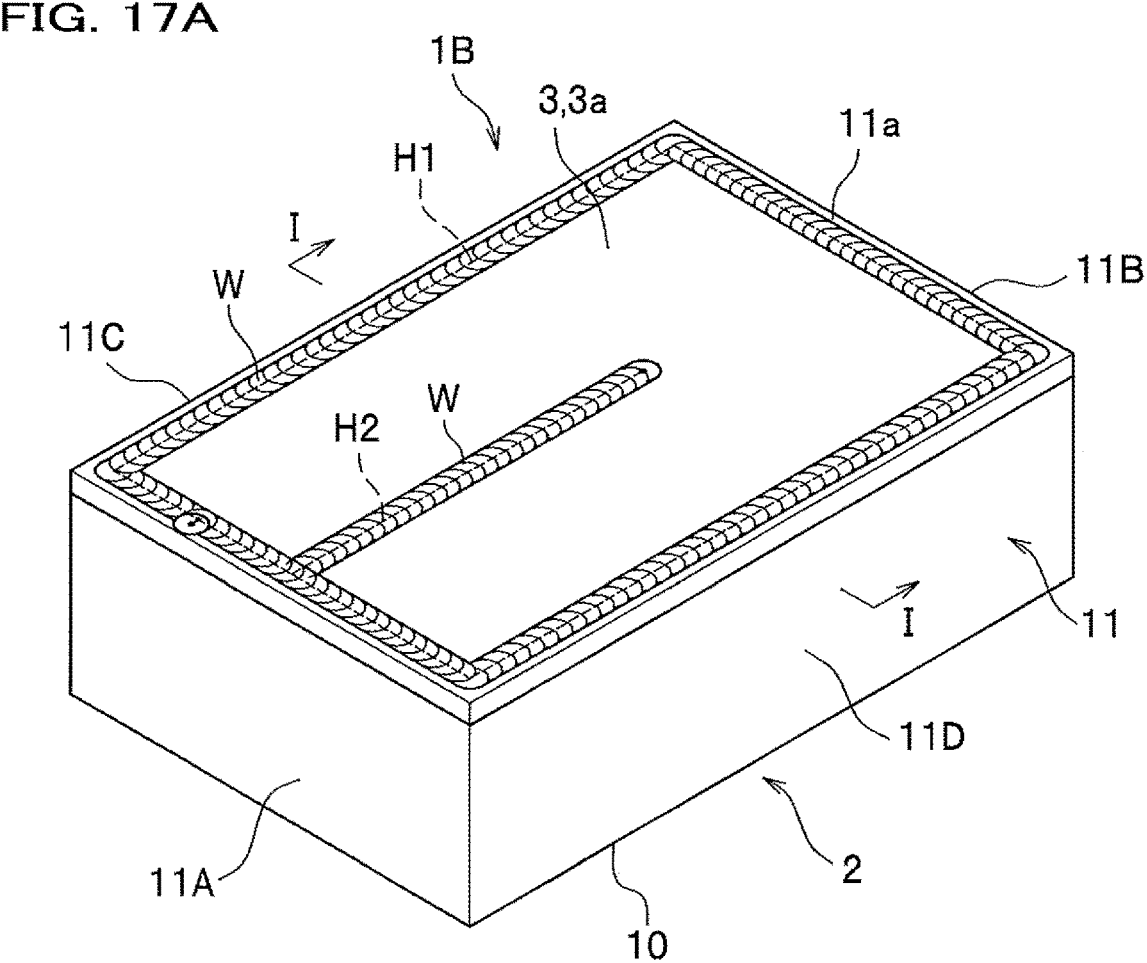
Figure 17B:
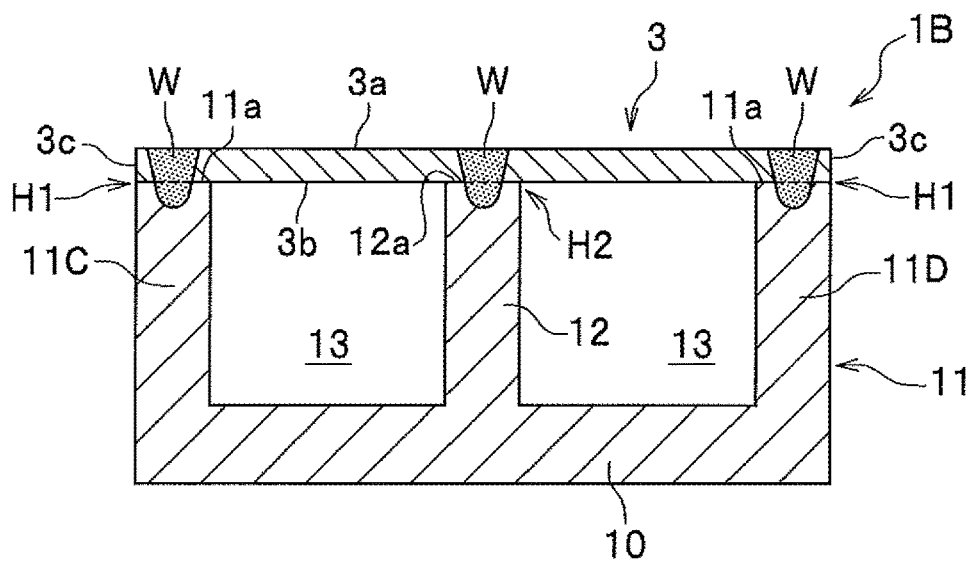

As shown in FIGS. 17A and 17B, the liquid-cooled jacket 1B is one obtained by joining together the jacket body 2 and the sealing body 3 by friction stirring to be integrated with each other. In the liquid-cooled jacket 1B, a first overlapped portion H1 at which the back surface 3b of the sealing body 3 and the end surface 11a of the side wall portion 11 are overlapped each other, and a second overlapped portion H2 at which the back surface 3b of the sealing body 3 and the end surface 12a of the supporting portion 12 are overlapped each other, are continuously joined together by friction stirring. The plasticized region W is formed on the region where the friction stirring is carried out. The liquid-cooled jacket 1B includes a hollow portion formed therein, in which heat transport fluid flows for transporting heat to the outside.

Next, description will be given of a manufacturing method for the liquid-cooled jacket according to the third embodiment. The manufacturing method for the liquid-cooled jacket includes a preparation step, a primary joining step, and a burring step.

Figure 18:
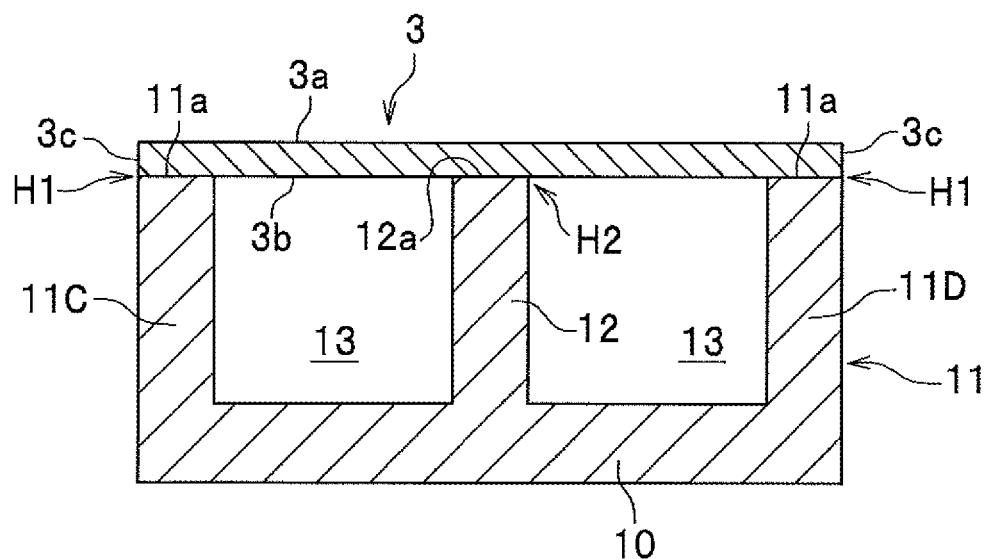
FIG. 18 is a cross-sectional view showing a placing step in a manufacturing method for the liquid-cooled jacket according to the third embodiment.

The preparation step includes a placing step, a fixing step, and a provisional joining step. As shown in FIG. 18, in the placing step, the sealing body 3 is placed on the jacket body 2. This allows the back surface 3b of the sealing body 3 and the end surface 11a of the side wall portion 11 to be overlapped each other to form the first overlapped portion H1. The first overlapped portion H1 has the form of a rectangular frame in planar view. Moreover, the back surface 3b of the sealing body 3 and the end surface 12a of the supporting portion 12 are overlapped each other to form the second overlapped portion H2. The second overlapped portion H2 has a linear shape.

In the fixing step, the jacket body 2 and the sealing body 3 are fixed on a table (not shown). The jacket body 2 and the sealing body 3 are immovably fixed on the table by a fixing tool such as a clamp.

Figure 19:
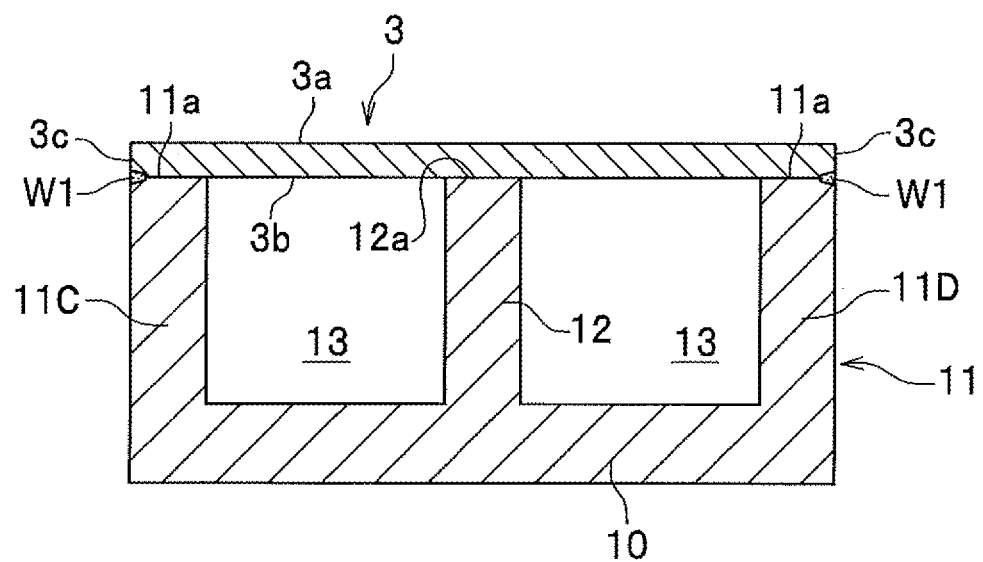
FIG. 19 is a cross-sectional view showing a provisional joining step in the manufacturing method for the liquid-cooled jacket according to the third embodiment.

In the provisional joining step, the jacket body 2 and the sealing body 3 are provisionally joined together. As shown in FIG. 19, in the provisional joining step, the sealing-body side surface 3c of the sealing body 3 and the side surface of the side wall portion 11 are provisionally joined together by welding. The provisional joining is intermittently carried out in this embodiment, but may be continuously carried out along the outer periphery of the jacket body 2 and the sealing body 3.

Figure 20A:
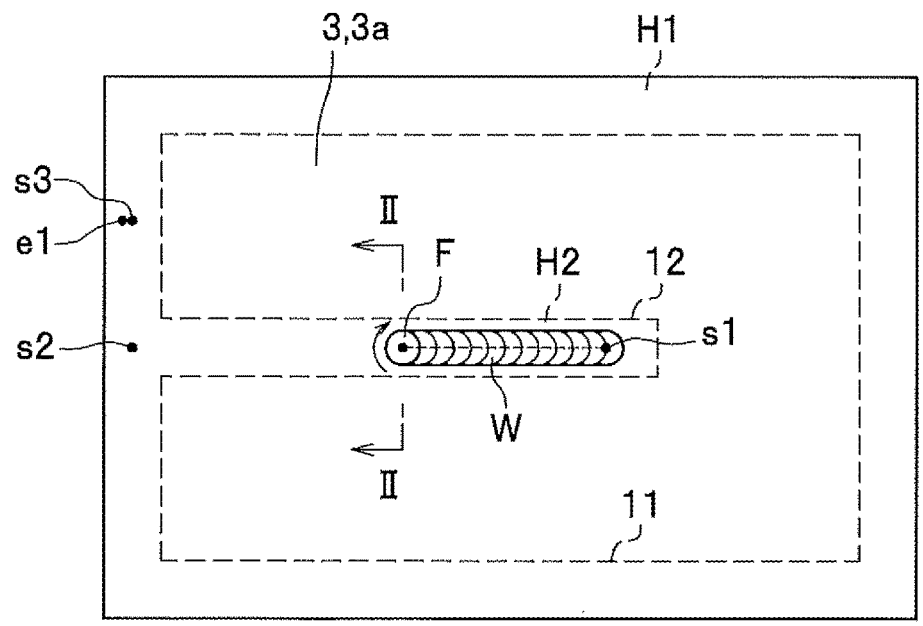
Figure 20B:
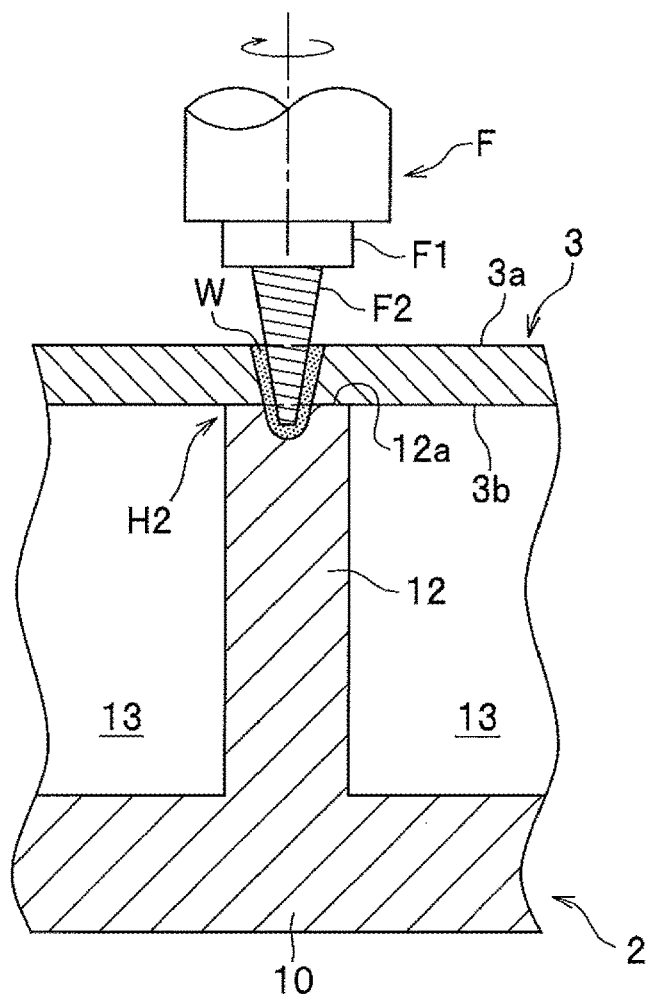

As shown in FIGS. 20A and 20B, the primary joining step is a step of carrying out friction stir welding by means of the primary joining rotary tool F. In the present embodiment, the primary joining step includes a second overlapped portion joining step in which friction stir welding is carried out for the second overlapped portion H2, and a first overlapped portion joining step in which friction stir welding is carried out for the first overlapped portion H12.

As shown in FIG. 20A, in the second overlapped portion joining step, the stirring pin F2 of the primary joining rotary tool F being rotated clockwise is inserted into the starting position s1 set at the position corresponding to the leading end of the supporting portion 12 (the leading end on the side of the wall portion 11B), on the front surface 3a of the sealing body 3. As shown in FIG. 20B, the insertion depth of the stirring pin F2 is set to allow the tip of the stirring pin F2 to reach the end surface 12a of the supporting portion 12, and set to allow only the stirring pin F2 to contact with the sealing body 3. Then, the primary joining rotary tool F is moved along the second overlapped portion H2 with a constant height being kept. That is, the primary joining rotary tool F is moved along the supporting portion 12.

The second overlapped portion joining step allows the back surface 3b of the sealing body 3 and the end surface 12a of the supporting portion 12 to be friction-stirred and joined together. In this process, the plasticized region W is formed on the movement locus of the primary joining rotary tool F.

Figure 21A:
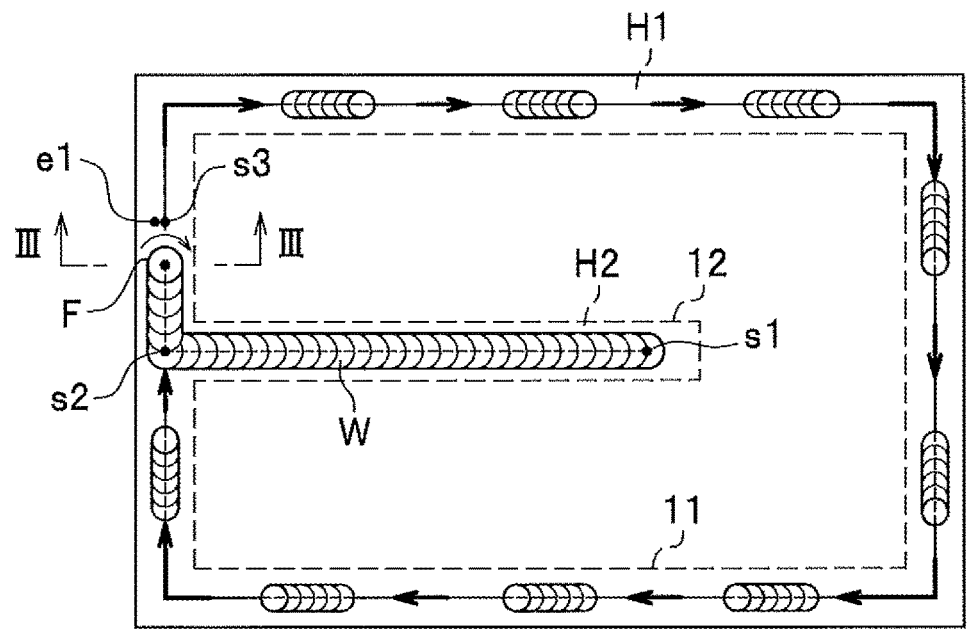

When the primary joining rotary tool F is moved to the first intermediate point s2 set on the first overlapped portion H1, the process proceeds to the first overlapped portion joining step without pulling out the primary joining rotary tool F. As shown in FIG. 21A, in the first overlapped portion joining step, the primary joining rotary tool F is moved along the first overlapped portion H1. That is, the primary joining rotary tool F is allowed to move once clockwise along the side wall portion 11.

Figure 21B:
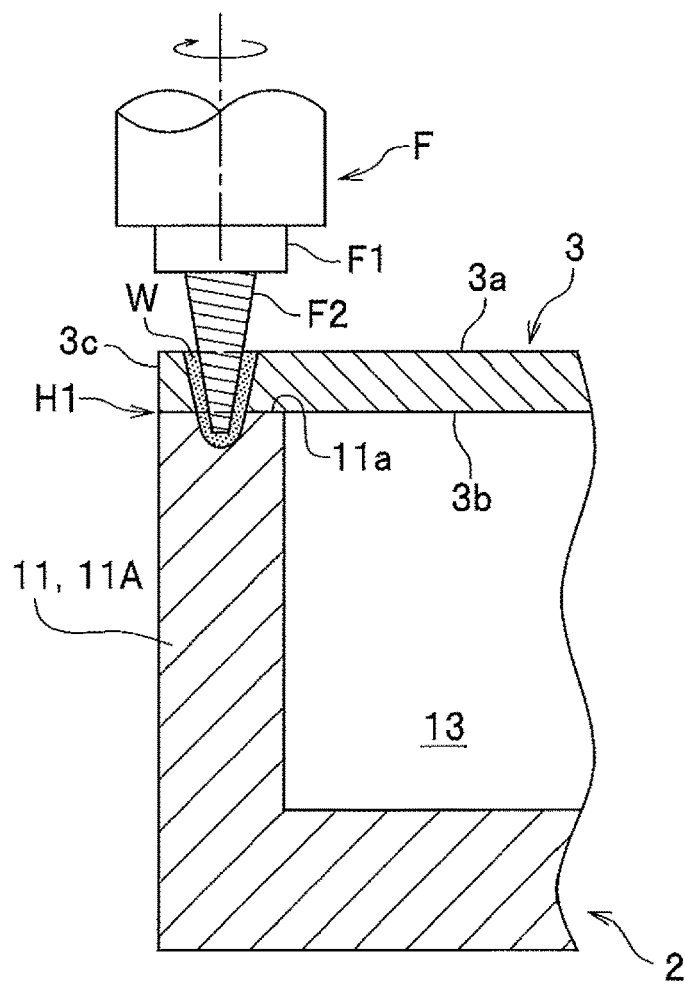

As shown in FIG. 21B, the insertion depth of the stirring pin F2 is set to allow the tip of the stirring pin F2 to reach the end surface 11a, and set to allow only the stirring pin F2 to contact with the sealing body 3. Then, the primary joining rotary tool F is moved along the first overlapped portion H1 with a constant height being kept.

Note that the insertion depth of the primary joining rotary tool F need not be always constant. For example, the insertion depth may be changed in the first overlapped portion joining step and the second overlapped portion joining step, respectively. The primary joining rotary tool F is not provided with a shoulder portion, thus making it possible to easily change the insertion depth thereof. Moreover, the insertion depth may be set to allow the tip of the primary joining rotary tool F not to contact with the end surface 11a and the end surface 12a, and to allow at least the plasticized region W to reach the end surface 11a and the end surface 12a.

Where the primary joining rotary tool F is moved clockwise around the recess 13 as in this embodiment, the primary joining rotary tool F is preferably rotated clockwise. On the other hand, where the primary joining rotary tool F is moved counterclockwise around the recess 13, the primary joining rotary tool F is preferably rotated counterclockwise.

There is a possibility that joining defects are generated on the left side in the direction of forward movement of a rotary tool when rotated clockwise, or on the right side in the direction of forward movement of the rotary tool when rotated counterclockwise. When such joining defects are formed on the side close to the recess 13 (hollow portion), there is a risk that water-tightness and air-tightness are decreased. However, the movement direction and rotation direction of the primary joining rotary tool F are set as described above, allowing joining defects caused by the friction stir welding to be formed at a location away from the recess 13, thus making it possible to suppress a decrease in water-tightness and air-tightness.

As shown in FIG. 21A, after the primary joining rotary tool F is allowed to move once along the first overlapped portion H1, it is allowed to pass through the first intermediate point s2 to move to the second intermediate point s3. Then, when the primary joining rotary tool F is moved to the terminating position e1 which is set on the outer side of the second intermediate point s3 on the front surface 3a of the sealing body 3, the primary joining rotary tool F is moved upward to be pulled out from the sealing body 3.

Where the pull-out trace of the primary joining rotary tool F remains on the front surface 3a after pulled out from the sealing body 3, a repairing step for repairing the pull-out trace may be carried out. For the repairing step, for example, weld metal can be filled by buildup welding in the pull-out trace for the repairing. This can planarize the front surface 3a.

Note that, where the primary joining rotary tool F is pulled out from the sealing body 3, for example, the primary joining rotary tool F may be gradually moved upward while moving the primary joining rotary tool F on the front surface 3a of the sealing body 3 corresponding to the side wall portion 11, to allow the insertion depth of the primary joining rotary tool F to be gradually reduced. This makes it possible to allow no pull-out trace after the primary joining step to remain on the front surface 3a, or if any, to reduce the pull-out trace.

In the burring step, burrs are removed, which have been exposed on the surfaces of the jacket body 2 and the sealing body 3 in the primary joining step. This allows the surfaces of the jacket body 2 and the sealing body 3 to be cleanly finished. Throughout the steps described above, the liquid-cooled jacket 1B shown in FIGS. 17A and 17B is formed.

According to the manufacturing method for the liquid-cooled jacket described above, in the primary joining step, since the shoulder portion of the rotary tool is not inserted into the sealing body 3 as in the conventional art, a width of the plasticized region can be decreased as compared to the conventional art, and a pressing force which acts on the jacket body 2 and the sealing body 3 can be reduced. The conventional manufacturing method has required the width of the side wall portion 11 to be set to be greater than a diameter of the shoulder portion of the rotary tool. However, according to the present embodiment, even if the width of the side wall portion 11 is decreased, the metal material can be prevented from escaping from the inner corner portion constituted by the sealing body 3 and the side wall portion 11, thus improving a degree of freedom of designing.

Also, where the supporting portion 12 is provided in the jacket body 2 as in the present embodiment, the conventional rotary tool has required the width of the supporting portion 12 to be set to be greater than a diameter of the shoulder portion thereof. However, according to the present embodiment, even if the width of the supporting portion 12 is decreased, the metal material can be prevented from escaping from the inner corner portion constituted by the sealing body 3 and the supporting portion 12, thus improving a degree of freedom of designing.

Moreover, according to the manufacturing method for the liquid-cooled jacket according to the present embodiment, since only the stirring pin F2 is inserted into the jacket body 2 and the sealing body 3, a load exerted on the friction stirring apparatus can be reduced as compared to a case where the shoulder portion of the rotary tool is pressed into the jacket body and the sealing body, and operability of the primary joining rotary tool F is bettered. Also, since the load on the friction stirring apparatus can be reduced, the joining can be carried out for the first overlapped portion H1 and the second overlapped portion H2 at a deep location, with no great load exerted on the friction stirring apparatus.

Moreover, the liquid-cooled jacket 1B according to the present embodiment is hard to be deformed because the supporting portion 12 is formed therein, which is provided to stand on the bottom portion 10 of the jacket body 2 and joined to the back surface 3b of the sealing body 3. In other words, the manufacturing method for the liquid-cooled jacket according to the present embodiment makes it possible to manufacture the liquid-cooled jacket 1B having a high resistance to deformation.

Moreover, the liquid-cooled jacket 1B according to the present embodiment allows the friction stir welding to be carried out for the second overlapped portion H2 in addition to the first overlapped portion H1. In other words, the manufacturing method for the liquid-cooled jacket according to the present embodiment makes it possible to manufacture the liquid-cooled jacket 1B having an enhanced joining strength and a high resistance to deformation.

Moreover, according to the manufacturing method for the liquid-cooled jacket according to the present embodiment, since the friction stir welding is continuously carried out for the first overlapped portion H1 and the second overlapped portion H2, the manufacturing cycle can be improved.

Moreover, where the primary joining rotary tool F is moved to the inside of the plasticized region W, a problem occurs in that the metal material escapes into the hollow portion of the liquid-cooled jacket 1B. However, such a problem can be solved by pulling out the primary joining rotary tool F outside the plasticized region.

Moreover, according to the manufacturing method for the liquid-cooled jacket according to the present embodiment, since the provisional joining step is carried out prior to the primary joining step, an aperture can be prevented from being formed in the first overlapped portion H1 in the primary joining step.

Although the method of manufacturing the liquid-cooled jacket according to the third embodiment of the present invention is described above, appropriate design changes or modification are possible within the scope not departing from the gist of the present invention. For example, in the primary joining step, the friction stir welding may be carried out while allowing a cooling medium to flow within the jacket body 2 to cool the jacket body 2 and the sealing body 3. This makes it possible to suppress the frictional heat, thus reducing deformation of the liquid-cooled jacket 1B due to heat contraction. Moreover, the jacket body 2 and the sealing body 3 per se can be utilized to cool the jacket body 2 and the sealing body 3, without separately using a cooling plate or a cooling unit.

Moreover, although the first overlapped portion joining step and the second overlapped portion joining step are continuously carried out in the present embodiment, they may be intermittently carried out. Also, after the first overlapped portion joining step is carried out, the second overlapped portion joining step may be carried out. Moreover, although the supporting portion 12 is formed to continue from the side wall portion 11 in the third embodiment, the form thereof is not limited to this example. For example, the supporting portion 12 may be formed to be kept away from the side wall portion 11. In this case, the first overlapped portion joining step and the second overlapped portion joining step are intermittently carried out. Moreover, the form of the supporting portion 12 may be of other forms, or a plurality of supporting portions may be provided. Furthermore, although the supporting portion 12 is provided in the jacket body 2 in the third embodiment, it may be provided on the sealing body 3. Alternatively, the supporting portion 12 may be omitted.

Moreover, although the provisional joining is carried out by welding in the third embodiment, the provisional joining rotary tool G or the primary joining rotary tool F may be used to carry out the provisional joining. Where the primary joining rotary tool F is used to carry out the provisional joining step, time and effort for exchanging one rotary tool for another can be saved.

[First Modification]

Figure 22:
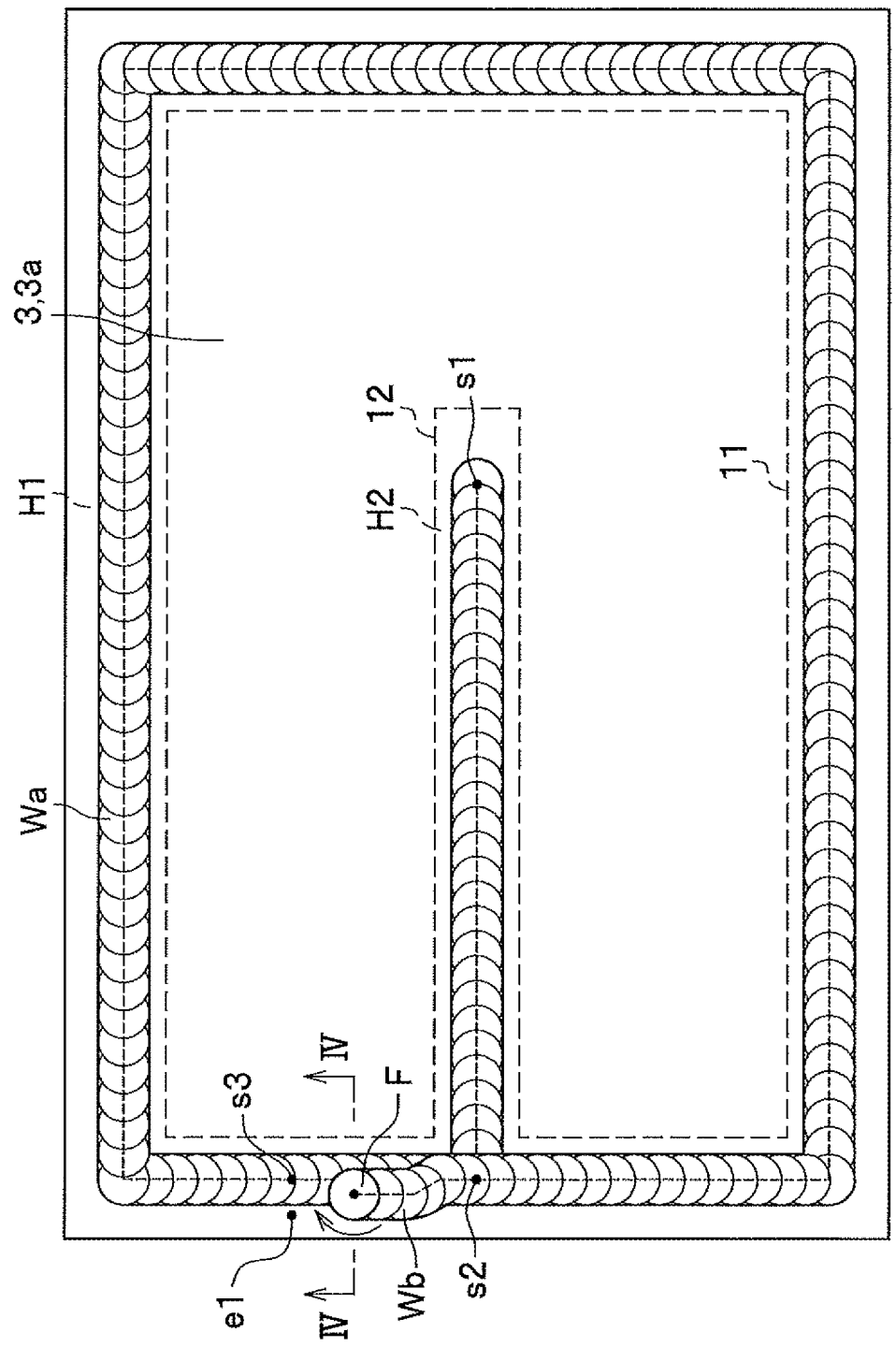
FIG. 22 is a plan view showing a first modification of the manufacturing method for the liquid-cooled jacket according to the third embodiment.

Next, description will be given of a manufacturing method for a liquid-cooled jacket according to a first modification of the third embodiment. As shown in FIG. 22, the first modification of the third embodiment is different from the third embodiment in that the primary joining rotary tool F is allowed to move twice around the recess 13 in the first overlapped portion joining step. The first modification of the third embodiment will be described with a focus on configurations different from the third embodiment.

As shown in FIG. 22, the primary joining step in the first modification of the third embodiment includes a second overlapped portion joining step and a first overlapped portion joining step. The second overlapped portion joining step is the same as that in the third embodiment. In the second overlapped portion joining step, when the primary joining rotary tool F is moved to the first intermediate point s2, the process proceeds to the first overlapped portion joining step without pulling out the primary joining rotary tool F.

In the first overlapped portion joining step, the primary joining rotary tool F is allowed to move once clockwise around the recess 13 along the first overlapped portion H1 while rotating the primary joining rotary tool F clockwise. Friction stir welding at first one-round allows a plasticized region Wa to be formed.

Figure 23:
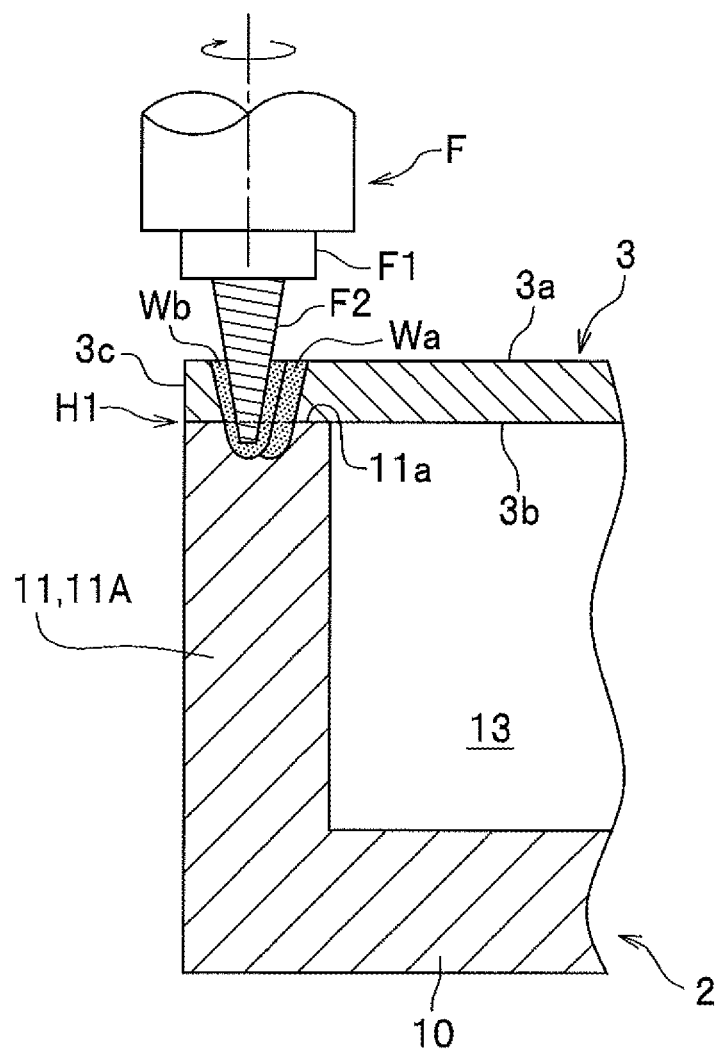
FIG. 23 is a cross-sectional view showing the first modification of the manufacturing method for the liquid-cooled jacket according to the third embodiment.

When the primary joining rotary tool F is allowed to move once around the recess 13 and passes through the first intermediate point s2, the primary joining rotary tool F is shifted to the outside (the side away from the recess 13) and the primary joining rotary tool F is allowed to further move once around the recess 13 with the outside of the plasticized region Wa and the stirring pin F2 overlapping with each other. As shown in FIG. 23, friction stir welding at second one-round allows a plasticized region Wb to be formed. In the present embodiment, the route of the primary joining rotary tool F is set so as to allow the rotary shaft of the primary joining rotary tool F at the second one-round to pass along the outer end of the plasticized region Wa.

When the primary joining rotary tool F is allowed to move twice around the recess 13 and is then moved to a line connecting the second intermediate point s3 (see FIG. 22) with the terminating position e1, the primary joining rotary tool F is pulled out from the sealing body 3 at the terminating position e1.

According to the first modification of the third embodiment described above, the primary joining rotary tool F is allowed to move twice around the recess 13 in the primary joining step, thereby making it possible to improve the water-tightness and air-tightness of the liquid-cooled jacket 1B. As described above, where the primary joining rotary tool F is moved clockwise around the recess 13 while being rotated clockwise, there is a risk that joining defects are formed outside the plasticized region Wa (the same is true in a case where the primary joining rotary tool F is moved counterclockwise around the recess 13 while being rotated counterclockwise). According to the first modification, however, the friction stirring is carried out again for the outside of the plasticized region Wa, thereby allowing the joining defects to be repaired. This makes it possible to improve the water-tightness and air-tightness of the liquid-cooled jacket 1B.

[Second Modification]

Figure 24:
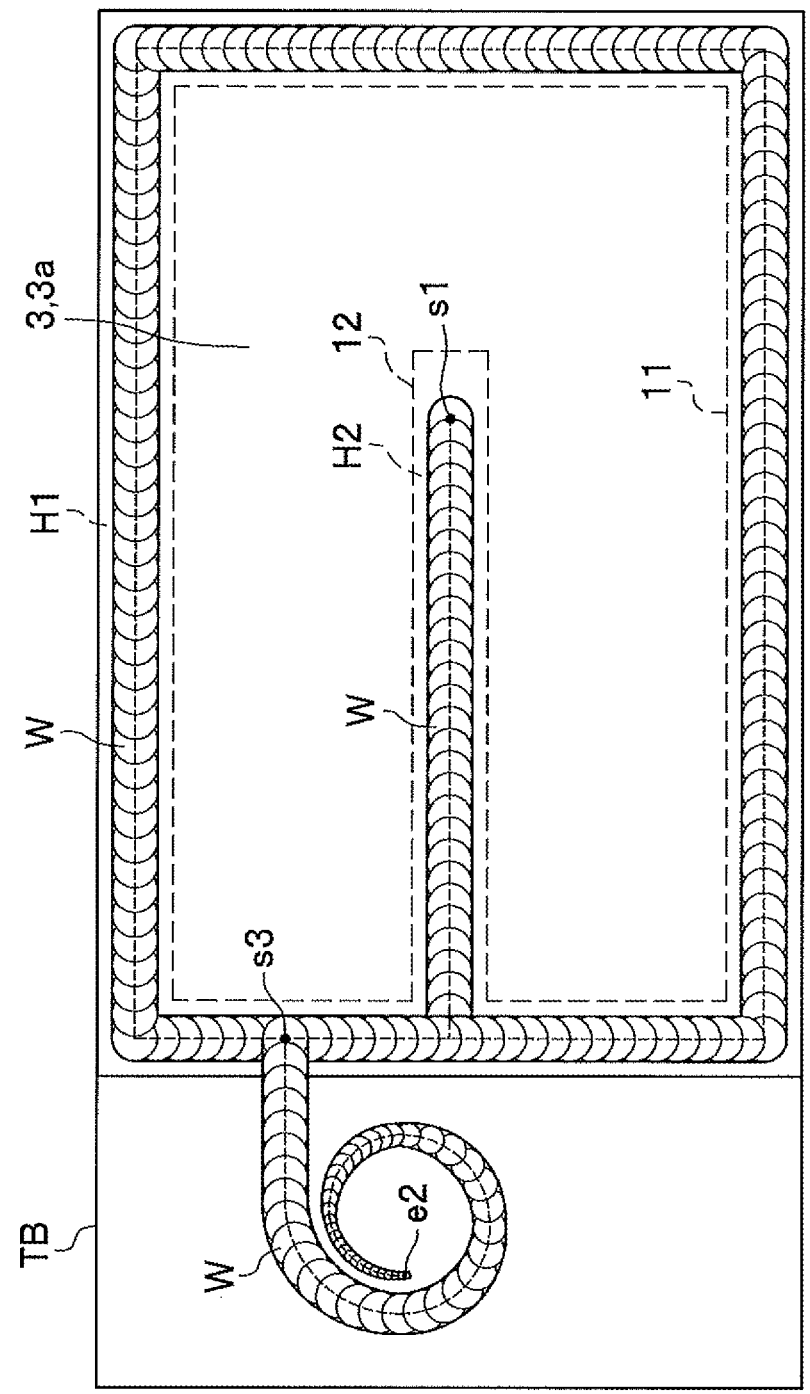
FIG. 24 is a plan view showing a second modification of the manufacturing method for the liquid-cooled jacket according to the third embodiment.

Next, description will be given of a manufacturing method for a liquid-cooled jacket according to a second modification of the third embodiment. As shown in FIG. 24, the second modification of the third embodiment is different from the third embodiment in that a tab material TB is used in the first overlapped portion joining step. The second modification of the third embodiment will be described with a focus on configurations different from the third embodiment.

As shown in FIG. 24, the primary joining step in the second modification of the third embodiment includes a tab material attaching step, a second overlapped portion joining step, a first overlapped portion joining step, and a pulling-out step. The tab material attaching step is a step of attaching the tab material TB to the wall portion 11A of the jacket body 2. A material for the tab material TB is not particularly limited, but in the second modification of the third embodiment, the tab material TB is formed of the same material as the jacket body 2. The jacket body 2 and the tab material TB are joined together by welding or friction stir welding. A size of the tab material TB is not particularly limited, but in the second modification of the third embodiment, a width dimension of the tab material TB is set to be equal to each width dimension of the jacket body 2 and the sealing body 3. A top surface of the tab material TB and the front surface 3a of the sealing body 3 are flush with each other.

The second overlapped portion joining step and the first overlapped portion joining step are the same as those in the third embodiment. When the primary joining rotary tool F is allowed to move once around the sealing body 3 and is then moved to the second intermediate point s3, the process proceeds to the pulling-out step without pulling out the primary joining rotary tool F. The pulling-out step is a step of pulling out the primary joining rotary tool F from the tab material TB.

In the pulling-out step, the primary joining rotary tool F is moved from the second intermediate point s3 into the tab material TB to be moved in a spiral shape on the tab material TB. When moving the primary joining rotary tool F on the tab material TB, preferably, the insertion depth of the primary joining rotary tool F is allowed to be gradually reduced toward the terminating position e2 in the pulling-out step. When the primary joining rotary tool F is pulled out from the tab material TB at the terminating position e2, the tab material TB is cut off to be removed from the jacket body 2.

According to the second modification of the third embodiment, the tab material TB is used to allow no pull-out trace to remain on the jacket body 2, thus making it possible to omit a repairing step for repairing any pull-out trace. Note that the movement locus of the primary joining rotary tool F on the tab material TB is not limited to a spiral shape, but may be set to be a meandering shape or a linear shape. Moreover, the primary joining rotary tool F may be pulled out upward on the tab material TB without allowing the insertion depth of the primary joining rotary tool F to be gradually reduced.

[Third Modification]

Figure 25:
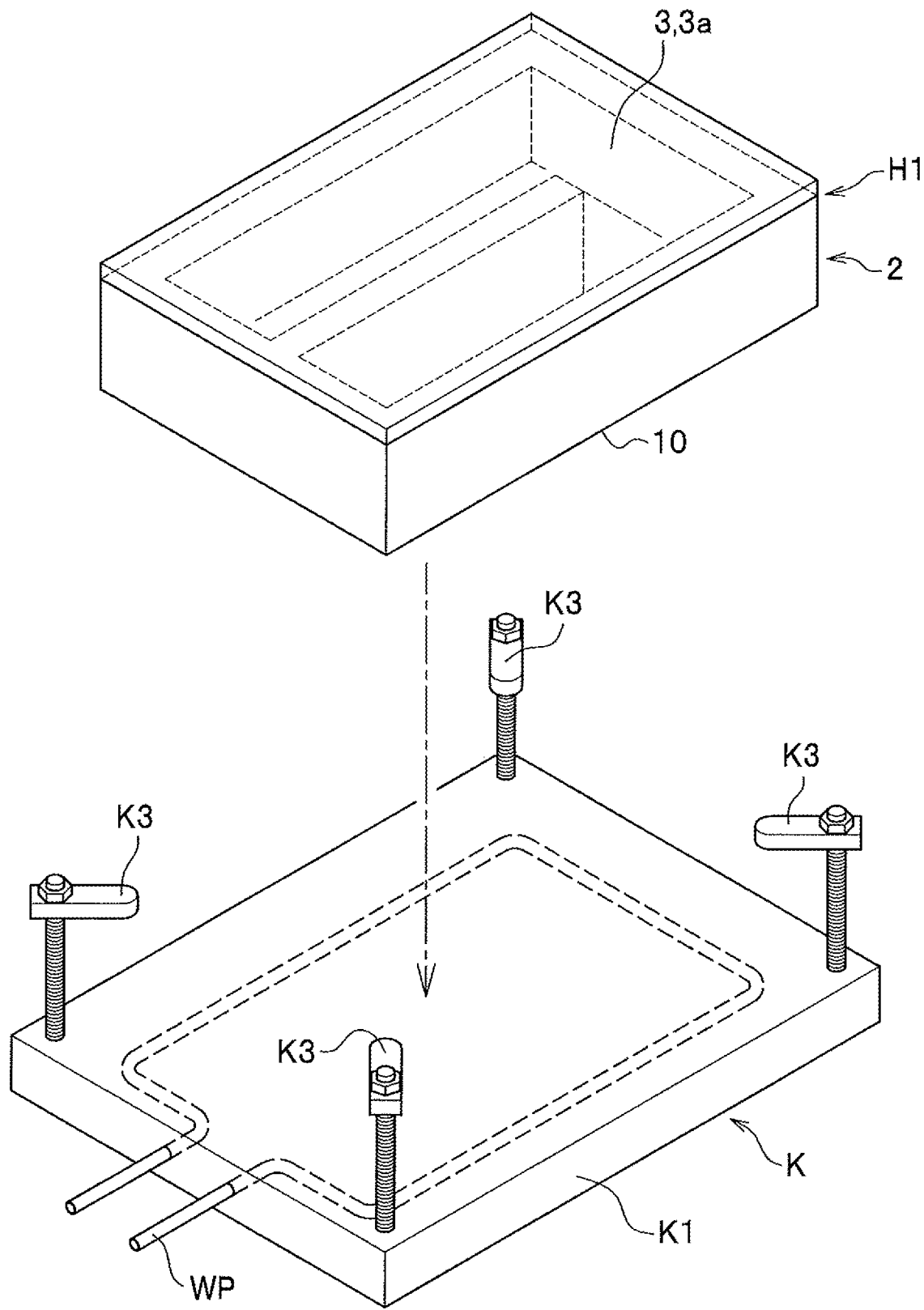
FIG. 25 is a perspective view showing a third modification of the manufacturing method for the liquid-cooled jacket according to the third embodiment.

Next, description will be given of a manufacturing method for a liquid-cooled jacket according to a third modification of the third embodiment. As shown in FIG. 25, the third modification of the third embodiment is different from the third embodiment in that the provisional joining step and the primary joining step are carried out using a cooling plate. The third modification of the third embodiment will be described with a focus on configurations different from the third embodiment.

As shown in FIG. 25, in the third modification of the third embodiment, the jacket body 2 and the sealing body 3 are fixed on a table K when carrying out the fixing step. The table K is composed of a substrate K1 having the form of a rectangular parallelepiped, clamps K3 each formed in four corners of the substrate K1, and a cooling pipe WP disposed within the substrate K1. The table K is a member that immovably fixes the jacket body 2 thereon and serves as a "cooling plate" set forth in the claims.

The cooling pipe WP is a tubular member embedded within the substrate K1. The cooling pipe WP is adapted to allow a cooling medium for cooling the substrate K1 to flow therein. A location of the cooling pipe WP, namely the form of a cooling flow passage allowing the cooling medium to flow therein, is not particularly limited, but in the third modification of the third embodiment, is of a planar shape which follows the movement locus of the primary joining rotary tool F in the first overlapped portion joining step. More specifically, the cooling pipe WP is disposed so that the cooling pipe WP and the first overlapped portion H1 are nearly overlapped each other in planar view.

In the provisional joining step and the primary joining step in the third modification of the third embodiment, the jacket body 2 and the sealing body 3 are first fixed on the table K and welding and friction stir welding are then carried out while allowing a cooling medium to flow in the cooling pipe WP. This allows frictional heat generated in the friction stirring to be suppressed low, thus making it possible to reduce deformation of the liquid-cooled jacket 1B due to heat contraction. Moreover, in the third modification of the third embodiment, since the cooling flow passage is disposed to overlap with the first overlapped portion H1 (the movement locus of the primary joining rotary tool F) in planar view, the portion in which the frictional heat is generated can be intensively cooled. This can increase a cooling efficiency of the liquid-cooled jacket. Also, since the cooling pipe WP is disposed to allow a cooling medium to flow therein, control of the cooling medium can be easily carried out. Furthermore, since the table K and the jacket body 2 are brought into surface contact with each other, the cooling efficiency can be further increased.

Note that, in addition to cooling the jacket body 2 and the sealing body 3 using the table K (cooling plate), the friction stir welding may be carried out while allowing a cooling medium to flow within the jacket body 2. Moreover, the cooling pipe WP may be disposed at a location corresponding to the second overlapped portion H2.

[Fourth Modification]

Figure 26A:
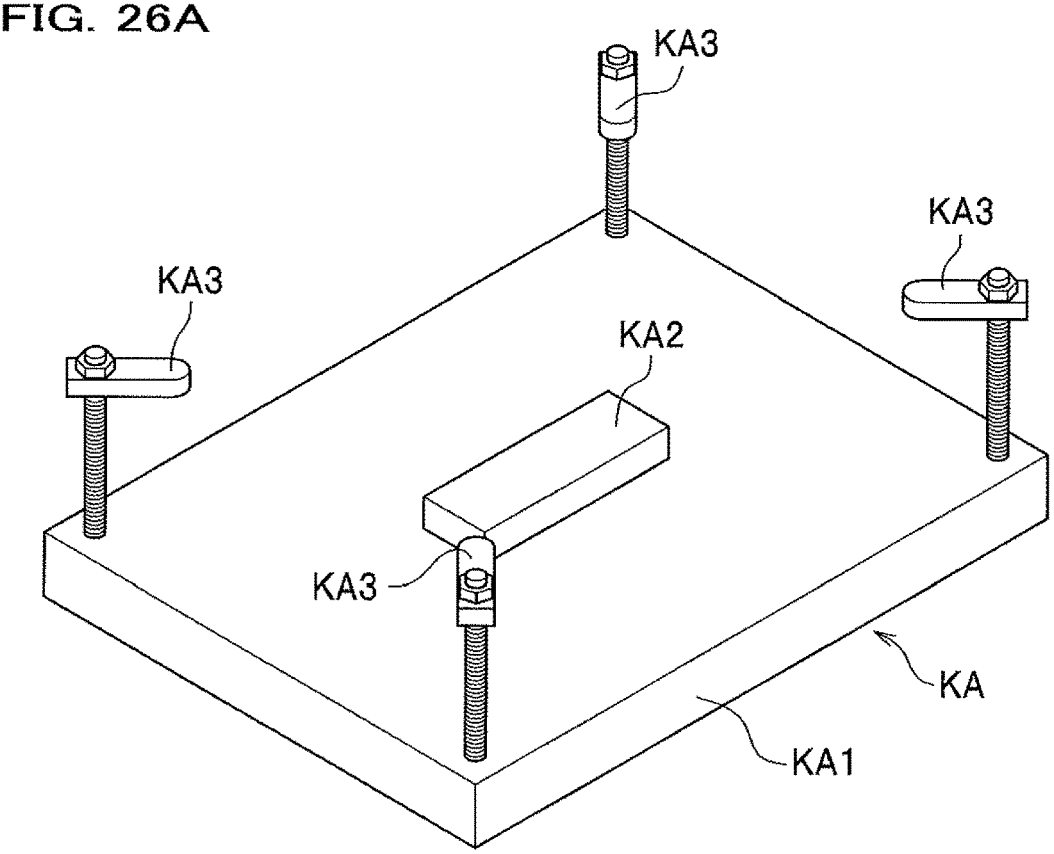
Figure 26B:
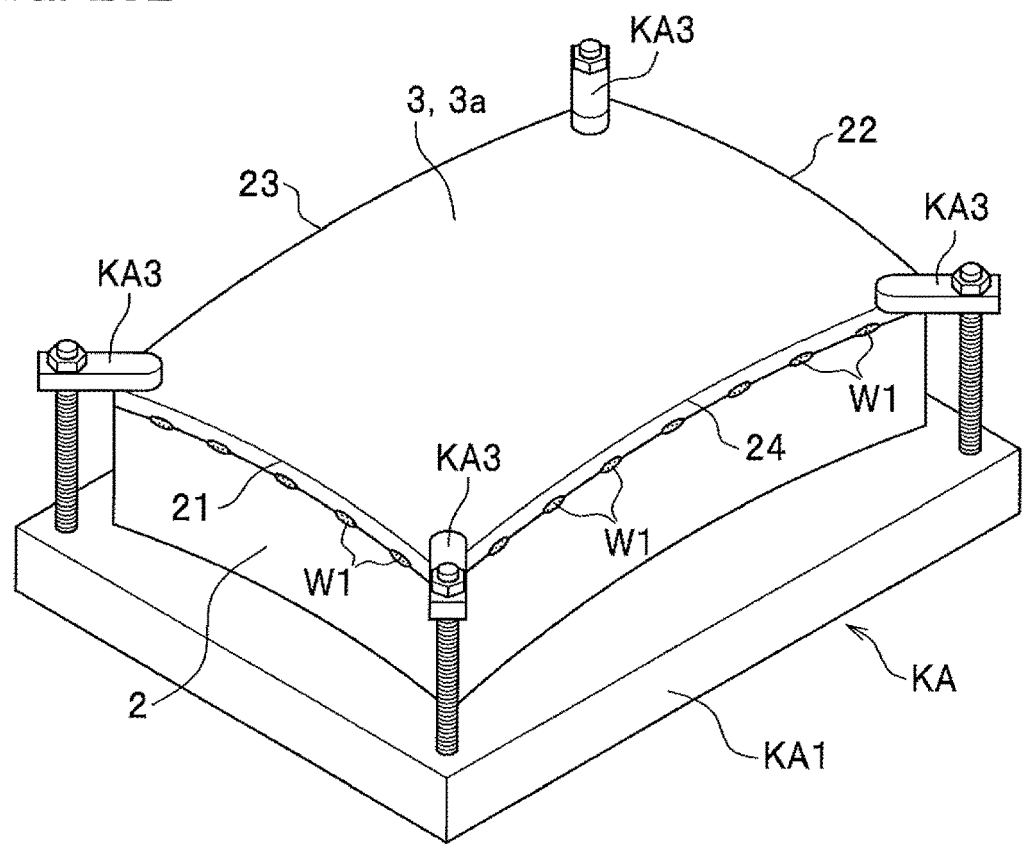

Next, description will be given of a manufacturing method for a liquid-cooled jacket according to a fourth modification of the third embodiment. As shown in FIGS. 26A and 26B, the fourth modification of the third embodiment is different from the third embodiment in that the primary joining step is carried out in a state in which the front surface side of the jacket body 2 and the front surface 3*a* of the sealing body 3 are curved to have a convex shape. The fourth modification of the third embodiment will be described with a focus on configurations different from the third embodiment.

As shown in FIG. 26A, a table KA is employed in the fourth modification of the first embodiment. The table KA is composed of a substrate KA1 having the form of a rectangular parallelepiped, a spacer KA2 formed in the center of the substrate KA1, and clamps KA3 each formed in four corners of the substrate KA1. The spacer KA2 may be formed integrally with or separately from the substrate KA1.

In the fixing step in the fourth modification of the third embodiment, the jacket body 2 and the sealing body 3 integrated with each other in the provisional joining step are fixed on the table KA by means of the clamps KA3. As shown in FIG. 26B, when the jacket body 2 and the sealing body 3 are fixed on the table KA, they are curved to allow the bottom portion 10 and the end surface 11*a* of the jacket body 2 and the front surface 3*a* of the sealing body 3 to have an upwardly convex shape. More specifically, the jacket body 2 and the sealing body 3 are curved to allow a first side portion 21, a second side portion 22, a third side portion 23 and a fourth side portion 24 of the sealing body 3 to exhibit a curved line.

In the primary joining step in the fourth modification of the third embodiment, the second overlapped portion joining step and the first overlapped portion joining step are carried out by means of the primary joining rotary tool F. In the second overlapped portion joining step and the first overlapped portion joining step, the amount of deformation of at least one of the jacket body 2 and the sealing body 3 is measured beforehand and the friction stir welding is then carried out while adjusting the insertion depth of the stirring pin F2 according to the amount of deformation. More specifically, the primary joining rotary tool F is moved to allow the movement locus thereof to trace a curved line along the curved surface of the front surface 3*a* of the sealing body 3. This makes it possible to keep the depth and width of the plasticized region W1 constant.

There is a risk that heat input at the time of friction stir welding causes heat contraction to be generated in the plasticized region W1 and the sealing body 3 of the liquid-cooled jacket 1B to be deformed into a concave shape. However, according to the fourth modification of the third embodiment, since the jacket body 2 and the sealing body 3 are fixed in the form of a convex shape beforehand so as to allow a tensile stress to act on the end surface 11*a* and the front surface 3*a* when carrying out the primary joining step, the liquid-cooled jacket 1B can be planarized by making use of the heat contraction after the friction stir welding. Moreover, where the primary joining step is carried out by means of the conventional rotary tool, a problem occurs in that, when the jacket body 2 and the sealing body 3 are warped in the form of a convex shape, the shoulder portion of the rotary tool comes in contact with the sealing body 3 and thus operability of the rotary tool is decreased. However, according to the fourth modification of the third embodiment, since the primary joining rotary tool F has no shoulder portion, operability of the primary joining rotary tool F is bettered even if the jacket body 2 and the sealing body 3 are warped in the form of a convex shape.

Note that the measurement of the amount of deformation of the jacket body 2 and the sealing body 3 can be made using a known height detecting device. Also, a friction stirring apparatus equipped with, for example, a detecting device that detects a height from the table KA to at least one of the jacket body 2 and the sealing body 3, may be used to carry out the primary joining step while detecting the amount of deformation of the jacket body 2 or the sealing body 3.

Moreover, although the jacket body 2 and the sealing body 3 are curved to allow all of the first to fourth side portions 21 to 24 to exhibit a curved line in the fourth modification of the first embodiment, the form of curves is not limited to this example. For example, the jacket body 2 and the sealing body 3 may be curved to allow the first side portion 21 and the second side portion 22 to exhibit a straight line and to allow the third side portion 23 and the fourth side portion 24 to exhibit a curved line. Also, for example, the jacket body 2 and the sealing body 3 may be curved to allow the first side portion 21 and the second side portion 22 to exhibit a curved line and to allow the third side portion 23 and the fourth side portion 24 to exhibit a straight line.

Moreover, although the position of height of the stirring pin F2 is changed according to the amount of deformation of the jacket body 2 or the sealing body 3 in the fourth modification of the third embodiment, the primary joining step may be carried out with the height of the stirring pin F2 relative to the table KA being kept constant.

Moreover, the spacer KA2 may have any shape or form as long as the jacket body 2 and the sealing body 3 can be fixed to allow the front surface sides thereof to have a convex shape. Also, the spacer KA2 may be omitted as long as the jacket body 2 and the sealing body 3 can be fixed to allow the front surface sides thereof to have a convex shape. Moreover, although the jacket body 2 and the sealing body 3 are deformed to allow the front surface sides thereof to have a convex shape in the fixing step in the present embodiment, the jacket body 2 and the sealing body 3 of which the front surface sides have a convex shape may be shaped by die-casting or the like beforehand and the shaped jacket body 2 and the sealing body 3 may be fixed on the table KA. Even this method makes it possible to make use of heat contraction generated in the primary joining step to planarize the liquid-cooled jacket.

[Fifth Modification]

Figure 27:
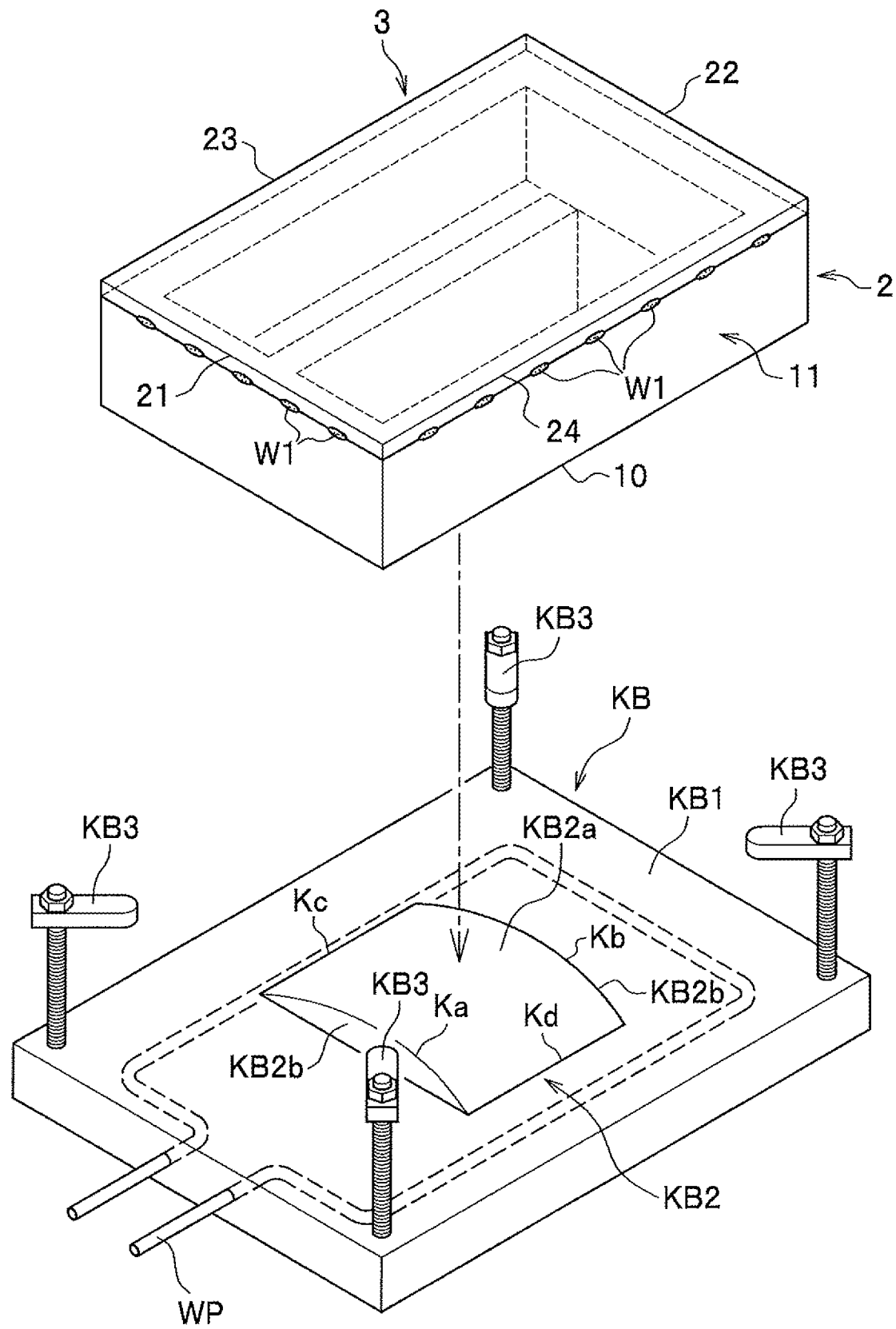
FIG. 27 is a perspective view showing a fifth modification of the manufacturing method for the liquid-cooled jacket according to the third embodiment.

Next, description will be given of a manufacturing method for a liquid-cooled jacket according to a fifth modification of the third embodiment. As shown in FIG. 27, the fifth modification of the third embodiment is different from the third embodiment in that the primary joining step is carried out in a state in which the jacket body 2 and the sealing body 3 are curved to have a convex shape while using a cooling plate. The fifth modification of the third embodiment will be described with a focus on configurations different from the third embodiment.

As shown in FIG. 27, in the fifth modification of the third embodiment, the jacket body 2 is fixed on a table KB when carrying out the fixing step. The table KB is composed of a substrate KB1 in the form of a rectangular parallelepiped, a spacer KB2 disposed in the center of the substrate KB1, clamps KB3 each formed in four corners of the substrate KB1, and a cooling pipe WP embedded inside the substrate KB1. The table KB is a member that immovably fixes the jacket body 2 thereon and serves as a "cooling plate" set forth in the claims.

The spacer KB2 is composed of a curved surface KB2*a* curved to have an upwardly convex shape, and elevation surfaces KB2*b*, KB2*b* formed at both ends of the curved surface KB2*a* and rising from the substrate KB1. The spacer KB2 has a first side portion Ka and a second side portion Kb which exhibit a curved line, and a third side portion Kc and a fourth side portion Kd which exhibit a straight line.

The cooling pipe WP is a tubular member embedded within the substrate KB1. The cooling pipe WP is adapted to allow a cooling medium for cooling the substrate KB1 to flow therein. A location of the cooling pipe WP, namely the form of a cooling flow passage allowing the cooling medium to flow therein, is not particularly limited, but in the fifth modification of the third embodiment, is of a planar shape which follows the movement locus of the primary joining rotary tool F in the first overlapped portion joining step. More specifically, the cooling pipe WP is disposed so that the cooling pipe WP and the first overlapped portion H1 are nearly overlapped each other in planar view.

In the fixing step in the fifth modification of the third embodiment, the jacket body 2 and the sealing body 3 integrated with each other in the provisional joining step are fixed on the table KB by means of the clamps KB3. More specifically, the jacket body 2 and the sealing body 3 are fixed on the table KB to allow the back surface of the bottom portion 10 of the jacket body 2 to be brought into surface contact with the curved surface KB2a. When the jacket body 2 and the sealing body 3 are fixed on the table KB, they are curved to allow the front surface side of the jacket body 2 and the front surface 3a of the sealing body 3 to have an upwardly convex shape. At this time, in the sealing body 3, the first side portion 21 and the second side portion 22 exhibit a curved line, and the third side portion 23 and the fourth side portion 24 exhibit a straight line.

In the primary joining step in the fifth modification of the third embodiment, the second overlapped portion joining step and the first overlapped portion joining step are carried out by means of the primary joining rotary tool F. In the second overlapped portion joining step and the first overlapped portion joining step, the amount of deformation of at least one of the jacket body 2 and the sealing body 3 is measured beforehand and the friction stir welding is then carried out while adjusting the insertion depth of the stirring pin F2 according to the amount of deformation. More specifically, the primary joining rotary tool F is moved to allow the movement locus thereof to trace a curved line along the curved surface of the front surface 3a of the sealing body 3. This makes it possible to keep the depth and width of the plasticized region W1 constant.

There is a risk that heat input at the time of friction stir welding causes heat contraction to be generated in the plasticized region W1 and the sealing body 3 of the liquid-cooled jacket 1B to be deformed into a concave shape. However, according to the fourth modification of the third embodiment, since the jacket body 2 and the sealing body 3 are fixed in the form of a convex shape beforehand so as to allow a tensile stress to act on the end surface 11a and the front surface 3a when carrying out the primary joining step, the liquid-cooled jacket can be planarized by making use of the heat contraction after the friction stir welding.

Moreover, in the fifth modification of the third embodiment, the curved surface KB2a of the spacer KB2 is brought into surface contact with the back surface which is in a concave shape, of the bottom portion 10 of the jacket body 2. This makes it possible to carry out the friction stir welding while cooling the jacket body 2 and the sealing body 3 more effectively. Since the frictional heat generated in the friction stir welding can be suppressed low, deformation of the liquid-cooled jacket due to heat contraction can be reduced. This makes it possible to reduce a curvature of the jacket body 2 and the sealing body 3 when the jacket body 2 and the sealing body 3 are formed to have a convex shape prior to the primary joining step.

Note that the measurement of the amount of deformation of the jacket body 2 and the sealing body 3 can be made using a known height detecting device. Also, a friction stirring apparatus equipped with, for example, a detecting device that detects a height from the table KB to at least one of the jacket body 2 and the sealing body 3, may be used to carry out the primary joining step while detecting the amount of deformation of the jacket body 2 or the sealing body 3.

Moreover, although the jacket body 2 and the sealing body 3 are curved to allow the first side portion 21 and the second side portion 22 to exhibit a curved line in the fifth modification of the third embodiment, the form of curves is not limited to this example. For example, the spacer KB2 having a spherical surface may be formed to allow the back surface of the bottom portion 10 of the jacket body 2 to be brought into surface contact with the spherical surface. In this case, when the jacket body 2 and the sealing body 3 are fixed on the table KB, all of the first to fourth side portions 21 to 24 exhibit a curved line.

Moreover, although the position of height of the stirring pin F2 is changed according to the amount of deformation of the jacket body 2 or the sealing body 3 in the fifth modification of the third embodiment, the primary joining step may be carried out with the height of the stirring pin F2 relative to the table KB being kept constant.

Fourth Embodiment

Figure 28:
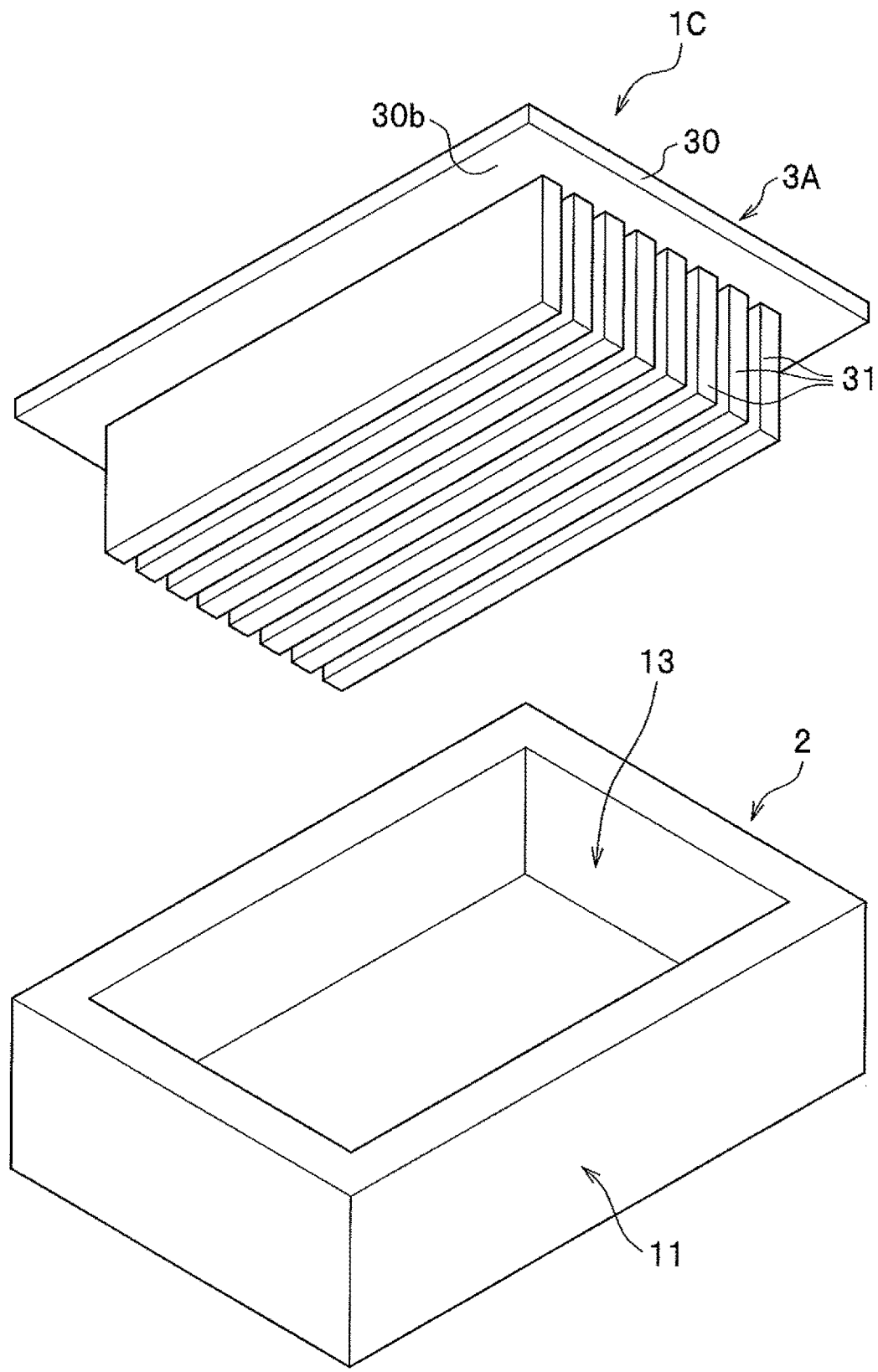
FIG. 28 is an exploded perspective view showing a liquid-cooled jacket according to a fourth embodiment of the present invention.
Figure 29A:
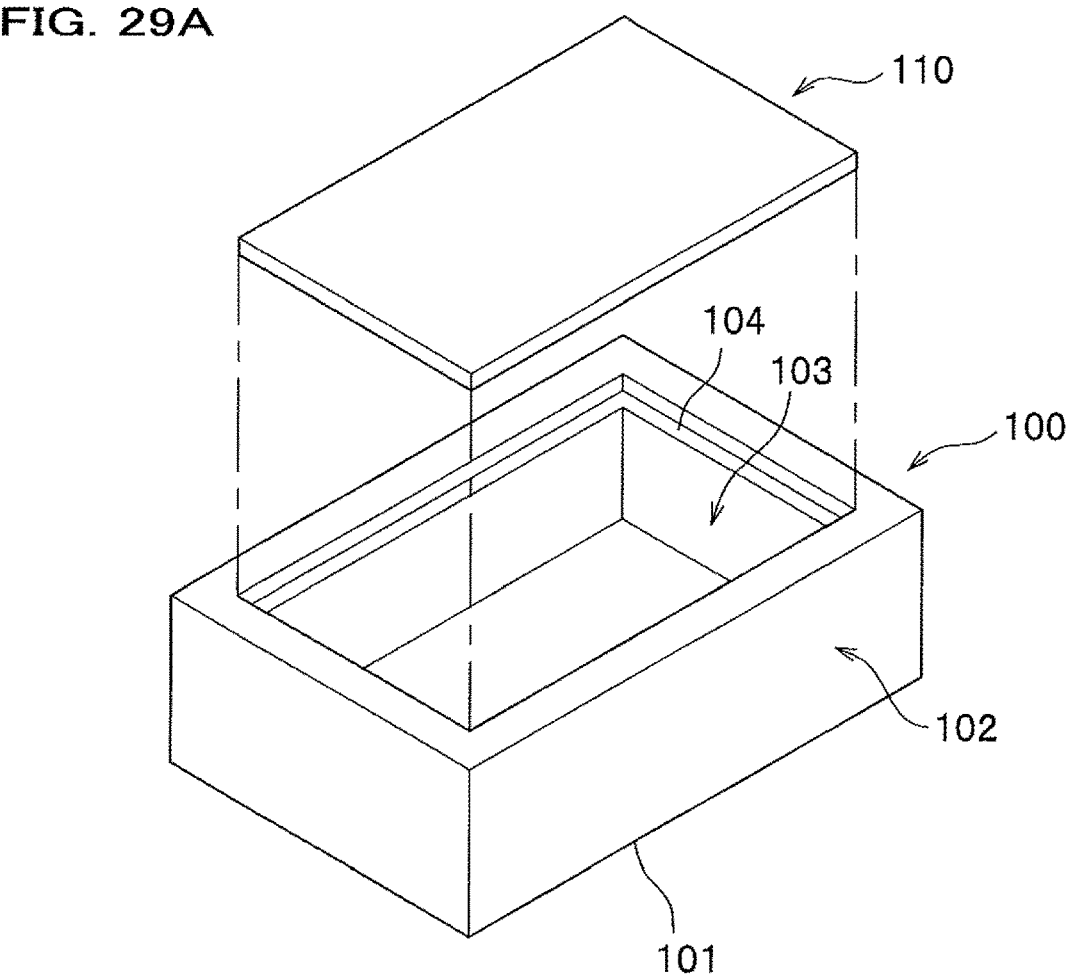
Figure 29B:
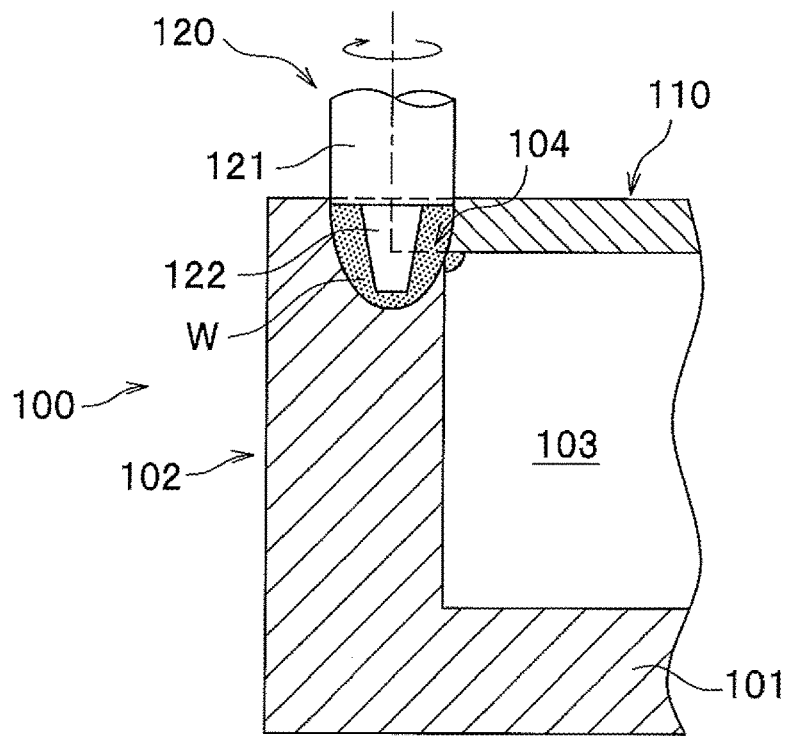
Figure 30A:
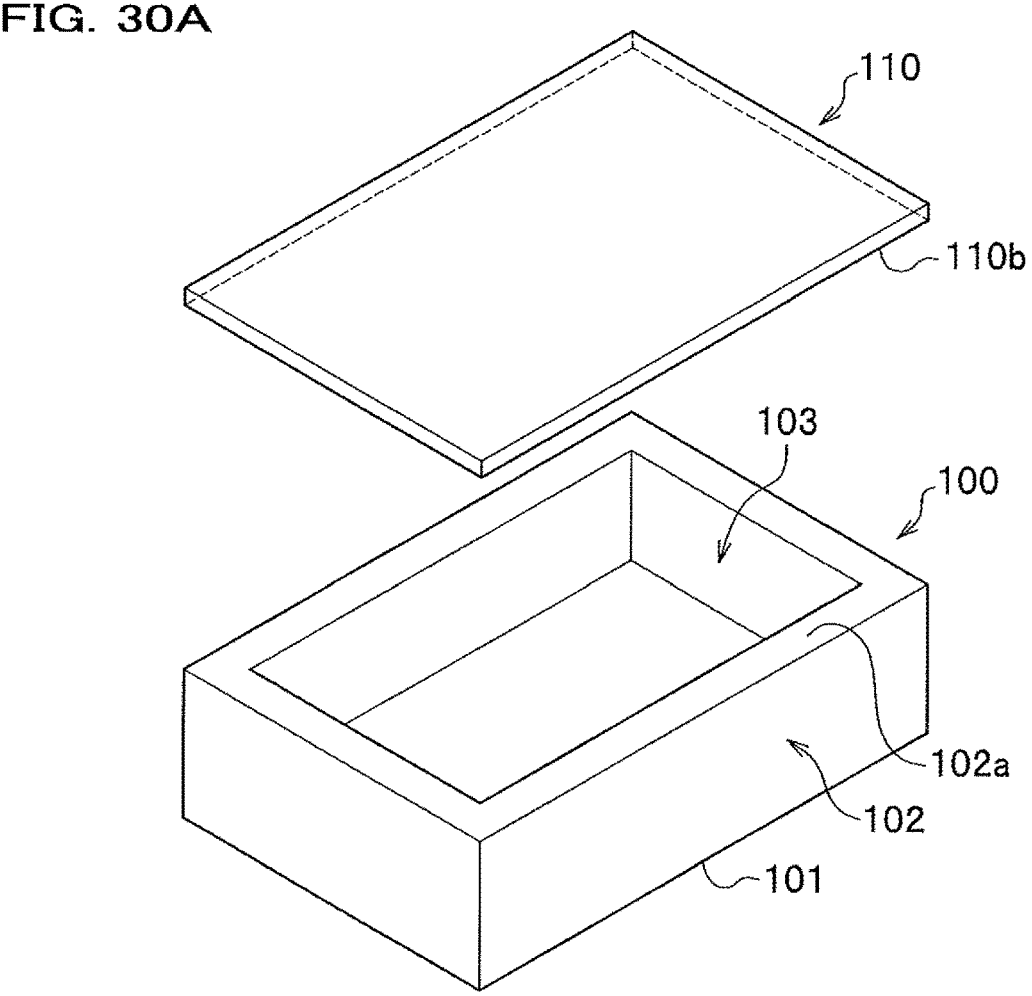
Figure 30B:
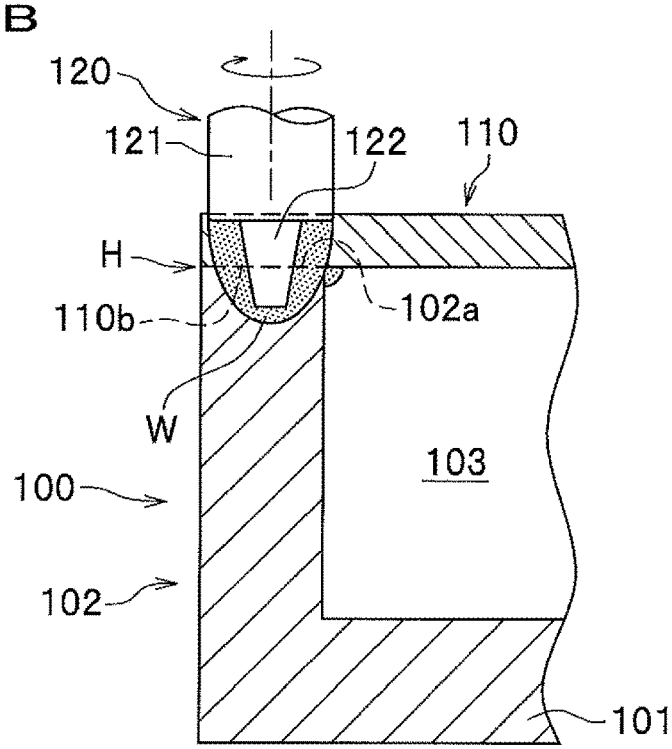

Next, description will be given of a method of manufacturing a liquid-cooled jacket according to a fourth embodiment of the present invention. As shown in FIG. 28, the fourth embodiment is different from the third embodiment in that a sealing body 3A is provided with fins 31. The fourth embodiment will be described with a focus on configurations different from the third embodiment.

As shown in FIG. 28, a liquid-cooled jacket 1C is composed of the jacket body 2 and the sealing body 3A. The jacket body 2 is the same as that in the third embodiment. The sealing body 3A is composed of a base portion 30 which is a plate-like member having the form of a rectangle in planar view, and a plurality of fins 31 provided on a back surface 30b of the base portion 30. The fins 31 are disposed at predetermined intervals perpendicularly to the base portion 30.

A manufacturing method for the liquid-cooled jacket according to the fourth embodiment includes the preparation step, the first overlapped portion joining step, and the burring step in the third embodiment. According to the manufacturing method for the liquid-cooled jacket according to the fourth embodiment, the liquid-cooled jacket 1C having a plurality of fins 31 formed therein can be manufactured. Since the liquid-cooled jacket 1C has the fins 31 formed therein, a cooling efficiency thereof can be increased. Note that the supporting portion 12 (see FIGS. 20A and 20B) may be provided in the jacket body 2 while providing the fins 31. Moreover, the fins 31 may be formed on at least one of the jacket body 2 and the sealing body 3A.

REFERENCE SIGNS LIST

1 Liquid-cooled jacket
2 Jacket body
3 Sealing body

3a Front surface
3b Back surface
3c Sealing-body side surface
10 Bottom portion
11 Side wall portion
11A Wall portion
11B Wall portion
11C Wall portion
11D Wall portion
11a End surface
12 Supporting portion
12a End surface
13 Recess
14 Stepped portion
14a Step bottom surface
14b Step side surface
31 Fin
F Primary joining rotary tool (Rotary tool)
F2 Stirring pin
G Provisional joining rotary tool
J1 Butted portion
K Table (Cooling plate)
H Overlapped portion
H1 First overlapped portion
H2 Second overlapped portion
W Plasticized region
WP Cooling pipe

The invention claimed is:

1. A method of manufacturing a liquid-cooled jacket which includes a jacket body having a bottom portion and a frame-shaped side wall portion provided to stand on the bottom portion, and a sealing body which seals an opening of the jacket body, the jacket body further having a supporting portion provided to stand on the bottom portion to abut on a back surface of the sealing body and formed to continue from one wall portion constituting the side wall portion and to be kept away from another wall portion facing the one wall portion, and the liquid-cooled jacket allows heat transport fluid to flow in a hollow portion formed by the jacket body and the sealing body,
the method comprising:
a preparation step which includes
forming, on a peripheral edge of the opening of the jacket body, a step bottom surface located below by one step from an end surface of the side wall portion, and a step side surface rising from the step bottom surface, and
placing the sealing body on the step bottom surface to allow the step side surface and a sealing-body side surface of the sealing body to butt each other; and
a primary joining step which includes allowing a rotary tool to move once around the sealing body, while moving the rotary tool along a butted portion formed in the preparation step, to carry out friction stir welding for the butted portion, wherein
the primary joining step includes employing the rotary tool provided with a stirring pin having a length dimension greater than a thickness dimension of the sealing body, and carrying out friction stirring with only the stirring pin being brought into contact with the jacket body and the sealing body,
the primary joining step further includes, in addition to the friction stir welding for the butted portion, carrying out friction stir welding for an overlapped portion at which the back surface of the sealing body and an end surface of the supporting portion are overlapped each other, and wherein
the jacket body and the sealing body are curved to allow the bottom portion and the end surface of the jacket body and a front surface of the sealing body to have an upwardly convex shape.

2. The method of manufacturing the liquid-cooled jacket according to claim 1, wherein
the primary joining step includes providing a cooling plate on the bottom portion of the jacket body, and carrying out friction stir welding while cooling the jacket body and the sealing body.

3. The method of manufacturing the liquid-cooled jacket according to claim 2, wherein
the primary joining step includes allowing a back surface of the bottom portion of the jacket body and the cooling plate to be brought into surface contact with each other.

4. The method of manufacturing the liquid-cooled jacket according to claim 1, further comprising:
prior to the primary joining step, a provisional joining step of carrying out provisional joining for the butted portion.

5. The method of manufacturing a liquid-cooled jacket, according to claim 1, wherein
the rotary tool is moved along the overlapped portion with a constant height being kept.

6. The method of manufacturing a liquid-cooled jacket, according to claim 1, wherein
the rotary tool is moved along the butted portion with a constant height being kept.

7. A method of manufacturing a liquid-cooled jacket which includes a jacket body having a bottom portion and a frame-shaped side wall portion provided to stand on the bottom portion, and a sealing body which seals an opening of the jacket body, the jacket body further having a supporting portion provided to stand on the bottom portion to abut on a back surface of the sealing body and formed to continue from one wall portion constituting the side wall portion and to be kept away from another wall portion facing the one wall portion, and the liquid-cooled jacket allows heat transport fluid to flow in a hollow portion formed by the jacket body and the sealing body,
the method comprising:
a preparation step which includes
forming, on a peripheral edge of the opening of the jacket body, a step bottom surface located below by one step from an end surface of the side wall portion, and a step side surface rising from the step bottom surface, and
placing the sealing body on the step bottom surface to allow the step side surface and a sealing-body side surface of the sealing body to butt each other; and
a primary joining step which includes allowing a rotary tool to move once around the sealing body, while moving the rotary tool along a butted portion formed in the preparation step, to carry out friction stir welding for the butted portion, wherein
the primary joining step includes employing the rotary tool provided with a stirring pin having a length dimension greater than a thickness dimension of the sealing body, and carrying out friction stirring with only the stirring pin being brought into contact with the jacket body and the sealing body, and
the primary joining step further includes, in addition to the friction stir welding for the butted portion, carrying out friction stir welding for an overlapped portion at which the back surface of the sealing body and an end surface of the supporting portion are overlapped each other, and wherein the primary joining step includes: inserting the rotary tool into a position corresponding to the supporting portion, on a front surface of the sealing body; continuously carrying out the friction stir welding for the butted portion without pulling out the rotary tool subsequently to the friction stir welding for the overlapped portion; and pulling out the rotary tool from an end surface of the side wall portion outside the butted portion.

8. The method of manufacturing a liquid-cooled jacket according to claim 7, wherein
the primary joining step includes providing a cooling plate on the bottom portion of the jacket body, and carrying out friction stir welding while cooling the jacket body and the sealing body.

9. The method of manufacturing a liquid-cooled jacket according to claim 8, wherein
the primary joining step includes allowing a back surface of the bottom portion of the jacket body and the cooling plate to be brought into surface contact with each other.

10. The method of manufacturing a liquid-cooled jacket according to claim 7, further comprising,
prior to the primary joining step, a provisional joining step of carrying out provisional joining for the butted portion.

11. The method of manufacturing a liquid-cooled jacket according to claim 7, wherein
the rotary tool is moved along the overlapped portion with a constant height being kept.

12. The method of manufacturing a liquid-cooled jacket according to claim 7, wherein
the rotary tool is moved along the butted portion with a constant height being kept.

* * * * *